(12) United States Patent
Parmeshwar et al.

(10) Patent No.: US 10,859,082 B2
(45) Date of Patent: Dec. 8, 2020

(54) ACCURATE FLOW-IN MEASUREMENT BY TRIPLEX PUMP AND CONTINUOUS VERIFICATION

(71) Applicant: SCHLUMBERGER TECHNOLOGY CORPORATION, Sugar Land, TX (US)

(72) Inventors: Vishwanathan Parmeshwar, Houston, TX (US); Jacques Orban, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 163 days.

(21) Appl. No.: 15/677,476

(22) Filed: Aug. 15, 2017

(65) Prior Publication Data

US 2019/0055937 A1  Feb. 21, 2019

(51) Int. Cl.
| | |
|---|---|
| *F04B 51/00* | (2006.01) |
| *F04B 47/02* | (2006.01) |
| *F04B 49/06* | (2006.01) |
| *F04B 49/10* | (2006.01) |
| *F04B 9/04* | (2006.01) |

(52) U.S. Cl.
CPC .............. *F04B 51/00* (2013.01); *F04B 9/045* (2013.01); *F04B 47/02* (2013.01); *F04B 49/065* (2013.01); *F04B 49/10* (2013.01); *F04B 2201/0201* (2013.01); *F04B 2201/0803* (2013.01); *F04B 2201/1208* (2013.01); *F04B 2205/09* (2013.01)

(58) Field of Classification Search
CPC .............. F04B 2201/0201; F04B 51/00; G01F 15/024; G01F 1/34; G01F 1/36; G01F 1/50
See application file for complete search history.

(56) References Cited

U.S. PATENT DOCUMENTS

| | | | |
|---|---|---|---|
| 8,555,914 B2 | 10/2013 | Smith, IV et al. | |
| 9,255,465 B2 | 2/2016 | Smith, IV et al. | |
| 2004/0167738 A1* | 8/2004 | Miller | F04B 51/00 702/114 |
| 2016/0084024 A1 | 3/2016 | Dillard et al. | |
| 2016/0341594 A1 | 11/2016 | Singfield | |

FOREIGN PATENT DOCUMENTS

GB  2313197 A  11/1997

* cited by examiner

*Primary Examiner* — Kenneth J Hansen
(74) *Attorney, Agent, or Firm* — Rachel E. Greene

(57) ABSTRACT

A method includes determining a rotational position of a crankshaft in a multiplex pump from one or more sensors disposed on the crankshaft, determining a position of each of a plurality of pistons along a corresponding pump bore in relation to a total stroke length of each piston and a connecting rod length, calculating an individual theoretical displaced volume of fluid for each of the pump bores in the multiplex pump based on the rotational position of the crankshaft, and summing the individual theoretical displaced volumes to determine a total theoretical pumped volume by the multiplex pump. A calibration method includes determination of the multiplex pump efficiency versus speed and discharge pressure, and the effect of pump leakage and valve closing delay on the pump efficiency. Verification of the pump performance and efficiency may be controlled during pumping to insure the validity of the last calibration data set.

21 Claims, 30 Drawing Sheets

ACCURATE FLOW-IN MEASUREMENT BY TRIPLEX PUMP AND CONTINUOUS VERIFICATION

BACKGROUND

Multiplex piston pumps are positive-displacement reciprocating pumps that are configured with two or more plungers, and are often used in both drilling and well service operations. The most common multiplex pump may be equipped with three pistons (triplex pumps), and are discussed more herein. However, pumps with more or less than three pistons may be used for different applications. For example, quintuplex pumps are available and may generate less flow noise. In some low-cost applications, duplex pumps are also used. In a typical drilling rig configuration, multiplex piston pumps may be installed and operated simultaneously.

Multiplex pumps used in well service activities generally are capable of handling a wide range of fluid types, including corrosive fluids, abrasive fluids and slurries containing relatively large particulates.

When multiplex pumps are used, it is common practice to count the number of strokes to determine the volume of the fluid being pumped. The number of strokes a piston or plunger in a pump completes in a unit of time may be referred to as the stroke speed (typically measured in "strokes per minute" (SPM)). Generally, as the stroke speed increases, the flow rate of fluid being pumped by a triplex pump is also increased.

Rig operators may refer to the size (pump capacity) and the number of strokes to determine the pumped volume, represented in Equation A, below. The pumped volume may be estimated by multiplying the number of strokes by the fluid displaced during one stroke. The number of strokes may be obtained by the number of turns performed by the pump crankshaft multiplied by the number of pistons (plungers) of the pump.

Pumped volume=(capacity)×(number of pistons)× (number of turns)   Eq. A

The capacity is the theoretical displacement of one piston during its full stroke. The capacity may be calculated as 2 times the radius (R) of the rotational path of a crankpin pivot point around the crankshaft times the area (A) of the piston cross section. The flow rate is the pumped volume per unit of time, represented by Equation B, below.

Flow rate=(capacity)×(number of pistons)×(rotation speed)   Eq. B

As an example, a triplex pump having three pistons of 5-gallon capacity, and rotation speed of 40 RPM (revolution per minute) may have the following flow rate:

Flow rate(GPM)=(5 gal)×(3 pistons)×(40 RPM)=600 GPM

Known methods of estimating pumped volume and flow rate are estimates and/or theoretical calculations. However, the fluid volume discharged by each stroke of a multiplex pump is commonly lower that the theoretical capacity due to multiples effect such leakage, valve closing delay, and fluid compressibility.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter In one aspect, embodiments of the present disclosure relate to methods that include determining a rotational position of a crankshaft in a multiplex pump from one or more sensors disposed on the crankshaft, determining a position of each of a plurality of pistons along a corresponding pump bore in relation to a total stroke length of each piston and a connecting rod length, calculating an individual theoretical displaced volume of fluid for each of a plurality of chambers in the multiplex pump based on the rotational position of the crankshaft, and summing the individual theoretical displaced volumes to determine a total theoretical pumped volume by the multiplex pump.

In another aspect, embodiments of the present disclosure relate to methods that include providing a multiplex pumping system having multiple multiplex pumps for pumping fluid downhole in a drilling operation, and calculating a volumetric efficiency of a first multiplex pump while the multiplex pumping system pumps fluid downhole, wherein the volumetric efficiency is calculated from a suction flow rate into the first multiplex pump and a theoretical discharge volume pumped out of the first multiplex pump.

In another aspect, embodiments of the present disclosure relate to systems that include a fluid source, multiple multiplex pumps, each multiplex pump having a crankshaft, at least one position sensor disposed on the crankshaft, multiple chambers, each chamber having an inlet in fluid communication with the fluid source via an inlet flowline and an outlet, multiple pistons, each piston slidingly engaged within the chamber, and multiple connecting rods, each connecting rod extending from one of the pistons to the crankshaft, a motor connected to the crankshaft, and a calibration tank selectively in fluid communication with the inlet of one of the multiplex pumps at a time.

In yet another aspect, embodiments of the present disclosure relate to systems that include multiple triplex pumps fluidly connected to a fluid source via inlet flowlines, a Coriolis meter disposed along a first inlet flowline, and at least one secondary flowline fluidly connecting a portion of the first inlet flowline upstream the Coriolis meter to one or more different inlet flowlines.

Other aspects and advantages of the invention will be apparent from the following description and the appended claims.

DETAILED DESCRIPTION

Figure 1A:
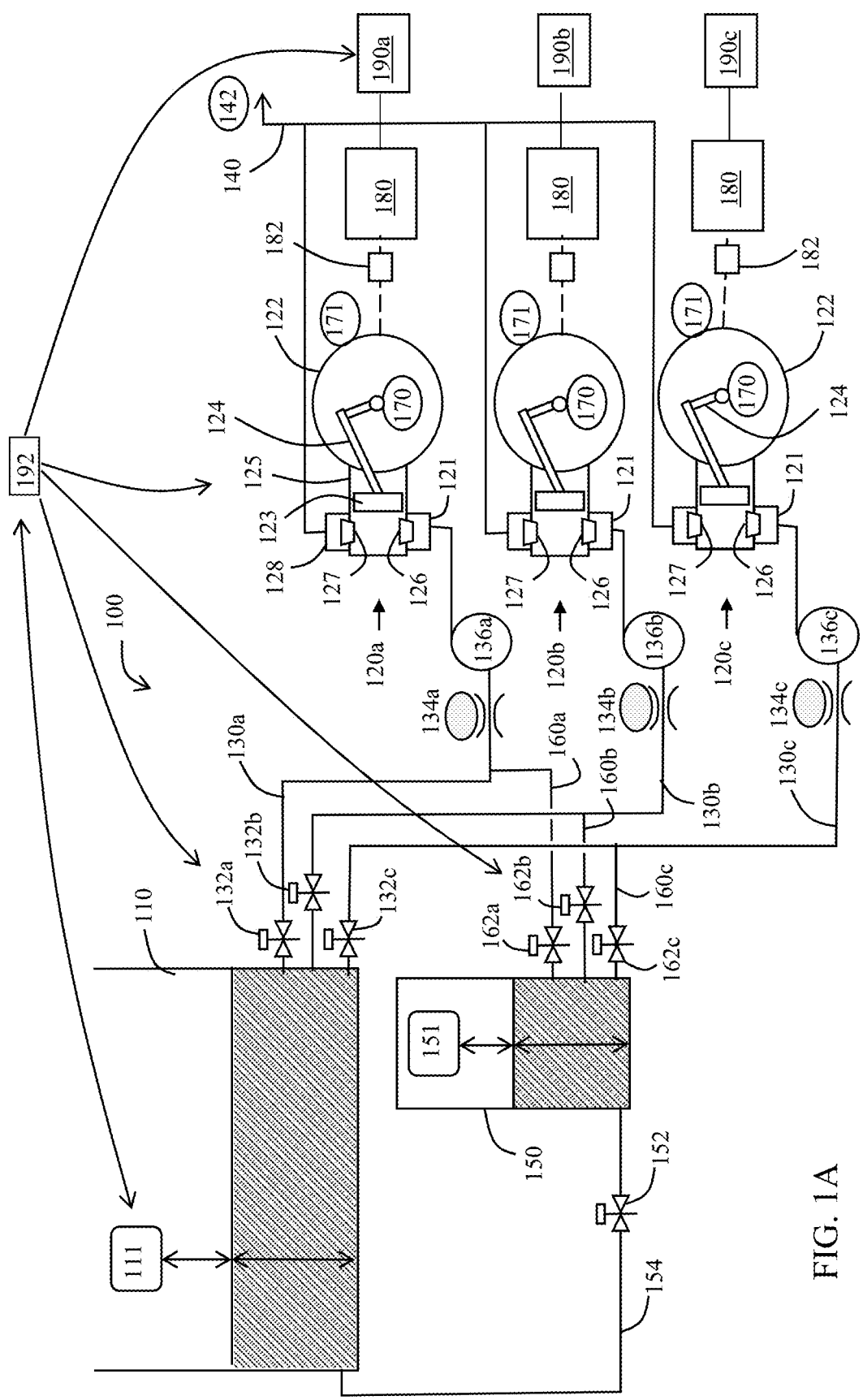
FIGS. 1A and 1B show examples of a triplex pump system according to embodiments of the present disclosure.

Embodiments of the present disclosure relate generally to accurate flow rate measurements of fluid being pumped downhole based on rotation speed and crankshaft instantaneous position in a triplex pump (or other multiplex pump) taking in account the pump efficiency. Some embodiments relate to methods that include determining the pump efficiency during normal operations, such as drilling a new portion of a well. Some embodiments relate to methods that include determining the contribution of different elements affecting the overall pump efficiency. Some embodiments relate to methods that include continuously verifying if the data from the last accepted calibration is still applicable with adequate results.

Embodiments of the present disclosure relate to multiplex pumps, including pumps having two or more pistons, such as duplex pumps, triplex pumps, quadraplex pumps, quintuplex pumps and others. However, because triplex pumps may be relatively more common in the field, discussion of multiplex pumps used in accordance with embodiments of the present disclosure may be simplified by referring to a triplex pump as an example of a multiplex pump. Thus, embodiments discussed herein referring to a triplex pump may also apply to multiplex pumps having more or less than three pistons.

The volumetric efficiency of a triplex pump may be obtained by calibrating the triplex pump at location and during drilling, such that calibration may be done without incurring non-productive time ("NPT"). The calibration may be performed at different flow rates and discharge pressure.

NPT refers to time when drilling operations do not occur, for example, where pumping drilling fluid downhole is paused for some reason. For example, NPT may include time from when a drill bit is pulled out of a wellbore to when it is run back to same depth to resume drilling, time required to nipple up and nipple down a BOP stack, pressure test of BOP, tripping of drill string, slip and cut time, and casing run times. Operations such as make up or laid down BHA, logging, fishing, jarring, wait on crew and equipment may also be part of NPT.

According to embodiments of the present disclosure, calibration methods for determining a triplex efficiency without incurring non-productive time (NPT) may include determining and comparing tank levels of fluid to be pumped through a triplex pump. Further, calibration methods may include outputting fluid at a discharge pressure similar to or within the range of the pressure of fluid being discharged during a flow rate measurement period.

Embodiments of the present disclosure also include flow measurement systems. A flow measurement system may include a fluid source, such as a mud tank, a calibration tank, and at least one triplex pump connected to the fluid source and the calibration tank. Each triplex pump may include a crankshaft, three chambers, three pistons slidingly engaged within each chamber, and connecting rods extending from each of the pistons to the crankshaft. A motor may be connected to the crankshaft to rotate the crankshaft at a rotational speed.

Figure 1B:
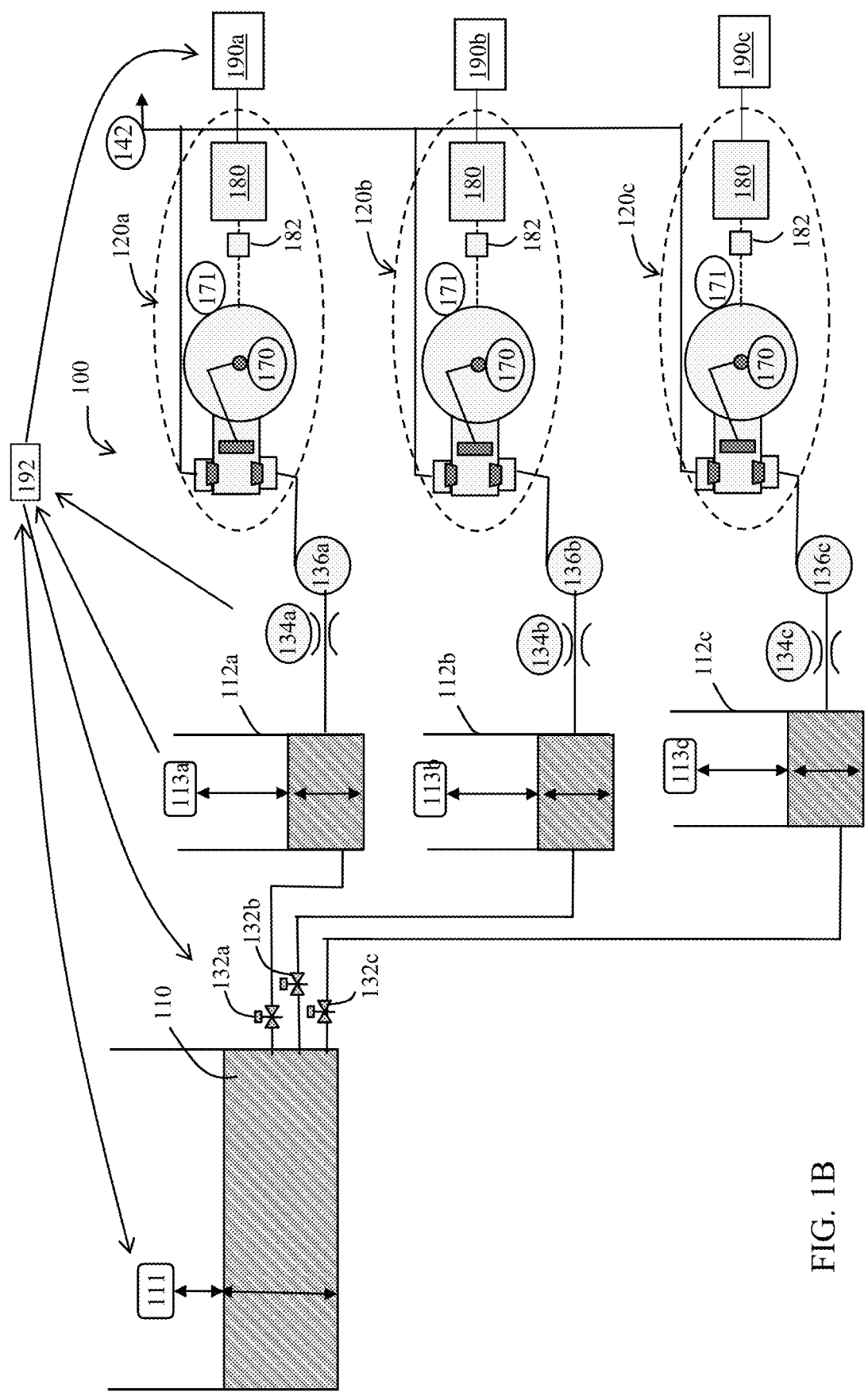

FIGS. 1A and 1B show examples of different configurations of a system according to embodiments of the present disclosure. The system 100 includes a fluid source 110, which is shown as being a mud tank. However, other fluid sources may be provided in systems of the present disclosure. One or more sensors 111 may be provided in or proximate to the fluid source 110 to detect a fluid level of the fluid source 110. The fluid source may be in fluid communication with one or more triplex pumps 120a-c via an inlet flowline 130. In the embodiment shown, the system includes three triplex pumps 120a, 120b, 120c, but more or less triplex pumps may be used in other systems. A valve 132a-c may be positioned along the inlet flowline 130, which may allow fluid to flow from the fluid source 110 to a connected triplex pump 120a-c or block fluid flow from the fluid source 110. In the embodiment shown, a pump 136a-c (e.g., a centrifugal pump) may be provided along the inlet flowline 130a-c, where the pump 136a-c may pump fluid from the fluid source 110 to a triplex pump 120a-c. Further, the inlet flowline 130a-c may have a flow meter 134a-c positioned between the fluid source 110 and a connected triplex pump 120a-c to detect a flow rate of fluid moving from the fluid source 110 to the triplex pump 120a-c. In some embodiments, the flowmeter 134a-c may be installed in the flowline between the centrifugal pump 136a-c and a triplex pump 120a-c. The inlet flowline 130a-c may connect to an inlet 121 to the triplex pump 120a-c, such that fluid may flow from the inlet flowline 130 into a triplex pump 120a-c.

The system 100 may further include a calibration tank 150, which may hold fluid for introduction into the triplex pumps 120a-c. Fluid may be selectively flowed from the calibration tank 150 to an inlet flowline 130a-c through a calibration flowline 160, where a valve 162a-c disposed along the calibration flowline 160a-c may allow or prevent fluid flow from the calibration tank 150 to the inlet flowline 130a-c. In the embodiment shown, the calibration flowline 160a-c may introduce fluid from the calibration tank 150 into the inlet flowline 130a-c at a location upstream of the flow meter 134a-c and the pump 136a-c. In such embodiments, the pump 136a-c may pump fluid from the calibration flowline 160a-c through the inlet flowline 130a-c to the triplex pump inlet 121.

A sensor 151 may be positioned within or on the calibration tank 150 to detect and/or monitor the level of fluid therein. When the calibration tank 150 is depleted, fluid from the fluid source 110 may be selectively flowed from the fluid source 110 into the calibration tank 150. For example, one or more valves 152 may be positioned along a refill flowline 154, where in an open position, fluid may flow through the refill flowline from the fluid source 110 to the calibration tank 150, and in a closed position, fluid may be prevented from flowing into the calibration tank 150.

Each triplex pump 120a-c may have a crankshaft 122 connected to three pistons 123 by connecting rods 124, where a first axial end of each connecting rod 124 is connected to the crankshaft 122, and the second axial end of each connecting rod 124 is connected to a piston 123. Each piston 123 is positioned within the triplex pump 120a-c to slidingly engage within a liner or bore 125. In operation, the crankshaft 122 may rotate, thereby moving the connecting rods 124, where the connecting rods 124 translate rotational movement from the crankshaft 122 into linear movement to push and pull the pistons 123 through the bores 125. Linear movement of the pistons 123 through the bores 125 may suction fluid into the triplex pump 120a-c through a suction valve 126 disposed in the triplex pump inlet 121 and discharge fluid out of the triplex pump 120a-c through a discharge valve 127 disposed in an outlet 128 of the triplex pump 120a-c. Discharged fluid from the triplex pump 120a-c may flow through a discharge flowline 140, to be pumped downhole, for example. In the embodiment shown, the outlets 128 of each of the three triplex pumps 120a-c are fluidly connected to the discharge flowline 140. A pressure sensor 142 may be positioned along the discharge flowline 140 to monitor the pressure of fluid being discharged from the triplex pumps 120a-c.

The triplex pumps 120a-c are designed so that the pistons 123 may be easily replaced, for example to change the size of the piston 123 and the bore 125. For example, a piston having a relatively larger cross-sectional area may be used in triplex pumps 120a-c to provide a large capacity (as defined in Equations 1 and 2) and to provide high flow and lower discharge pressure (e.g., for drilling shallow wells), and a piston having a relatively smaller cross-sectional area may be used in the triplex pumps 120a-c to provide lower flow and higher discharge pressure (e.g., for drilling deeper wells).

The triplex pump 120a-c is a type of positive displacement pump, and may be considered as a volumetric flow measurement system. For each triplex pump 120a-c, the position of the crankshaft 122 may be continuously determined by an encoder 170 to accurately monitor the crankshaft position, for example, to monitor the rotational position of the crankshaft within 5 degrees or less accuracy. For example, an encoder may be positioned on a pinion shaft in a triplex pump to monitor the crankshaft position. Furthermore, the crankshaft position may be determined from a reference angle from a top dead position of the crankshaft, which may be obtained by a dedicated sensor 171 positioned at a highest point of the crankshaft. Using one or more position sensors 170, 171 on the crankshaft, the crankshaft position may be known at any moment, which may be used to determine the amount of fluid ejected into the discharge flowline 140 due to the movement of the piston 123. Namely, the ejected flow of fluid is related to the instantaneous velocity of the piston 123, where the instantaneous velocity of the piston 123 is the derivative of the piston's position, and the piston's position is related to the crankshaft position. In some embodiments, the encoder 170 may be absolute, so that the position measurement may be referred to a defined origin (or reference point), which merges measurements from sensors 171 into 170.

Triplex pumps are referred to throughout this disclosure in methods and systems for pumping fluid downhole. The methods and systems disclosed herein may also be applicable to multiplex pumps having two chambers and corresponding pistons or more than three chambers and corresponding pistons. For example, a system for pumping fluid downhole may include a fluid source, a calibration tank, and at least one multiplex pump, where each multiplex pump has a crankshaft rotatable by a motor 180, at least one position sensor disposed on the crankshaft, multiple chambers (each chamber having an inlet in fluid communication with the fluid source and the calibration tank via an inlet flowline and an outlet), multiple pistons, each piston slidingly engaged within the chamber, and multiple connecting rods, each connecting rod extending from one of the pistons to the crankshaft.

Referring still to FIG. 1A, a motor 180 is connected to each crankshaft 122 to drive and rotate the crankshaft 122 at a rotational speed. The motor 180 may be coupled to the pump crankshaft via a speed reduction system, possibly involving a gear reducer of belt drive system. A torque sensor 182 may be positioned between the motor 180 and crankshaft 122 to measure the amount of torque transferred to the crankshaft 122, or a torque sensor may be positioned on the crankshaft. For each pump, a variable frequency drive (VFD) 190a-c may be in communication with the motor 180 to change the motor speed of the pump 120a-c.

Further, sensors as described herein (e.g., sensors 170, 171 disposed around the crankshaft 122) may be in wireless communication with or may be wired to a programmable logic controller ("PLC"), depending on, for example, the types of sensors being used and the location of the sensor in the system, where the PLC may receive signals from the sensors and mediate data transmission to a computational device. The PLC may continuously monitor the state of the sensors and transmit data to the computational device. For example, a PLC may provide real-time feedback of pressure, temperature, frequency, position and/or other measurements provided from the sensor signals. The PLC (not shown) of the triplex pump may communicate with the rig central computer system.

As shown in FIGS. 1A and 1B, a rig control system 192 may be used to perform methods disclosed herein. The rig control system 192 may control the VFD 190a-c of each triplex pump 120a-c. The rig control system 192 may receive measurements (such as pump speed and crankshaft portion, discharge pressure . . . ) for calculating pump characteristics, and also, the rig control system 192 can control the valve 132a-c and valves 162a-c allowing control of feeding fluid to the triplex pumps.

FIG. 1B describes an alternative embodiment of the system 100, where each triplex pump 120a-c is fed via a buffer tank 112 which can be isolated from a main active tank holding the fluid source 110. One or more sensors 113 may be provided in or proximate to the buffer tanks 112 to detect a fluid level of the fluid in each buffer tank 112. A flow meter 134 may be positioned along the flow line between each buffer tank 112 and triplex pump 120a-c. Such embodiment may provide multiple operating modes with less changing of valve controls.

A computing device may be any type of server, desktop, embedded, or other computer hardware. The computing device may include at least one or more computer processor(s), and a memory module (e.g., random access memory (RAM), flash memory, etc.), interfacing with the computer processor(s). The processor may be, for example, a central processing unit (CPU), a graphics processing unit (GPU), and application-specific integrated circuit (ASIC), a field-programmable gate array (FPGA), etc. The processor may include one or more processor cores, i.e., circuits that read and execute program instructions. The processor may further be equipped with a memory controller that provides an interface to the memory module. The memory controller may include the logic necessary to write and to read to/from the memory module and to refresh the memory of the memory module, e.g., if the memory is dynamic random-access memory (DRAM). The memory controller may be a component of the processor, or it may be a separate component, interfacing with the processor. The processor may further include an input/output (I/O) interface that may allow connection of various communication buses, including, for example, a peripheral component interconnect express (PCIe) bus, but also a conventional peripheral component interconnect (PCI) bus, a universal serial bus (USB), etc. to the processor. In some embodiments, the I/O interface may alternatively not be integrated in the processor, but may instead be implemented in one or more separate chips, interfacing with the processor. Further, parts of the I/O interface may be integrated in the processor, whereas other parts may be implemented elsewhere.

A processor may be in communication with a programmable logic controller (PLC). In some embodiments, a processor may be a microprocessor having a memory chip and integrated circuits for control logic, monitoring, and communicating. The processor may direct the PLC to execute control instructions, communicate with other devices, carry out logic and arithmetic operations, and perform internal diagnostics. The processor may run memory routines to constantly check the PLC to avoid programming errors and ensure the memory is undamaged.

In addition, a computing device may also include one or more storage device(s) (e.g., a hard disk, an optical drive such as a compact disk (CD) drive or digital versatile disk (DVD) drive, a flash memory stick, etc.), and numerous other elements and functionalities. The computing device may further include one or more output device(s) such as a screen (e.g., a liquid crystal display (LCD), a plasma display, touchscreen, cathode ray tube (CRT) monitor, projector, or other display device), and input device(s) (e.g., a keyboard and a mouse), thus enabling a user to interact with the computing device. The computing device may be connected to a network (e.g., a local area network (LAN), a wide area network (WAN) such as the Internet, mobile network, or any other type of network) via a network interface connection (not shown).

Memory may provide permanent storage to the operating system for data used by the processor. Read-only memory (ROM) may store data permanently for the operating system, and random access memory (RAM) may store status information for input and output devices, along with values for timers, counters, and internal devices. Data from PLCs may be uploaded onto a processor using a programming device, for example, a computer. Data from PLCs may be used, for example, in calibration processes according to embodiments of the present disclosure.

According to embodiments of the present disclosure, in-time measurements indicating performance of different components in triplex pumping systems may be used to calibrate one or more triplex pump efficiencies, thereby allowing for more accurate determination of the amount of fluid being pumped downhole from the triplex pumping system. The validity of triplex efficiency estimation may be tracked and used to improve triplex efficiency estimation. Triplex inefficiency may be caused, for example, by leaks past a seal between a piston and chamber, delay from the time the piston takes to switch directions, which may suction or discharge unintended fluid into or out of the chamber, and/or from leaks through suction and/or discharge portions of a piston cycle such as from leaks in inlet and/or outlet valves.

Figure 2A:
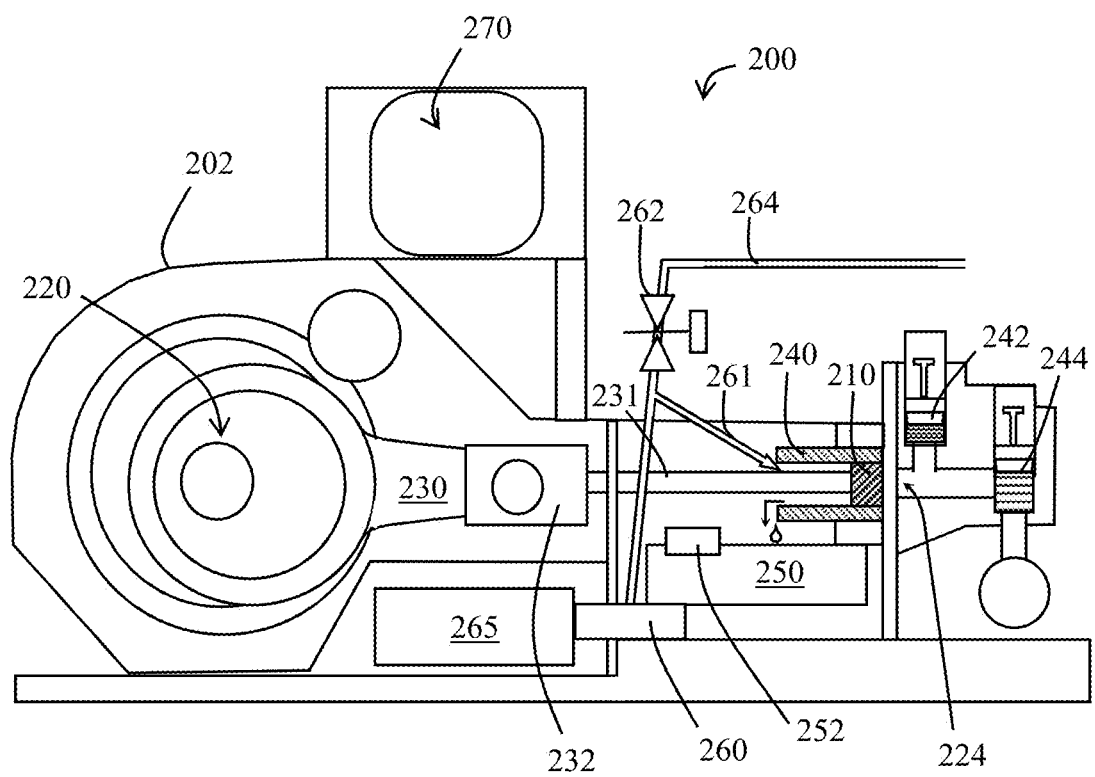
FIGS. 2A and 2B show different views of triplex pump operation according to embodiments of the present disclosure.

FIG. 2A shows a diagram of an example of a triplex pump according to embodiments of the present disclosure, where external leakage in the triplex pump 200 may be measured. The triplex pump 200 includes three pistons 210 (one is shown) connected to a crankshaft 220 by connecting rods 230 (one is shown) and a pushing rod 231 attached to each-other at a knuckle 232. Each piston 210 is disposed in a liner or a bore 240, where the piston 210 may slide back and forth through the chamber bore 240 as the crankshaft 220 rotates and moves the connecting rods 230 as well as the pushing rod 231 back and forth. When the piston 210 slides in a direction away from the crankshaft 220, fluid may be pushed through a discharge valve 242, and when the piston 210 slides in the opposite direction, fluid may be suctioned into the chamber 224 through a suction valve 244. A motor 270 may rotate the crankshaft 220 at a rotational speed, possibly via a speed reduction system involving belt transmission, chain transmission and gears. The pistons 210 and bores 240 are arranged in a side-by-side manner along a plane extending radially outward from the crankshaft 220.

Further, the components of the triplex pump 300 may be held within a pump frame, or housing 202 (i.e., the crankcase).

A collection box 250 may be positioned under the pushing rod 231 and under the liners or bores 240. In some embodiments, a single collection box 250 may have a size/area large enough to collect fluid that leaks from each of the three pistons 210 in the triplex pump 200. In some embodiments, three collection boxes may each be sized and positioned under each piston in the triplex pump, such that individual collection boxes collect fluid that leaks from individual pistons. Further, in some embodiments, a pump 260 (e.g., a progressive cavity pump) and a pump drive motor 265, configured to drive the pump 260, may be provided in the triplex pump 200 to pump fluid collected in the collection box 250 out of the collection box 250. The pump 260 may pump fluid collected in the collection box 250 through a cleaning line 261 extending therefrom to jet fluid onto a piston 210 to clean the piston 210.

A control valve 262 may be provided along a flowline 264 in fluid communication with the collection box 250 to allow or prevent fluid flow through the flowline 264 towards a fluid source (e.g. a mud tank). For example, when the fluid level in the collection box 250 is too high or reaches a preselected level, the control valve 262 may be opened so that the extra fluid can be transferred out of the collection box 250.

Figure 2B:
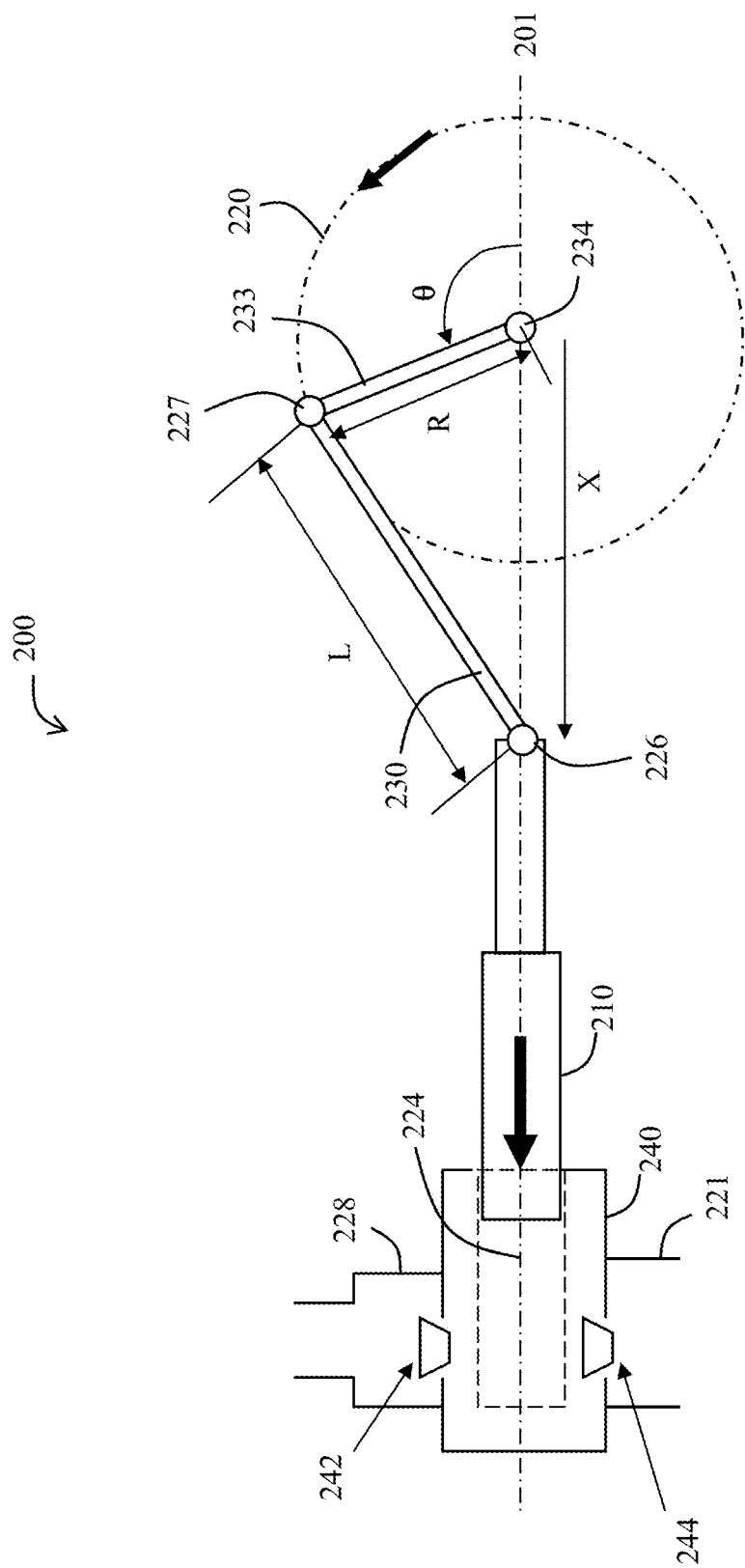

Referring now to FIG. 2B, a schematic of triplex pump operation is provided to show more detail on a relationship between fluid discharge volume to piston movement and crankshaft rotation in the triplex pump 200. The piston 210 slides back and forth inside the liner or bore 240. The triplex pump 200 includes three pistons 210 and three corresponding chambers 224, where a connecting rod 230 connects each piston to a crankshaft 220, via the crankpin 233. The three crankpins may be offset by 120 degrees. In the case of quintuplex pump, the quintuplex pump would be equipped with five pistons and the crankshaft would have five crankpins offset by 72 degrees. One of the piston 210, liner or bore 240, chamber 224 and connecting rod 230 assembly is shown in FIG. 2B. The chamber 224 has a suction valve 244 positioned in an inlet 221 and a discharge valve 242 positioned in an outlet 228. As the piston 210 moves through the chamber 240, the piston 210 movement may suction fluid through the inlet 221 as the piston 210 moves toward the crankshaft 220, and the piston 210 movement may discharge fluid through the outlet 228 as the piston 210 moves away from the crankshaft 220. For a given position of the piston 210, the corresponding chamber volume 224 in the chamber 240 may be determined based on the piston axial position.

The connecting rod 230 has a rod length L measured between two pivot points 226, 227, where a first pivot point 226 is where the connecting rod 230 connects to the piston 210, and where a second pivot point 227 (defined by the crankpin 233) rotates along a rotational path defined by the offset of the crankpin 233 versus the main axis 234 of the crankshaft 220. A crankshaft angular position θ of the second pivot point 227 of the first crankpin 233 may be measured as the angle formed between the radius R of the rotational path (i.e., the distance between the second pivot point 227 and a rotational axis 234 of the crankshaft 220) with respect to a central axis 201 of the piston 210. The connecting rod 230 translates the rotational movement of the crankshaft 220 to linear movement of the piston 210. The linear movement of the piston 210 may be monitored by tracking the linear distance X between the first pivot point 226 and the rotational axis 234 of the crankshaft 220. When the second pivot point 227 reaches a position around the rotational path closest to the chamber 240, the linear distance X is greatest (and the first position of the piston 210 within the chamber 240 is farthest away from the crankshaft), and when the second pivot point 227 reaches a position around the rotational path farthest from the chamber 240, the linear distance X is smallest (and the second position of the piston 210 is closest to the crankshaft 220).

The piston position, which may be indicated by the linear distance X, may be written in terms of the following equation:

$$X(\theta)=R\{-\cos(\theta)+(L/R)\sqrt{(1-R^2(\sin(\theta))^2/L^2)}\} \quad \text{Eq. 1}$$

The maximum stroke length performed by the piston during a revolution of the crankshaft is equivalent to 2R.

The derivative of Equation 1 may be taken to calculate the velocity V of the piston 210, where the angular position θ around the crankshaft is equal to the product of the angular velocity ω and time t. Equation 2 shows the equation for the velocity V of the piston when R/L≠0.

$$V=\omega R\{\sin(\omega t)-(R\sin(2\omega t))/2L\sqrt{(1-R^2(\sin(\omega t))^2/L^2)}\} \quad \text{Eq. 2}$$

The theoretical instantaneous discharged flow rate Q of that piston of fluid being moved through the chamber 224 due to movement of the piston 210 may be calculated from the product of the area A of the piston 210 (along a cross section perpendicular to the central axis 201 of the piston 210) and the speed V of the piston 210, as shown in Equation 3.

$$Q=AV \quad \text{Eq. 3}$$

where A is the frontal cross sectional area of the piston.

Equation 3 applies for a half turn of the crankshaft, where the angular position is 0<θ<180. The discharged flow rate is occurring for half of the rotation of the crankshaft, when the piston is pushed from its second position to its first position. The other half turn rotation of the crankshaft corresponds to the suction phase, taking fluid through the valve 244, while the discharge valve 242 is closed.

The instantaneous theoretical flow rate of fluid being moved by one piston through a triplex pump may be calculated by measuring an angular position of a crankshaft in the triplex pump versus time and applying Equations 2 and 3. The instantaneous flow rate of the other two pistons in the triplex pump may also be determined by the same logic, where an angular offset of 120 and 240 degree are added to the angle θ of Equation 1. Application of Equation 2 to each of the pistons in a triplex pump are shown below in Equations 2a-2c.

$$\text{Piston 1:} V1=\omega R\{\sin(\omega t)-(R\sin(2\omega t))/2L\sqrt{(1-R^2(\sin(\omega t))^2/L^2)}\} \quad \text{Eq. 2a}$$

$$\text{Piston 2:} V2=\omega R\{\sin(\omega t-120)-(R\sin[2(\omega t-120)])/2L\sqrt{(1-R^2(\sin(\omega t-120))^2/L^2)}\} \quad \text{Eq. 2b}$$

$$\text{Piston 3:} V2=\omega R\{\sin(\omega t-240)-(R\sin[2(\omega t-240)])/2L\sqrt{(1-R^2(\sin(\omega t-240))^2/L^2)}\} \quad \text{Eq. 2c}$$

Using Equations 2a-2c, the instantaneous discharge flow rate for each piston can be calculated based on Equation 3.

$$Q1(t)=AV1(t), \text{ for } 0<\omega T<180, \text{ and}$$

$$Q1(t)=0, \text{ for } 180<\omega T<360 \quad \text{Eq. 3a}$$

$$Q2(t)=AV2(t), \text{ for } 0<\omega T-120<180, \text{ and}$$

$$Q2(t)=0, \text{ for } 180<\omega T-120<360 \quad \text{Eq. 3b}$$

$$Q3(t)=AV3(t), \text{ for } 0<\omega T-240<180, \text{ and}$$

$$Q3(t)=0, \text{ for } 180<\omega T-240<360 \quad \text{Eq. 3c}$$

For each crankshaft angle θ, the instantaneous positive individual discharged theoretical flow rates of fluid being moved through each of the three bores in the chamber by each of the three pistons in the triplex pump may be summed together to determine a total theoretical flow rate of the triplex pump. For each angle θ, in addition to summing the instantaneous theoretical flow rates of each piston, verification that a piston is in the discharge phase may be performed. Otherwise, the corresponding discharged flow-rate is zero. In practical condition, all pistons of a multiplex pump do not discharge simultaneously, as at least one piston is in suction mode while another piston is in discharge mode.

Equations 3a-c are related to the instantaneous discharge flow rate of each piston in a multiplex pump. Similar equations may be written for the instantaneous suction flow rate.

Such calculated total theoretical flow rate (sum of the individual discharged theoretical flow rates of each piston in a multiplex pump) may be used to analyze the overall behavior of the multiplex pump.

Figure 3:
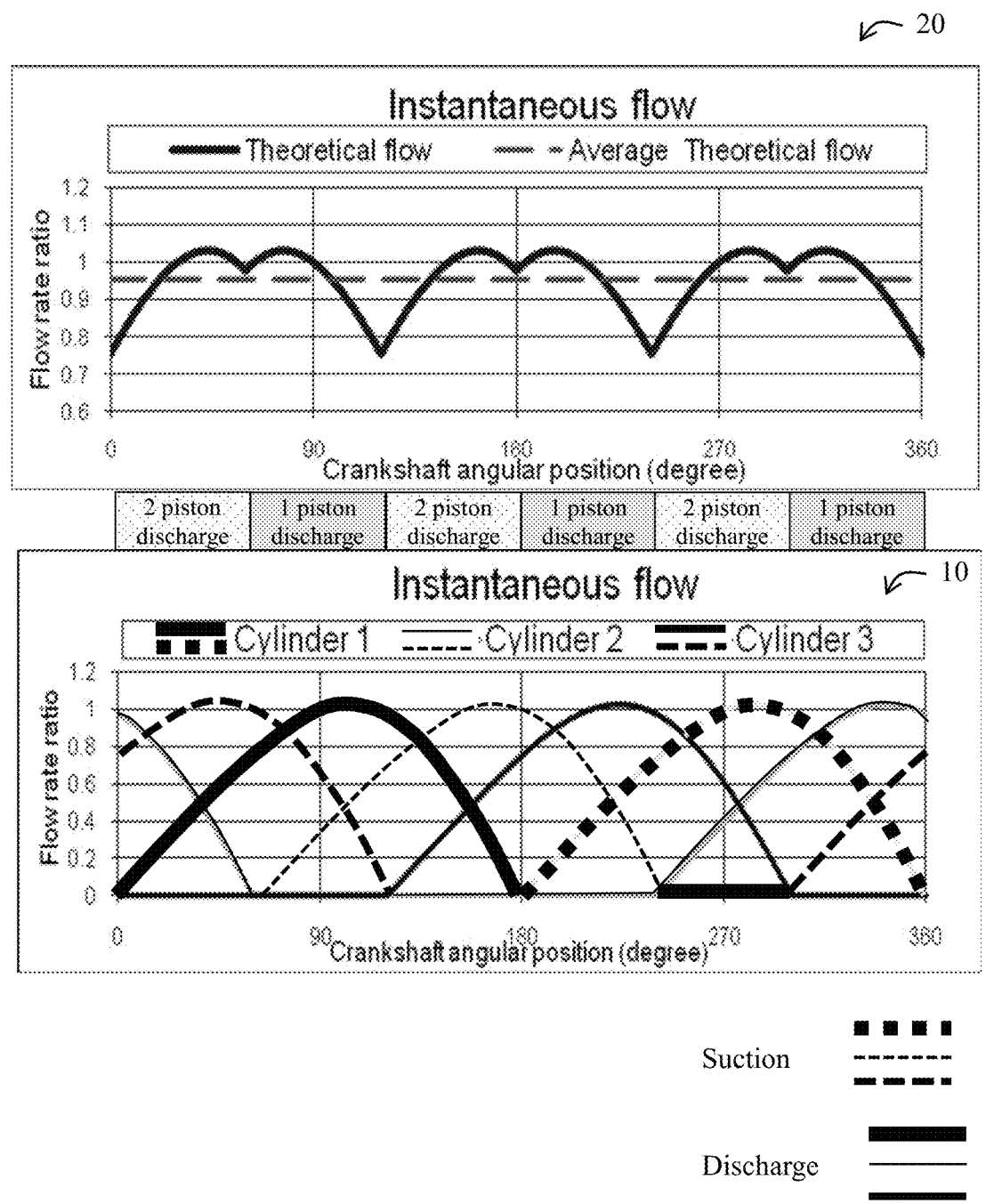
FIG. 3 shows a graph of the theoretical discharge rates of individual pistons in a triplex pump and the collective theoretical flow rate of the triplex pump.

For example, FIG. 3 shows a graph 10 of theoretical discharged flow rate of individual pistons in a triplex pump as the angular position of the crankshaft changes. When the flow rate ratio of a piston is zero (or below), the piston is in suction mode (the piston is moving in a direction toward the crankshaft, displayed as dashed line in FIG. 3), and when the flow rate ratio of the piston is positive, the piston is in discharge mode (where the piston is moving in an opposite direction away from the crankshaft, displayed as solid line in FIG. 3). The theoretical instantaneous discharge (or suction) flow rate of each individual piston (calculated along changes in crankshaft angular position) may be summed together. For each given position of the crankshaft, less than all the pistons in a multiplex pump (e.g., one or two pistons) can be in discharge mode (or suction mode). The instantaneous summed flow rate is plotted on a graph 20 of the total theoretical flow rate of the triplex as a whole at the different angular positions of the crankshaft. As shown in graph 20, the theoretical flow rate varies from the average theoretical flow rate, and thus, it may be advantageous to use the theoretical flow rate given it is more precise depending on the crankshaft annular position at a moment in time. The shape of the theoretical flow curves shown in FIG. 3 is calculated from a triplex pump having an R/L ratio of the rotational path radius R (offset of the crankpin to the crankshaft axis) to the connecting rod length L equal to 0.25. However, the shape of the theoretical flow curves may vary with different R/L ratios (e.g., a theoretical flow curve may be flatter or steeper).

FIG. 3 describes the flow output for a theoretical pump with "ideal" operation with the pistons alternatively generating suction or discharge. However, the flow effect between suction and discharge is only a shift by 180 degrees for each piston. FIG. 3 also displays the instantaneous flow in discharge phase and in suction phase.

In multiplex pumps having more than three chambers and corresponding pistons, the theoretical flow rate may have a higher frequency of peaks. For example, in a multiplex pump having five chambers, five pistons slidingly engaged in the liners or bores, and five connecting rods connecting the pistons to a crankshaft, five overlapping theoretical flow rate paths for each corresponding piston and chamber may be plotted and summed together to graph the total theoretical flow rate of the multiplex as a whole at the different angular positions of the crankshaft, as shown in FIG. 3 for a triplex pump.

Methods of the present disclosure may include determining a rotational position of a crankshaft in a multiplex pump (e.g., triplex pump) from one or more sensors disposed near (or on) the crankshaft, calculating individual discharged theoretical flow rates of fluid through each of the chambers in the multiplex pump based on the rotational position of the crankshaft, and summing the individual theoretical flow rates (which includes the effect of the angular shift between pistons) to determine a total theoretical flow rate of the multiplex pump.

A multiplex pump has a limited volumetric efficiency, where fluid ejected from a single chamber is lower than the theoretical displaced volume from a single piston stroke through the chamber. Inefficiencies in fluid ejection from a multiplex chamber may be caused, for example, by delay in valve closing, where part of the fluid returns across the valve, leaks through the seal of the valve when closed, and leaks through seals around the piston (between the piston and chamber). Cavitation may be ignored/negligible in system designs where a "charge" pump (e.g., pump 136a-c in FIGS. 1A-B) may insure that the pump chamber is properly filled when the piston reaches the end of the suction portion of a piston stroke.

According to embodiments of the present disclosure, a volumetric efficiency of a triplex pump may be calculated by calibrating the triplex pump. A triplex pump may be calibrated by comparing a known value of fluid volume pumped by the triplex pump to a calculated "theoretical discharge volume" of the triplex pump. The known value of fluid volume pumped by a triplex pump may be obtained from the variation of fluid volume in one or more calibration tanks (e.g., calibration tank 150 in FIG. 1A). The change of fluid volume in the tank is typically obtained via the usage of fluid level measurement device (e.g., sensor 151 in FIG. 1A) in the tank associated with the geometrical description of the tank: for example (but not limited to), the tank may have a rectangular cross-section, or trapezoidal cross-section, or part of a horizontal cylinder, vertical cylinder, etc. In some embodiments, a known volume of fluid pumped into a triplex pump may be measured by a Coriolis meter.

The pump volumetric efficiency may be calculated as the ratio of a calibration tank(s) volume variation and the "theoretical discharged volume" during the duration of the pumping calibration period.

Once the known value of fluid volume pumped into the triplex pump during a calibration period is measured and the theoretical discharge volume of the triplex pump during the calibration period is calculated, the volumetric efficiency of the triplex pump may be determined. The calibration is preferably performed for one selected triplex pump in a given time (e.g., in FIGS. 1A-B, a first calibration for triplex pump 120a, a second calibration for triplex pump 120b, and a third calibration for triplex pump 120c). With installation involving multiple triplex pumps, each triplex may be calibrated in a succession of calibration period.

For example, referring again to FIG. 1A, a method may include performing calibration of one selected pump while the normal rig process is not (or at minimum) affected. To achieve such process, each triplex pump 120a-c may be connected to the calibration tank 150 separately, while the other triplex pumps 120a-c stay connected to the main tank 110. The discharge of the triplex pumps 120a-c may be interconnected to a common discharge flowline 140 which may deliver the pumped fluid into the well so that normal rig activities may be performed (i.e., drilling). In the following description, triplex pump 120a is considered in the calibration mode, while the two other triplex pumps (120b and 120c) are operating normally. However, the three multiplex pumps maintain delivering fluid to the well for the drilling process.

A method of calibrating triplex pump 120a may include closing a valve 132a to an inlet flowline 130 to the calibrated triplex pump 120a (where the valves 132b-c to the other of the three triplex pumps 120b and 120c may be open or closed during calibration) and opening a valve 162a to a calibration flowline 160 in fluid communication with the inlet 121 of the calibrated triplex pump 120a. The valves 162b-c are closed. When the valve 162a to the calibration flowline 160 is open, the number of rotations of the crankshaft 122 of the calibrated triplex pump 120a during the calibration period may be determined using one or more sensors 170, 171 around the crankshaft 122, while a sensor 151 may be used to measure a true volume of fluid pumped from the calibration tank 150 for the calibration period. The sensor 151 may be a level sensor: with the proper definition of the shape of tank 151, it is possible to determine the volume of fluid in the tank 151 in relation with the measurement of the level sensor 151. The number of rotations (including partial rotations) of the crankshaft 122 during the calibration period may be used to calculate a theoretical transferred volume from the calibrated triplex pump 120a during the calibration period, which may be compared to the measured volume of fluid pumped from the calibration tank 150 to determine a volumetric efficiency of the first triplex pump 120a.

The volumetric efficiency of a triplex pump for fluid flow, $\eta_v$, may be represented by Equation 3.

$$\eta_v = \text{(calibration tank pumped volume)/(theoretical transfer volume)} \quad \text{Eq. 4}$$

The "calibration tank pumped volume" may be determined by a level sensor in the calibration tank, for example, by sensor 151 in calibration tank 150 shown in FIG. 1A. This process includes providing a proper description of the calibration tank (shape and size) in order to relate fluid level to the volume of fluid pumped from the calibration tank.

The "theoretical transferred volume" is the volume transferred by the triplex pump during the calibration period. Using the calculated theoretical flow rate through a triplex pump, a theoretical discharge volume of fluid from the triplex pump may be calculated over a period of time. In some embodiments, the "theoretical transfer volume" by the triplex pump corresponding to a given angular rotation of the crankshaft may be calculated by determining the difference of linear positions of the piston corresponding to the final and initial crankshaft angular position (e.g., using position sensors as discussed above). The difference of linear position of the pistons multiplied by piston cross section determines the change in fluid volume in the chamber.

As the multiplex pump has multiple pistons, the "theoretical discharge volume" pumped volume is the sum of the volume displaced by each piston in the multiplex pump for a certain rotational displacement of the crankshaft, including an integer number N of full turns (360 degrees), which is incremented when the crankshaft passes at a certain reference point (e.g., zero degree).

Considering a first piston, the pumped volume of the first piston may be provided using the following equations:

If $0 < \theta_{initial} < \theta_{final} < 180$ $$\text{Vol\_Piston1} = A[X(\theta_{final}) - X(\theta_{initial})] \quad \text{Eq. 5.1}$$

As initial consideration, $X1 = X(\theta_{initial})$ and $X2 = X(\theta_{final})$ and $N_{pumping} = N$.

If $180 < \theta_{initial} < 360$, $N_{pumping} = N - 1$ and $X1 = 0$

If $180 < \theta_{final} < 360$, $X2 = 180$ $$\text{Vol\_Piston1} = \text{Vol1} + \text{Vol2} + \text{Vol3} \quad \text{Eq. 5.2}$$

The pumped volume to finish the initial stroke starts at the first initial angle, $\theta_{initial}$.

$$\text{Vol1} = A[X(180) - X1] = A[L + R - X1] \quad \text{Eq. 5.3}$$

The pumped volume during the final stroke from the start of discharge of that stroke to the final angular position of the crankshaft.

$$\text{Vol3} = A[X2 - X(0)] = A[L - R - X1] \quad \text{Eq. 5.4}$$

The volume of $N_{pumping}$ capacity of a piston may be calculated, with $N_{pumping}$ being the number of completed strokes between the initial and final strokes (but not including the initial and final strokes). The pumped capacity of a piston is the cross section of the piston, A, multiplied by the length of the stroke performed by the piston (twice the distance R).

$$\text{Vol2} = N_{pumping} \times A \times \text{stroke\_length} = N_{pumping} \times A \times 2R \quad \text{Eq. 5.5}$$

where A=frontal area (or cross-sectional area) of the piston.

The same calculation may be done for the other pistons in the multiplex pump by using Equations 5.4 and 5.5 to provide the pumped volume of a second piston, Vol_Piston2, and the pumped volume of a third piston, Vol_Piston3, in a triplex pump. The total pumped volume ($\text{Vol}_{Pump}$) may be calculated using Equation 6, $$\text{Vol}_{Pump} = \text{Vol\_Piston1} + \text{Vol\_Piston2} + \text{Vol\_Piston3} \quad \text{Eq. 6}$$

Also, by determining the instantaneous position of the crankshaft in a triplex pump, the instantaneous flow rate and the discharge volume for the triplex pump can be determined. The rotational path radius of the connecting rod around the crankshaft and the connecting rod length are used for such determinations. The diameter of the piston is also a parameter to define the flow-rate (via the surface area of the piston cross section).

During a calibration period of a first multiplex pump in a system, one or more other available multiplex pumps may simultaneously discharge fluid to a common discharge line to provide a desired discharge pressure of pumped output fluid. For example, referring again to the system 100 in FIG. 1A, while first triplex pump 120a is being calibrated, the other available triplex pumps 120b and 120c are connected to the main tank 110 to simultaneously discharge fluid in the common discharge flowline 140 and insure the desired discharged pressure. Triplex pumps 120b and 120c may be calibrated sequentially or at different times from the first triplex pump 120a. While an individual triplex pump (e.g., 120a, 120b or 120c) is being calibrated, one or more of the remaining triplex pumps in the system 100 may continue normal operation.

Figure 4:
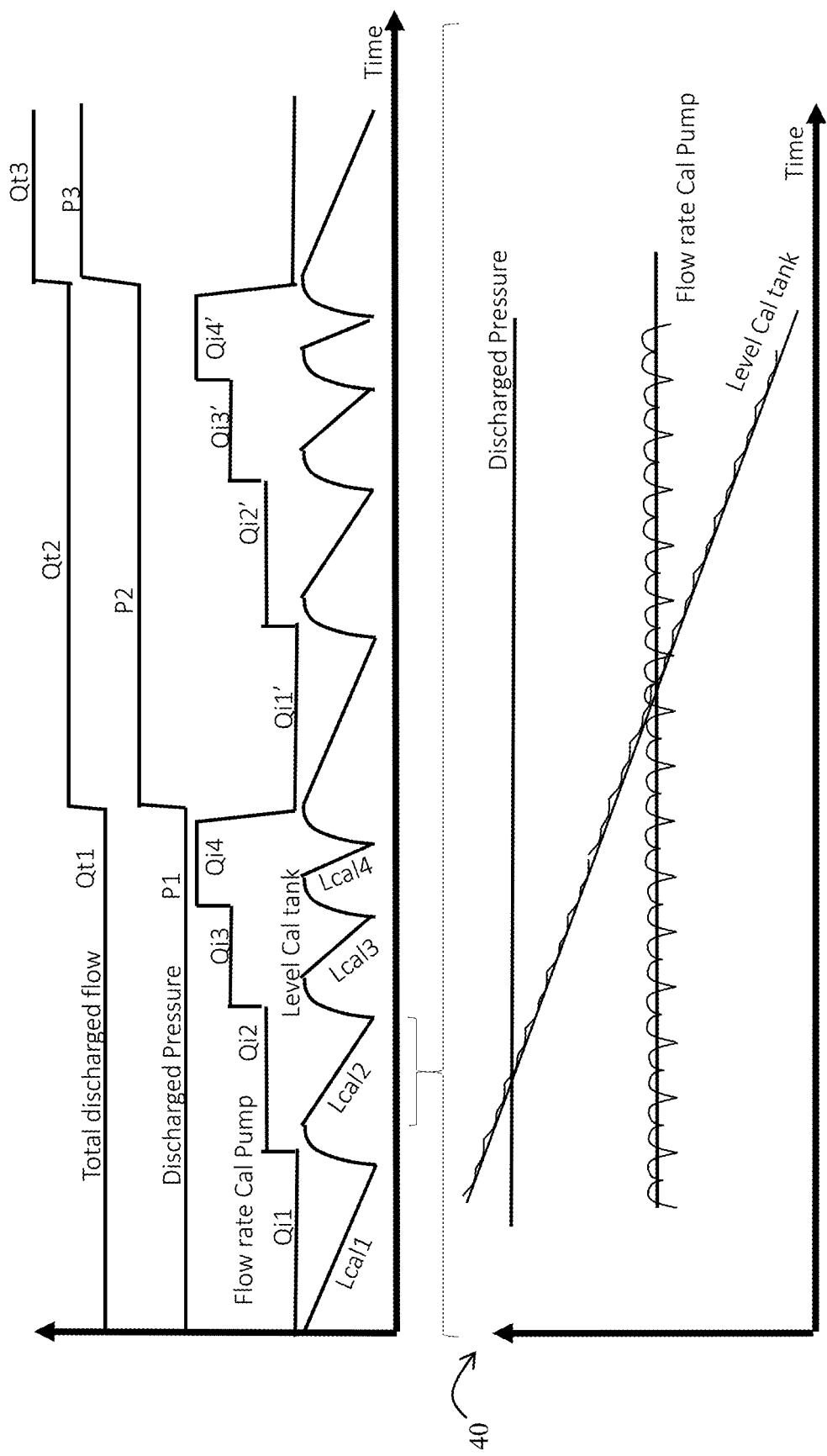
FIG. 4 shows a graph of parameters during a calibration process for determining volumetric efficiency of a triplex pump according to embodiments of the present disclosure.

Because the volumetric efficiency is affected by discharge pressure and triplex pump speed, the calibration of the selected triplex pump may be determined in view of these two parameters. For example, FIG. 4 shows an example of volumetric efficiency calibration cycles graphed over time. When operating on a drilling rig equipped with multiple triplex pumps, the discharge pressure (P1, P2, P3) may be controlled by the total flow rate (Qt1, Qt2, Qt3) through the well while the flow rate shared between the pump in calibration and the other pump(s) may be adjusted. In some embodiments, when using a back pressure system or other managed pressure drilling techniques, the discharge pressure of the triplex pumps may also be determined by the setting of this pressure control system. The theoretical flow rate from a triplex pump being calibrated, Qi1, Qi2, Qi3, Qi4, may be calculated from the crankshaft angular position in the calibrated triplex pump, as discussed above. The theoretical transferred volume by the triplex during the calibration period may also be obtained from the change in crankshaft angular position (including the number of crankshaft revolutions) in the calibrated triplex pump, as discussed above. The discharge pressure P and total discharged flow rate Qt are from the total flow of fluid from each triplex pump in the system (e.g., three triplex pumps 120a-c are shown in the system in FIG. 1), whereas the theoretical flow rate Qi is from a single calibrated triplex pump.

The level of a calibration tank, Lcal, used for calibrating the calibrated triplex pump may further be graphed as a function of time during the process of volumetric efficiency calibration to compare the true volume of fluid pumped through the calibrated triplex pump with the theoretical pumped volume during calibration periods. Multiple calibration periods may be performed for a single calibrated triplex pump in a system (where a triplex pump may be referred to as a calibrated triplex pump while it is being calibrated). The downward slopes of the calibration tank level line, Lcal, represent different calibration periods, where the steepness of the downward slope is related to the speed of the calibrated triplex pump (relatively steeper downward slopes are calibration periods having the calibrated triplex pump moving at relatively faster speeds, and relatively shallow downward slopes are from calibration periods having the calibrated triplex pump operating at relatively slower speeds). The upward sloping portions of the calibration tank level line, Lcal, represent periods of refilling the calibration tank (e.g., which may be done in the system 100 of FIG. 1 by opening a refill valve 152 on a refill flowline 154 between a fluid source 110 and the calibration tank 150).

As shown in FIG. 4, multiple calibration cycles (e.g., four calibration cycles, as shown, or more or less than four calibration cycles) may be performed while the discharged pressure and total discharged flow rate are held at P1 and Qt1, respectively. In the embodiment shown, each of the calibration cycles may be performed at different calibrated triplex pump speeds. Multiple calibration cycles may further be performed at different discharge pressure and total discharge flow rates. For example, multiple calibration cycles may be performed while the discharged pressure and total discharged flow rate are held at P2 and Qt2 and for the flow rates $Q_{i1}'$, $Q_{21}'$, $Q_{31}'$, $Q_{41}'$ of the calibrated triplex, respectively, and also while the discharged pressure and total discharged flow rate are held at P3 and Qt3, respectively. For each calibration condition, the remaining triplex pumps in the system are set to provide a specific flow rate. Such calibration method may be conducted using an overall rig control (e.g., rig control 192 in FIGS. 1A and 1B).

As can be seen in the zoomed in view 40 of the Lcal2 cycle of calibration under discharge pressure P1 and total discharge flow rate Qt1, the theoretical flow rate Qi2 has a pattern of fluctuation from the overlapping periods of suction and discharge between the three pistons in the calibrated triplex pump (as described previously in relation to FIG. 3). Further in the calibration tank (e.g., 151 in FIG. 1A), the fluid volume may also display a fluctuating volume variation in accordance with the flow-rate variation, as the tank volume is related the integral of the pumped flow-rate. Level Lcal 2 may have a pattern of fluctuating rates of level change versus time as the change of volume in the tank corresponds to the pumped flow-rate:

$$\delta V/\delta t = Qi \qquad \text{Eq. 7}$$

To detect the fluctuation effect on the level measurement performed by the level sensor 151, a pulse dampener may not be present in the suction line of the multiplex pump 120a-c, or if such pulse dampeners are present, they may be de-activated. Furthermore, the sampling rate of the level sensor 151 may be fast enough to be able to acquire multiple level information per revolution of the crankshaft. To be able to determine the valve closing delay with sufficient accuracy, the sampling rate may correspond to an equivalent time of a crankshaft rotation of less than 5 degrees, or even 2 degrees or even 0.5 degree. As a sampling rate, the sampling rate may be faster than 5 millisecond or even 2 millisecond or even 1 millisecond.

During any calibration period, the change of level as well as the level fluctuation is larger when the tank has smaller horizontal section. This effect may be used to improve the sensitivity of the detection.

When considering Equation 7, it is useful to performed the calibration over a time corresponding to a integer number of revolution of the crankshaft. For each crankshaft revolution, a triplex pump theoretically takes three times the volume of one piston displacement from the suction supply. When the calibration time does not match an entire number of crankshaft revolution, then Equation 6 applies. The calibration procedure described in FIG. 4 may be performed for each triplex pump of the drilling rig system. Such procedures may have no (or limited) influence on the drilling process and may create limited loss of rig productive time.

Figure 5:
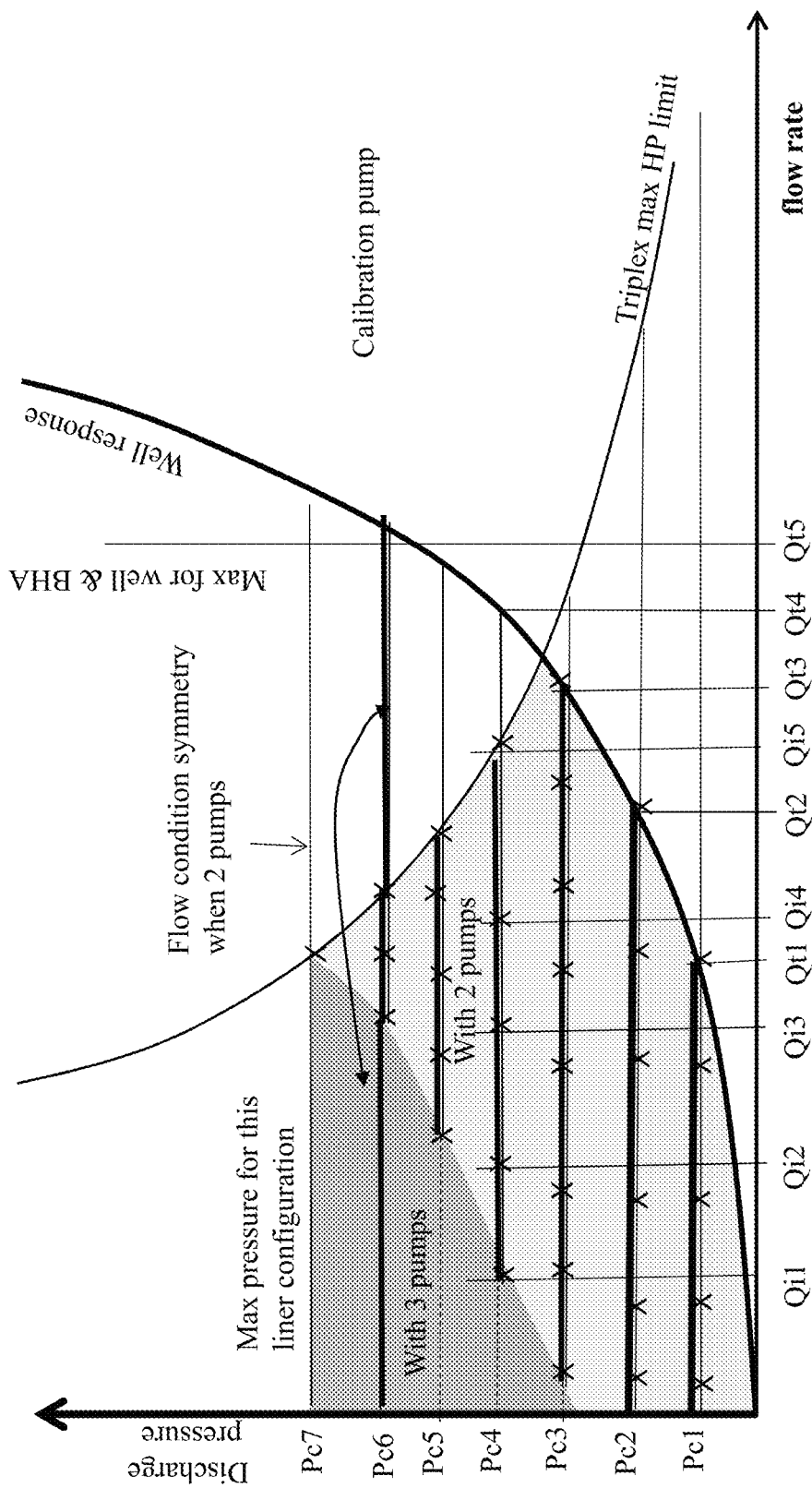
FIG. 5 shows a graph of the potential operating range of a triplex pump during a calibration process according to embodiments of the present disclosure.

Calibration of a triplex pump may be limited by a set of parameters of the overall drilling system. For example, FIG. 5 shows a potential operating range of a calibrated triplex pump. The discharge pressure depends mainly on the total flow rate through the well. As the majority of pressure loss occurs inside the drill string, the flow is mostly turbulent and the pressure increases nearly as a square function versus the total discharged flow rate. Several desired discharge pressures Pc from a calibrated triplex pump may be achieved for calibration cycles by imposing preselected total discharge flow rates Qt using all available triplex pumps in the system (i.e., the triplex pumps in the system not being calibrated). When an operating point (e.g., Pc1 and Qi1) has been selected, the calibration of one triplex pump (the calibrated triplex pump) may be performed, for example, where its flow rate is set for an adequate time to empty the calibration tank. The other available triplex pumps (i.e., the non-calibrated triplex pumps) in the system may provide the rest of the flow rate, such that a total discharge flow rate Qt is delivered from the triplex pump system.

This process may be repeated for the number of calibration points desired for the calibrated triplex pump at the selected discharge pressure Pc. For example, when the calibration of a calibrated triplex pump is performed at a discharge pressure Pc4 corresponding to a total discharge flow rate Qt4 through the well, the operating points for calibration may include Qi1, Qi2, Qi3, Qi4, and Qi5. However, the calibrated triplex pump would not be able to be calibrated with a flow rate higher than Qi5, as this would require higher power than the calibrated triplex pump can deliver under the operating ranges shown in FIG. 4. Further, the calibrated triplex pump would not be able to be calibrated with a flow rate lower than Qi1, as the non-calibrated triplex pumps in the system would have to produce too large hydraulic power to maintain Qt4 and Pc4 in the well under the operating ranges shown in FIG. 4.

The dark shaded portion in the graph represents the zone limiting the lower flow rate for calibration, and the lightly shaded zone represents the suitable operating ranges of the calibrated triplex pump. Additional limiting factors limit the range for calibration operating parameters, such as the maximum discharge pressure allowed by a given pump liner (or bore) size, and the max flow rate that the well and bottom hole assembly (BHA) may tolerate. Different systems (e.g., systems having different multiplex pumps, a different number of multiplex pumps in the system, and/or different well conditions) may have different ranges of operating parameters. For example, the dark shaded zone may be reduced or not present when three or more non-calibrated triplex pumps are available in the system.

Figure 6A:
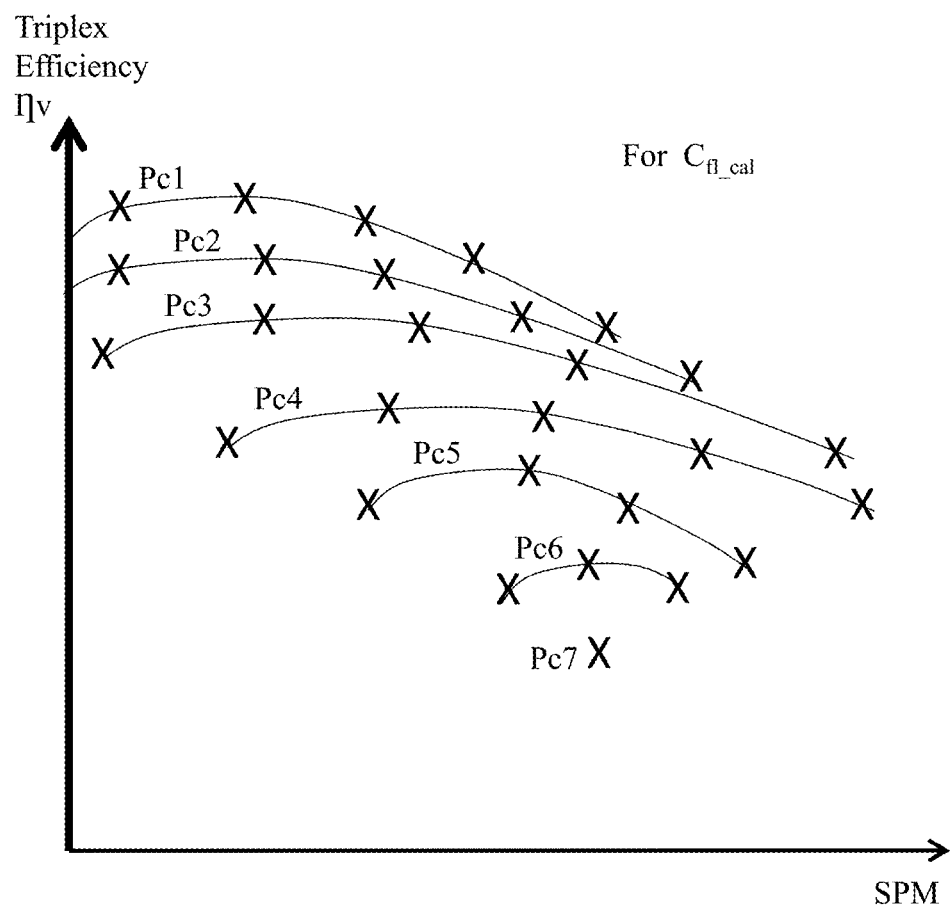
FIG. 6A shows a graph of volumetric efficiency determined from the calibration process of a triplex pump according to embodiments of the present disclosure.

For each calibration point (Pc, Qi), the triplex efficiency may be determined, as explained above, and plotted in a graph showing triplex pump efficiency as a function of crank shaft speed, such as shown in FIG. 6A. FIG. 6A is the display of the efficiencies obtained by the calibration period such as described in FIG. 4, while respecting the calibration range as described in FIG. 5.

As seen in FIG. 6A, for a given discharge pressure Pc, the volumetric efficiencies may be dropped slightly at relatively lower crankshaft speeds, which may be due to leakage in the calibrated triplex pump, and relatively lower volumetric efficiencies may be seen at relatively higher crankshaft speeds, which may be due to relatively higher effect of valve delay, such that the volumetric efficiency curves may have a bell shape as crankshaft speed increases. Further, as the given discharge pressure Pc increases (Pc1 being the lowest graphed discharge pressure and Pc7 being the greatest discharge pressure), the likelihood of leakage increases, and thus volumetric efficiency may be lower. Such estimated efficiencies of FIG. 6A from the calibration process may be related to a given fluid compressibility $C_{fl\_cal}$.

According to embodiments of the present disclosure, a system for pumping drilling fluid downhole using multiple triplex pumps may have one triplex pump being calibrated while all triplex pumps may provide fluid to the drilling process. With such procedure the total flow rate through the well may optionally be modified if the dependence of triplex efficiency on discharge pressure is characterized over a given range of discharge pressure. In some embodiments of a calibration method, one triplex pump may be used for calibration while the remaining triplex pump(s) in the system continue to pump drilling fluid downhole. After one of the triplex pumps has been calibrated, a second triplex pump may be calibrated while the other triplex pump(s) continue to pump drilling fluid downhole.

The external and internal leakages may depend on the discharge pressure, as the discharge pressure may force fluid through the leak areas (e.g., leaks through seals in the multiplex pump). The fluid properties may also affect the leak rate. For example, an increase of density or viscosity may reduce the leak rate.

After the calibration period of the multiple triplex pumps, valves (e.g., valves 132a-c and 162a-c shown in FIG. 1A) are set so that the multiple triplex pumps may take the fluid from the main fluid tank 110, while the calibration tank 150 may not be used. In the case of FIG. 1B, the three valves 132 of the main active tank may be opened. The "rig control system" 192 may perform the proper setting of these valves and also select the optimum operating conditions for the three triplex pumps 120a, 120b, 120c. Further, the rig control system 192 may select which triplex pump should be active (e.g., two versus three pumps) as well as the pump speed (strokes per minute, "SPM") per triplex pump.

During this pumping period, the flow rate of each triplex pump may be determined by using the SPM of each triplex pump, allowing determination of the nominal flow rate. The nominal flow rate may be corrected by the pump efficiency corresponding to the triplex pump. The pump efficiency may be obtained from the calibration data (such as displayed in FIG. 6). The selection of the pump efficiency may require the knowledge of the measured discharge pressure (e.g., from pressure sensor 142) in the discharge flowline 140. The total flow-rate discharged in the well is:

$$Qt = \Sigma Q_i \eta_i \qquad \text{Eq. 8}$$

where, Qt: total discharged flow rate in the discharge flowline $Q_i$: theoretical flow rate of triplex pump i, calculated from SPM and piston size; and $\eta_i$: volumetric efficiency of multiplex pump i, (obtained from calibration data such as shown in FIG. 6, based on SPM and discharge pressure).

Further, according to some embodiments, a triplex pump may be calibrated more than once, for example, to maintain validity of the triplex pump's determined efficiency. For example, in some embodiments, a triplex pump may be calibrated once a selected period, e.g., where a period may be selected from a number of days, weeks or months.

In one embodiment, the flow calibration method for the rig triplex pumps provides the triplex volumetric efficiency (e.g., FIG. 6A) versus pump speed and discharge pressure. This volumetric efficiency is influenced by the compressibility of fluid which limits the effective stroke to discharge fluid. In some embodiments, the multiplex pump efficiency can be corrected for the effect of fluid compressibility. The effect of fluid compressibility may be understood by observing FIG. 6B.

Figure 6B:
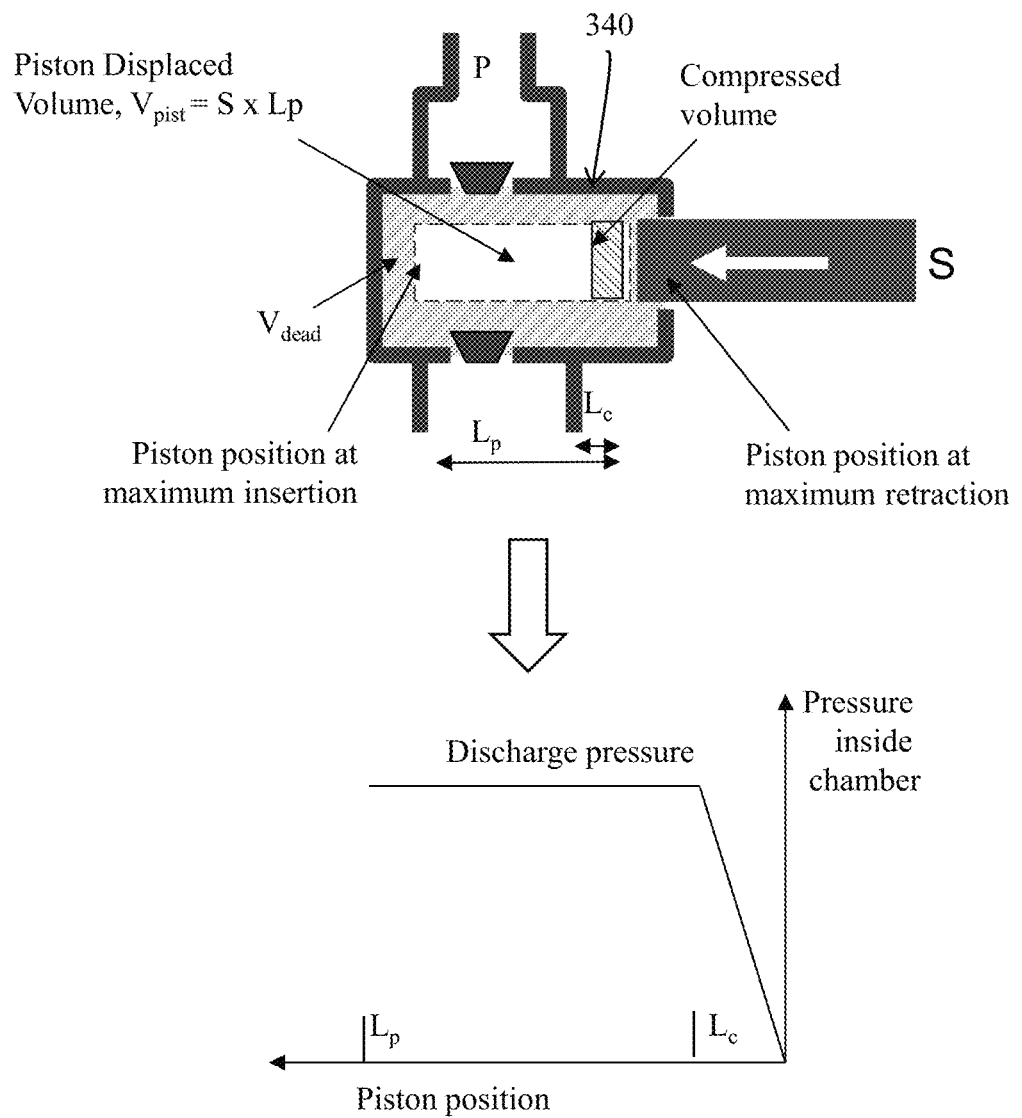
FIG. 6B shows a partial diagram of a multiplex pump showing the effect of pressure through the multiplex pump.

Referring to FIG. 6B, when considering the effect of pressure at the triplex pump, the discharge valve opens at the beginning of the discharge stroke, when the pressure in a multiplex chamber 340 has reached the same value as in the discharge flowline. During the initial displacement, fluid is being compressed inside the chamber 340. This initial compression stroke $L_C$ depends on the compressibility of the fluid, as well as the "dead volume," $V_{dead}$, in the pump chamber 340.

$$L_C = (1+k)L_p C_{fl} \times (P_{Disc} - P_0) \qquad \text{Eq. 9a}$$

Where, $L_C$: the stroke required to compress the fluid in the chamber 340, $k = V_{dead}/D_{displacement}$ $V_{dead}$: the dead volume of the chamber 340

$D_{displacement} = A\ L_p$ $L_p$: stroke of the piston

A: cross sectional area of the piston ($\pi\ D_{pist}^2/4$)

$P_{Disc}$: Pressure of discharge flowline $P_0$: The suction pressure. This pressure is the pressure generated by the centrifugal pump (e.g., in the range of 50 PSI). To simplify the global estimation, it may be considered as the reference pressure (where $P_0=0$), as this suction pressure is typically low in comparison with the discharge pressure.

$C_{fl}$: fluid compressibility

The equation may be simplified as:

$$L_C = (1+k)L_p C_{fl} \times P_{Disc} \qquad \text{Eq. 9b}$$

During the compression stroke $L_C$, the pressure increases linearly with the piston movement to reach the discharge pressure ($P_{Disc}$). The displacement of the compression stroke $L_C$ corresponds to a crankshaft angle θc obtained by Equation 1. The angle θc appears as a delay angle for the opening of the discharge valve.

The piston discharges the volume at the discharge pressure:

$$V_{hp} = (L_p - L_C)A = (\pi D_{pist}^2/4)(L_p - L_C) \quad \text{Eq. 10}$$
$$= (\pi D_{pist}^2/4)L_p[1 - (1+k)C_{fl}P_{disc})]$$

At the suction side, this volume corresponds to:

$$V_{suct} = V_{hp}(1 + C_{fl}P_{disc}) \quad \text{Eq. 11}$$
$$= (\pi D_{pist}^2/4)(Lp - Lc)(1 + C_{fl}P_{disc}) \quad \text{Eq. 12}$$
$$= (\pi D_{pist}^2/4)Lp(1 - (1+k)C_{fl} \times P_{Disc})(1 + C_{fl}P_{disc})$$

So, per stroke, the pumped volume from the suction flowline is reduced by:

$$\Delta V_{comp} = (\pi D_{pist}^2/4)Lp(1+k)C_{fl} \times P_{Disc}(1+C_{fl}P_{disc}) \quad \text{Eq. 13}$$

Written as a flow-rate reduction:

$$\text{Eff\_Compr} = \Delta V_{comp} SPM \quad \text{Eq. 14}$$
$$= Fa(C_{fl}, P_{disc}, SPM)$$

The volume $\Delta V_{comp}$ directly affects the triplex pump volumetric efficiency, as it appears as a reduction of volume per stroke. This effect depends on the fluid compressibility and the discharge pressure.

The effect of fluid compressibility may appear as a delay to opening the discharge valve. However, with compressibility effect, compression elastic energy is not stored in the discharge fluid and would be recovered as fluid expansion as the fluid returns to atmospheric pressure out of the well, thereby not affecting the delta-flow. In some embodiments, the fluid compressibility may be provided to a rig control system, which may be used to ensure that this effect is compensated for in the current pumping action. As described above, the rig control system may also have access to the discharge pressure (e.g., as measured by pressure sensor 142 in FIG. 1A). The fluid compressibility may be obtained by one of the following methods:
1. Direct measurement by pressure-volume-temperature ("PVT") cell (piston chamber and displacement+pressure).
2. Measurement of acoustic velocity in the fluid and calculation of compressibility (based on knowledge of the density). This can be obtained from P-wave propagation through the fluid or via pressure-wave travelling along a tubular such as signal or noise travelling along the mud flow pipes.
3. Weighted average of the compressibility of the main components of the mud (water, diesel, barite . . . ).

Figure 6C:
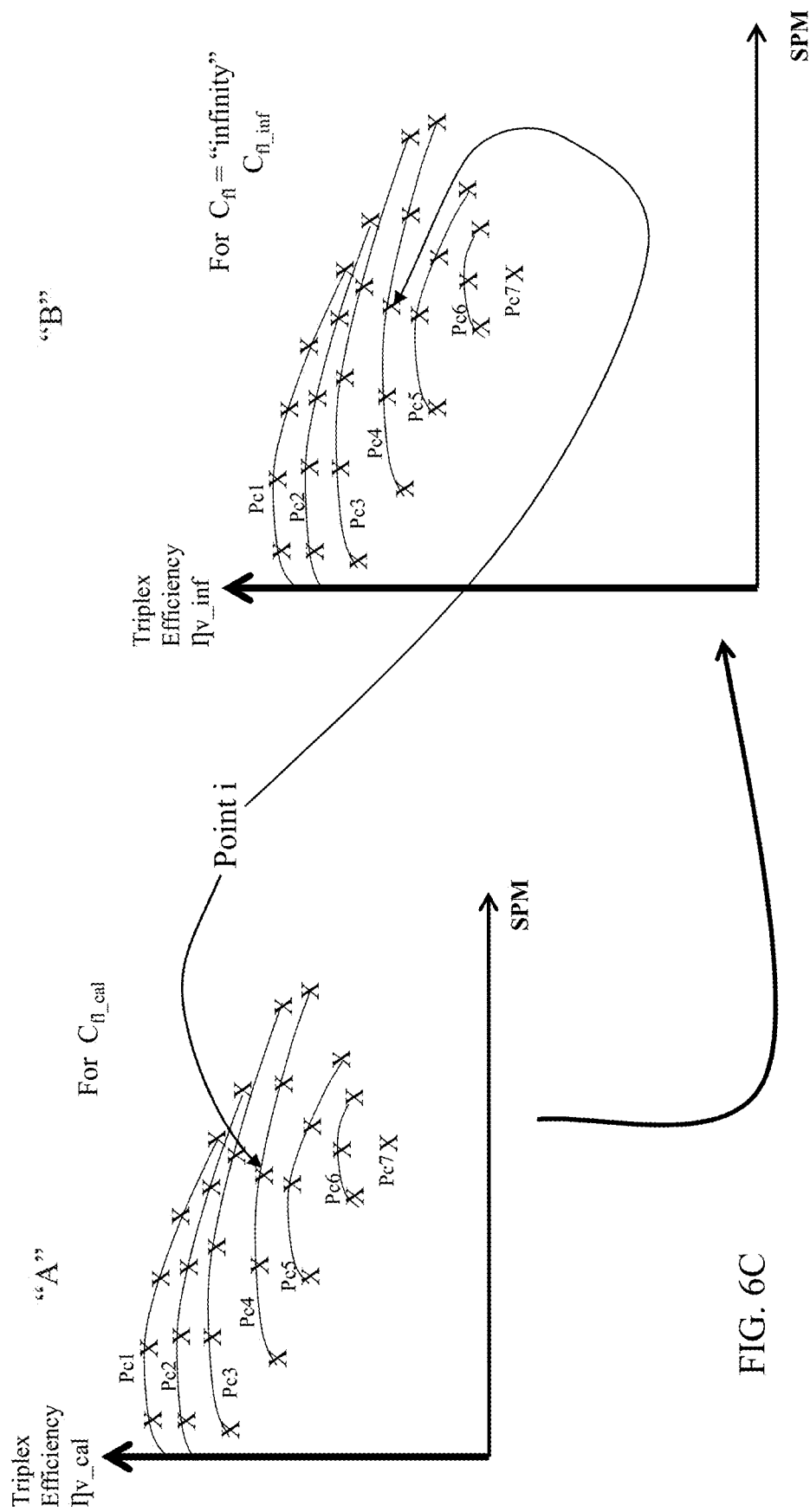
FIG. 6C shows a triplex efficiency curve corresponding to a given fluid compressibility $C_{fl\_cal}$ in Graph A that can be normalized for an ideal fluid, and after obtaining corrected efficiency for each point i, Graph B may be generated to show the efficiency performance of the multiplex pump for the ideal fluid.

For such embodiment, the calibration data of FIG. 6A may be linked to fluid compressibility $C_{fl\_cal}$ during the calibration period (by using the methods described above). This provides a graph of triplex efficiency $\eta_{v\_cal}$ related to the calibration with fluid of compressibility $C_{fl\_cal}$. As shown in FIG. 6C, the triplex efficiency curve of FIG. 6A corresponds to a given fluid compressibility $C_{fl\_cal}$ that can be normalized for an ideal fluid which would be not-compressible. In such case, $C_{fl}$="infinity."

Each point, i, of the calibration graph is defined by ($SPM_i$, $\eta_{v\_cal\_i}$, $Pc_i$), where the following procedure is applied:
A) Theoretical flow for point, i, of calibration is determined: $\text{Flow\_rate}_{Theo\_i} = K_{pump} SPM_i$
B) The true flow rate including efficiency is determined: $\text{Flow\_rate}_{true} = \eta_{v\_cal\_i} \text{Flow\_rate}_{Theo\_i}$
C) $\Delta V\text{comp}_i$ is defined (Eq. 13) using the fluid compressibility and pressure during calibration.
D) Computation of the corresponding flow if the fluid was incompressible is determined: $\text{Flow\_rate}_{Inf\ Com} = \text{Flow\_rate}_{true} + SPM\Delta V\text{comp}_i$
E) This allows calculation of the corresponding efficiency point for the ideal incompressible fluid:

$$\eta_{v\_inf\_i} = \text{Flow\_rate}_{Inf\ Com}/\text{Flow\_rate}_{Theo\_i} \quad \text{Eq. 15}$$

After obtaining this corrected efficiency for each point i, the graph B of FIG. 6C may be obtained and describes the efficiency performance of the multiplex pump for an incompressible fluid. Such graph can be produced immediately after the calibration cycle of each pump.

Figure 6D:
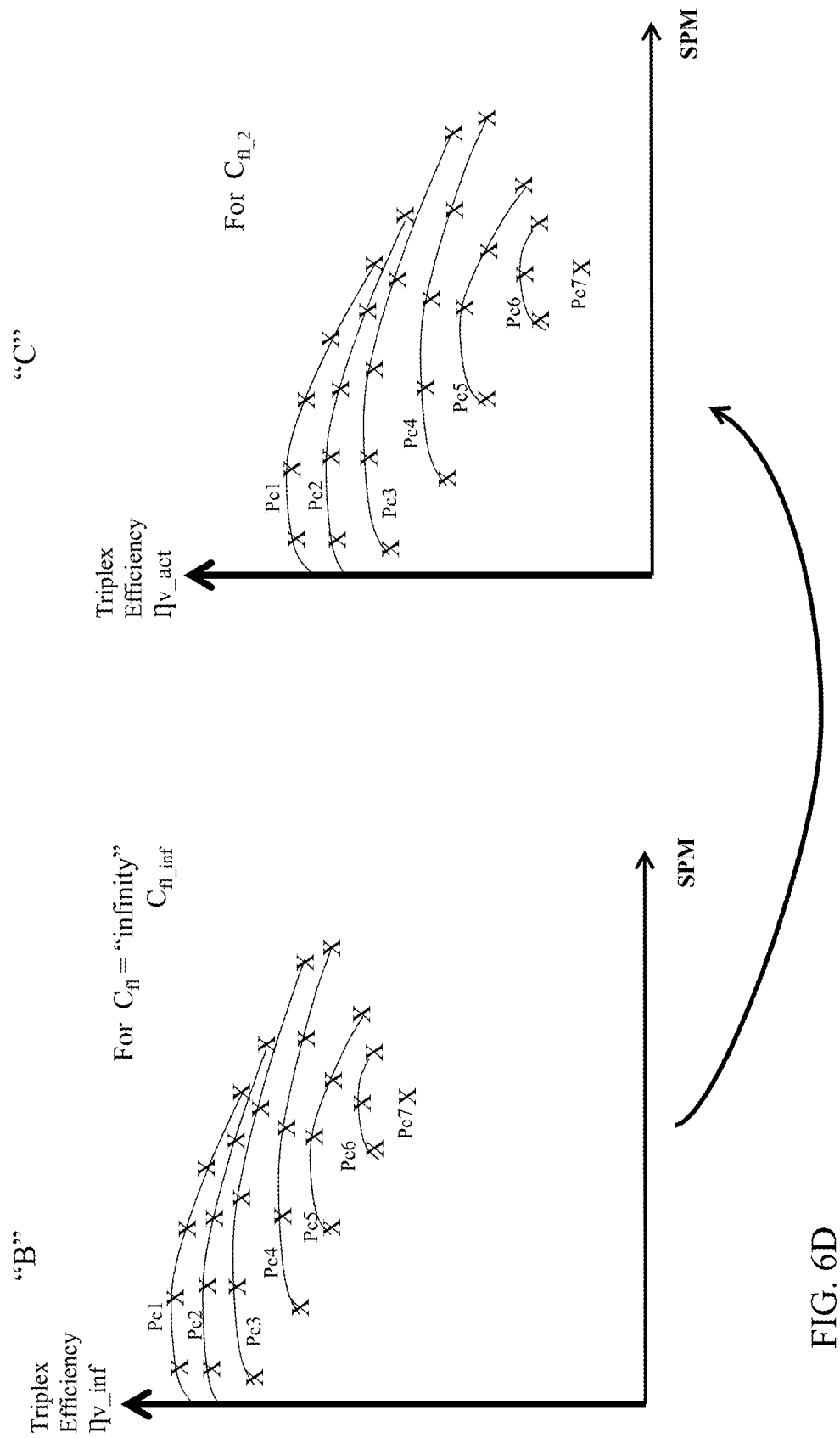
FIG. 6D shows Graph "B" from FIG. 6C corresponding to an incompressible fluid adapted to Graph "C" showing current fluid compressibility $C_{fl\_2}$.

Then (as seen in FIG. 6D) during a pumping sequence with several pumps, graph "B" corresponding to an incompressible fluid may be adapted to graph "C" showing current fluid compressibility $C_{fl\_2}$ This adaptation may be performed as soon as a new value of compressibility $C_{fl\_2}$ is obtained. The adaptation procedure may include the following:
A) Theoretical flow for point i of calibration is determined: $\text{Flow\_rate}_{Theo\_i} = K_{pump} SPM_i$
B) The true flow rate including efficiency is determined: $\text{Flow\_rate}_{true} = \eta_{v\_inf\_i} \text{Flow\_rate}_{Theo\_i}$
C) $\Delta V\text{comp}_{i\_Cfl2}$ is defined (Eq. 13) using the fluid compressibility $C_{fl\_2}$ and pressure for point i.
D) Computation of the corresponding flow if the fluid was incompressible: $\text{Flow\_rate}_{cfl\_2} = \text{Flow\_rate}_{true} - SPM \Delta V\text{comp}_{i\ Cfl2}$
E) This allows calculation of the corresponding efficiency point for the ideal incompressible fluid:

$$\eta_{v\_act\_i} = \text{Flow\_rate}_{cfl\_2}/\text{Flow\_rate}_{Theo\_i} \quad \text{Eq. 16}$$

Graph "C" may be used to determine the multiplex efficiency depending on SPM and pressure and for a fluid of compressibility $C_{fl\_2}$.

The volumetric efficiency may also be influenced by elements including leakage (external leakage at the piston seal and internal leakage at the valve seals) and closing delay at the valves, where fluid may return backwards in place of being pushed forward to the discharge. These elements are affected by different parameters of the fluid and pumping operation. In some embodiments, the control process may be characterized independently of these elements (or based on a defined time schedule) to allow continuous correction of the efficiency calibration, such as displayed in FIG. 6D.

As provided above, another condition affecting triple volumetric efficiency may include leakage at the piston seals and valve seals. Leaking at a piston seal may allow fluid to escape as soon as the piston is in discharged mode. Such leaked fluid will not be discharged into the discharge manifold, and thereby reduces the discharged flow-rate. This may be referred to as the "external leakage" effect. During the full rotation turn of the crankshaft, there are periods when two pistons are discharging and periods when a single piston is discharging (as shown in FIG. 3), which may be cause external leakage variation during one rotation.

Valve leaks may also affect the pumps efficiency, as fluid continuously returns across the valve when a difference in pressure is generated by the multiplex pump. This may be referred to as "internal leakage," as no fluid from the internal leakage is ejected out of the multiplex pump. Internal leaks may also reduce the discharge rate. Further, internal leakage may create a spike at the beginning of a stroke, as the piston must reach a sufficient speed so that instantaneous pumping action matches the leak rate.

Figure 7A:
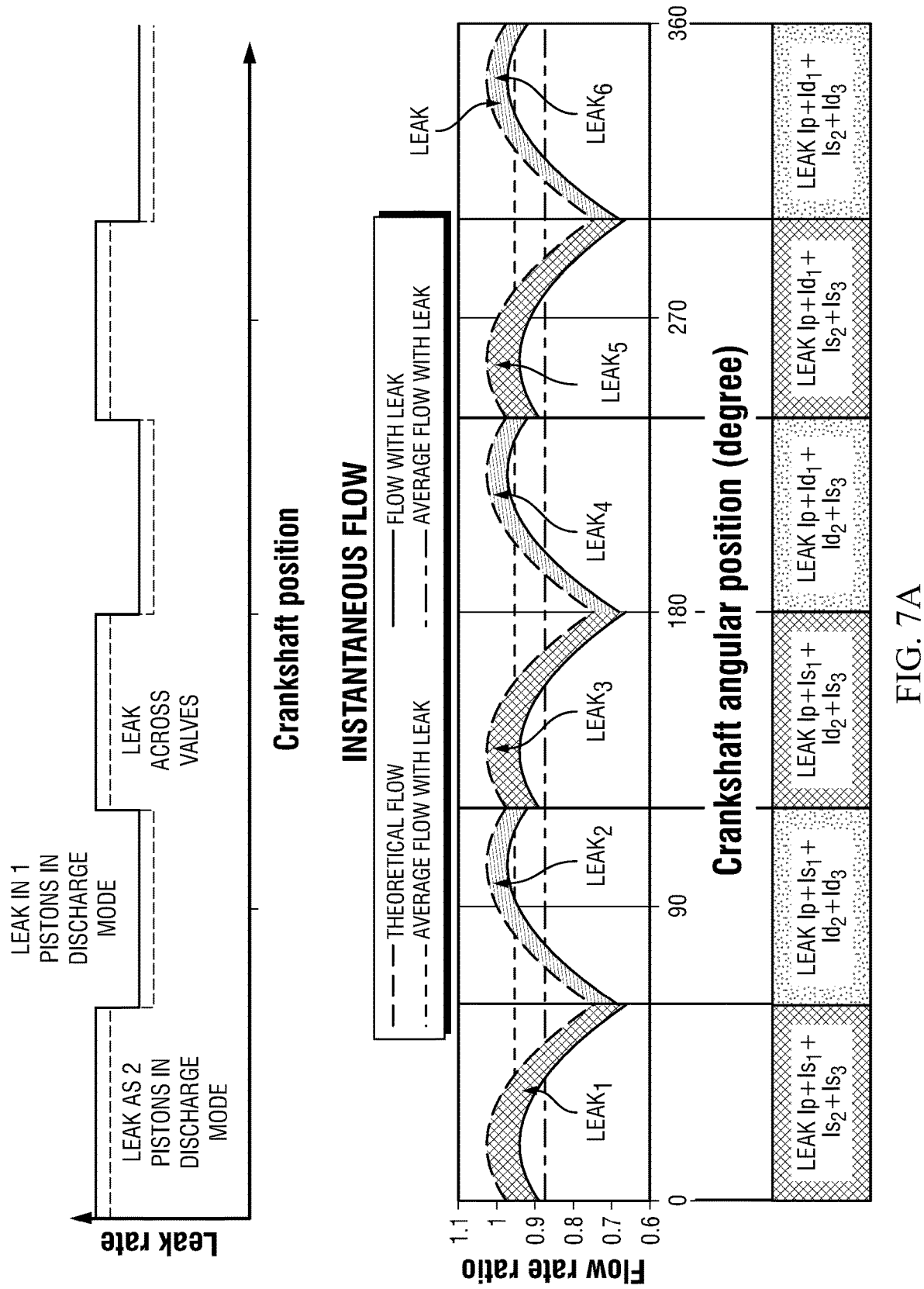
FIG. 7A is a graph showing the effect of leaks on flow discharge.

The effect on flow discharge of the leaks (external and internal leakage) is displayed in FIG. 7A. According to some embodiments of the present disclosure, the leak rate (from internal and/or external leakage) may be determined for a given pump while discharging fluid at a given pressure.

The leak rate (internal and external) primarily depends on the discharge pressure of the multiplex pump. The fluid density and viscosity may also influence the leak rate. During operation of a multiplex pump, one valve may be open for each chamber. However, when the multiplex pump is stopped, the valves may simultaneously hold the pressure, and it is unclear if the pressure is applied onto the piston.

Figure 7B:
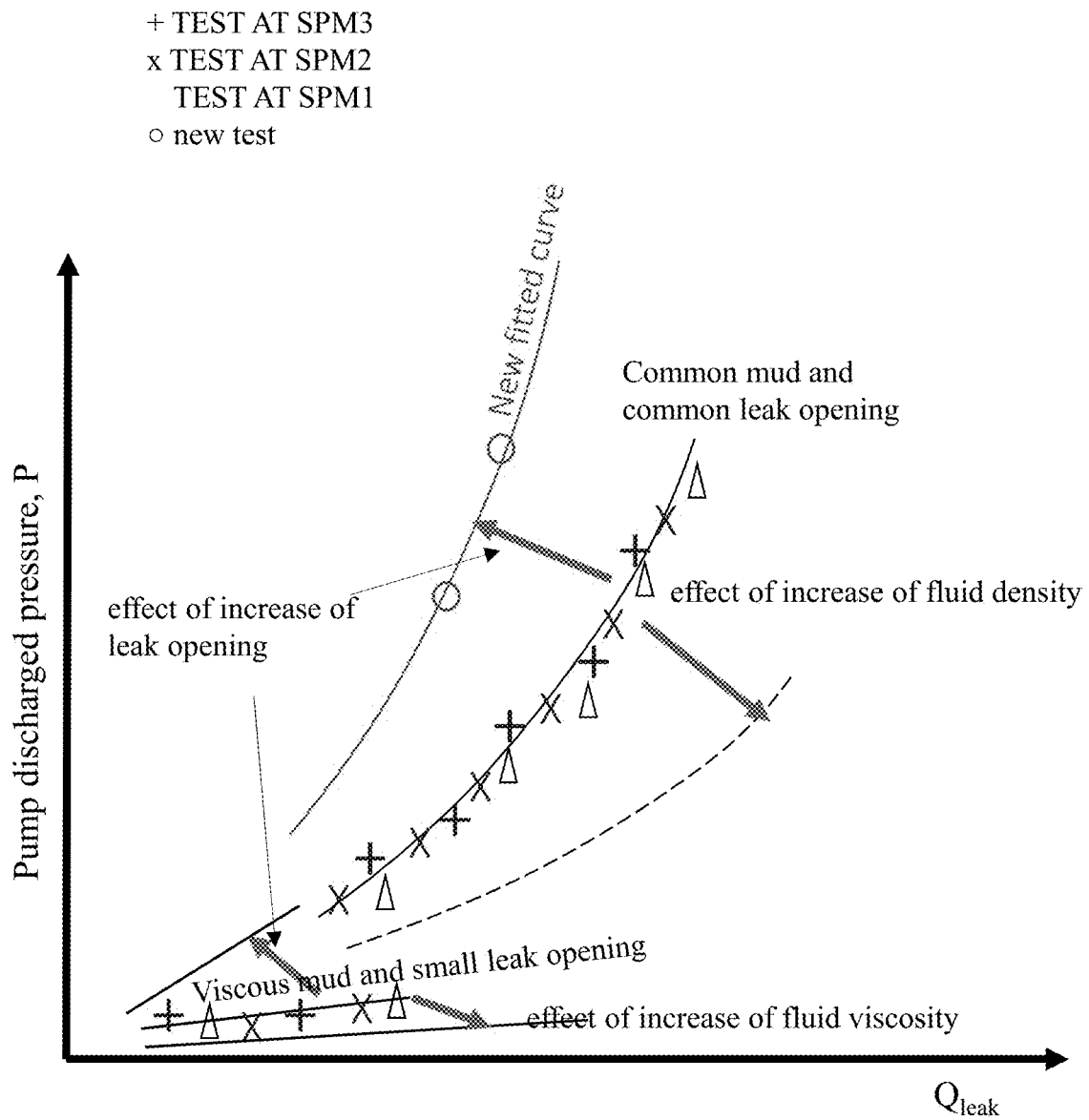
FIG. 7B is a graph showing leak rate versus discharge pressure.

In some embodiments, the leak rate may be considered as being steady for the multiplex pump and does not depend on the pump speed (FIG. 7A). In particular, at low speed, the effect of valve closing delay is minimized while the leakage effect is increased. When using the calibration period of FIG. 4 and the effect of valve closing delay is minimized, multiple leak rates may have been determined for a given fluid with the obtained results computed and plotted in a graph (e.g., as shown in FIG. 7A), and the corresponding time information may be plotted in a graph (leak-rate versus pressure), such as shown in FIG. 7B. A straight line and a parabola may then be fitted on the set of data. The fitting with the highest correlation factor may be selected as the best fitting.

When the parabola fitting is the selected solution and corresponds to the flow across a small orifice (the leak passage), a leak formula may be determined as follows.

$$P = K_1 Q_{Leak}^2 \qquad \text{Eq. 17}$$
$$P = K_{par} \rho Q_{Leak}^2$$
$$K_{par}\rho = K_1$$
$$\rho = \text{fluid density}$$
$$QLeak = \sqrt{\frac{P}{K_{par}\rho}}$$

After determining a leak rate formula for a given fluid, the leak rate can be continuously adjusted for that multiplex pump, based on the fluid density and the discharge pressure.

In the case of highly viscous fluid or a small leak opening, the leak flow may be laminar, in which case the relation P versus $Q_{leak}$ is linear.

$$P = K_2 Q_{Leak} \qquad \text{Eq. 18}$$
$$P = K_{lin} \mu Q_{Leak}$$
$$K_{lin}\rho = K_2$$
$$\mu = \text{fluid viscosity}$$
$$QLeak = \frac{P}{K_{lin}\mu}$$

Equations 17 and 18 may be considered as a function $Fb(\rho, \mu, P_{disc})$.

In such case, after determination of such leak formula for a given fluid, the leak rate can be estimated continuously based on the fluid viscosity and the discharge pressure.

A fitting may be performed on the data (as shown in FIG. 7B) corresponding to the data of the previous calibration period (process shown in FIG. 4), which may provide a graph of efficiency, as shown in FIG. 6A or 6D, for the given density ρ, viscosity μ and compressibility $C_{fl}$.

According to embodiments of the present disclosure, a change in the leak rate in a multiplex pump may be managed. After some elapsed pumping time, one or a few calibration points (e.g., from a short calibration process requiring operation of that multiplex pump at low SPM) may be performed at conditions similar to the initial calibration. The new leak rate may be determined, which may be used to define a new point combining $Q_{leak}$ and discharge pressure, P. The new points may be plotted in a graph as shown in FIG. 7B (new points). The coefficient of the curve fitting (either $K_{lin}$ or $K_{par}$) may be adjusted so that the new fitted curve is adapted on the new points.

The total leak rate is independent of the SPM. As the pump flow rate increases with the SPM, the relative effect of leakage may decrease exponentially with the pump flow rate. The leak effect on the volumetric efficiency may be provided from Equation 19.

$$\eta = 1 - Q_{leak}/Q_{pump} \qquad \text{Eq. 19}$$

Referring again to FIG. 2A, a level sensing system 252 may be disposed in the collection box 250 to measure the level or the volume of fluid collected therein. A control valve 262 may be provided along a flowline 264 in fluid communication with the collection box 250 to allow or prevent fluid flow through the flowline 264 towards a fluid source (e.g. a mud tank). For example, when a measured fluid level in the collection box 250 is too high or reaches a preselected level, a programmable logic controller ("PLC") may open the control valve 262 so that the extra fluid can be transferred out of the collection box 250. The PLC may continuously determine the level in the box 250 versus time when the valve 262 is closed. Using such method in association with a piston cleaning system may allow determination of the external leakage between the piston(s) 210 and the liner or bore 240. For example, by closing the valve 262, the jetting pump 260 may circulate the fluid of the tank 250 onto the piston(s) 210. The leakage around the piston(s) 210 increases the quantity of fluid in the box 250. The sensor 252 may detect this increase versus time, which may allow determination of the "external leak flow," $Q_{ext}$. This method may be used to account for one of the elements affecting the pump efficiency. With this method, the "external leak flow" ($Q_{ext}$) is the average for each of the pistons in the multiplex pump (e.g., average for three pistons in a triplex pump). Such determination may improve the performance tracking of the multiplex pump. In particular, when $Q_{leak}$ is known (as determined above) and $Q_{ext}$ is also know, the $Q_{int}$ may be determined. Such knowledge may be useful to optimize the operating condition of the multiplex pump.

Figure 7C:
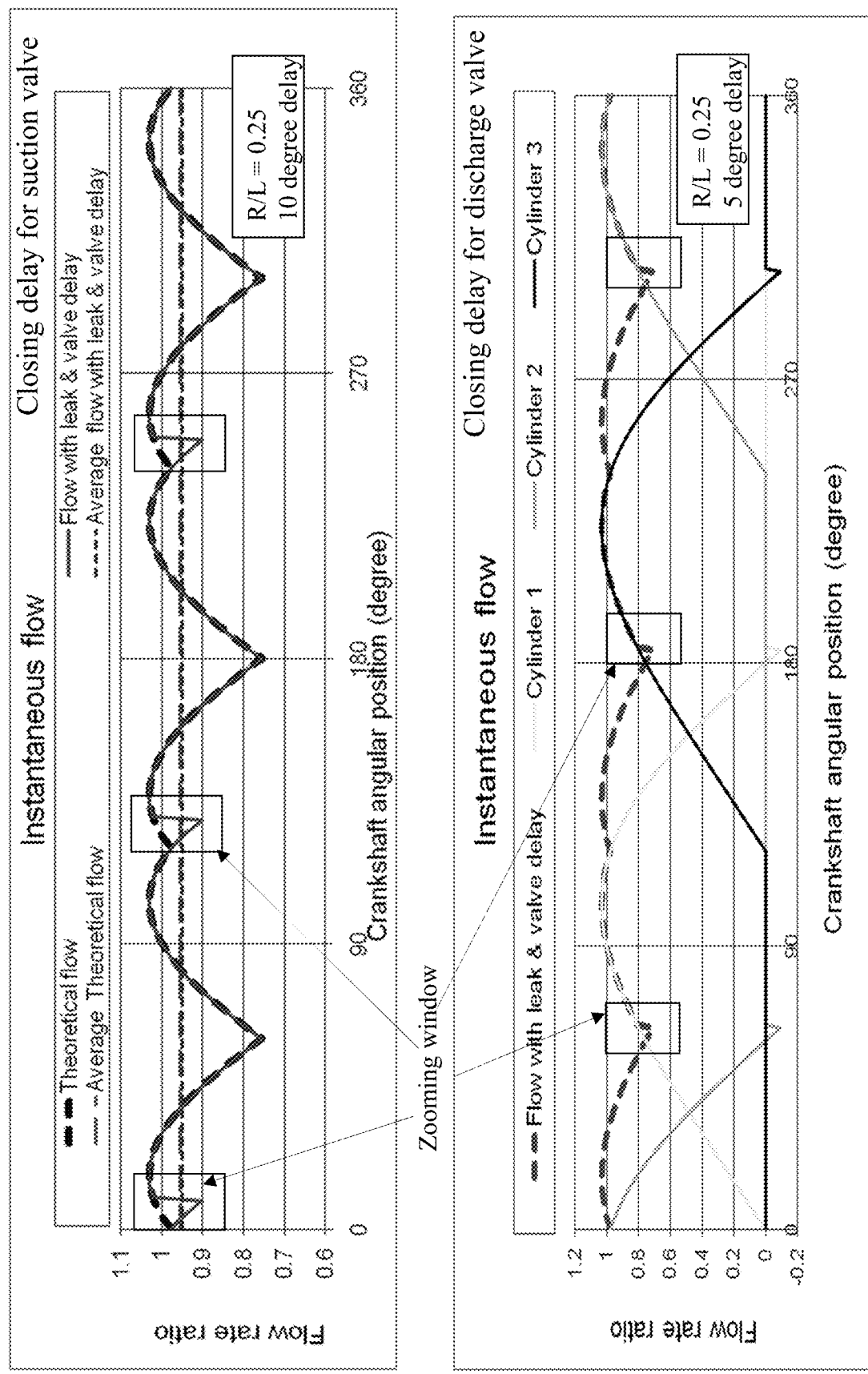
FIG. 7C shows multiplex pump behavior when the valves do not close instantaneously at the end of the suction stoke and the effect of closing delay for the discharge valves.

A multiplex pump efficiency may also be affected by closing delay of the valves, as the fluid may be pushed back around the valve when the piston starts the new stroke. FIG. 7C shows the corresponding multiplex pump behavior when the valves do not close instantaneously at the end of the suction stoke. When the pistons start the fluid expulsion stroke and when the suction valve is not yet closed, some fluid is pushed back into the suction line via the suction valve (e.g., 244 in FIGS. 2A-B). The suction valve must close first, then the piston can push fluid to lift the discharge valve (e.g., valve 242 in FIGS. 2A-B). This effect reduces the total pumped volume by the piston. In FIG. 7E, three suction valves of a triplex pump are operating with the same delay, creating the spikes in the instantaneous flow rate versus crankshaft position. This closing delay is due to the inertia of the suction valve and the limited force generated by the valve spring to close the suction valve. The closing delay position (in angle) increases with the speed of the pump, as the closing delay in time is the same (or even longer), while the stroke time is shorter.

FIG. 7C also displays the effect of closing delay for the discharge valves. In such situation, the discharge valve is still open when the piston starts the next stroke. When a closing delay is in a suction valve, fluid in the piston chamber (e.g., 240 in FIGS. 2A-B) is pushed back in the suction line, in place of being pushed towards the discharge line. When a closing delay is in a discharge valve, fluid form the discharge line re-enters into the piston chamber when the piston starts to move back. Closing delay for suction and discharge valves reduces the real pumped volume per rotation. A delay in suction valve opening may not affect the multiplex pump efficiency, as a charge pump (e.g., centrifugal pump 136 in FIGS. 1A-B) may limit this delay and also insure that the whole piston chamber is filled properly when the piston is fully retracted. For the discharge valve, no opening delay would be present if the fluid is considered incompressible.

Figure 7D:
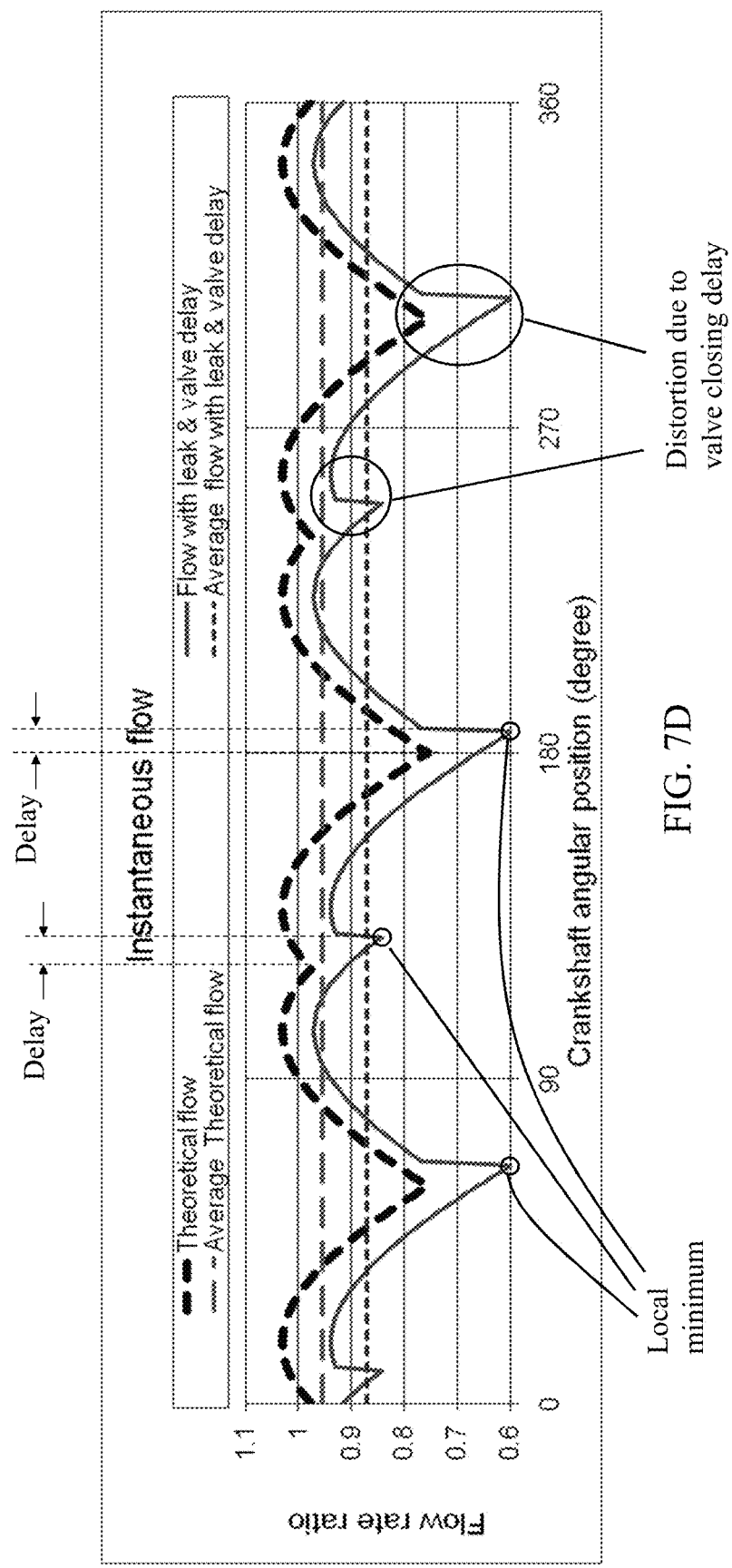
FIG. 7D shows a graph of the instantaneous flow of a multiplex pump according to embodiments of the present disclosure.
Figure 7E:
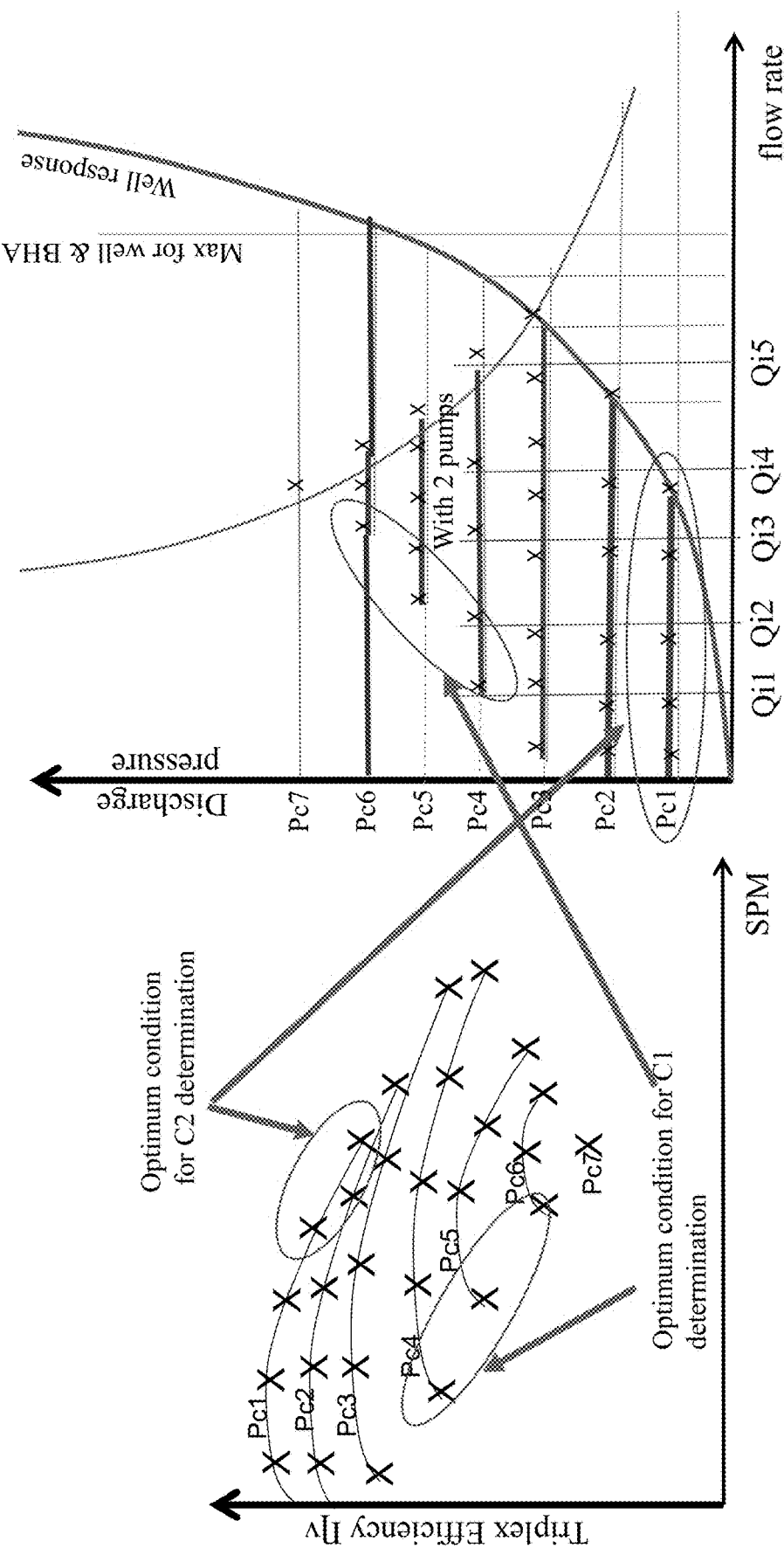
FIG. 7E graphically shows the relationship between multiplex pump efficiency and the potential operating range of the multiplex pump during calibration.

Valve closing delays may be observed in the time recording of the instantaneous flow (as shown in FIG. 7D). The flow function of FIG. 7D may be obtained as derivation versus time of the volume of the calibration tank (e.g., 151 in FIG. 1A) or buffer tank (e.g., 112 in FIG. 1B), when the valves 132a-c and 162a-c in the drilling system are set for calibration mode.

Specific digital processing may be performed near the point of closing of the valves (in relation to the crankshaft angular position) to determine the potential delays found in an instantaneous flow record (e.g., the instantaneous flow record of FIG. 7D). The valve closing point may be recognized as the minimum(s) of the graph such as shown in FIG. 7D. The corresponding angular position of these minimum may be compared to the theoretical position (when there is no valve delay), which may be used to determine the angular closing delay.

Such delays may be averaged over a number of strokes. The closing time, $T_{closing}$, depends on construction of the valve and spring: the closing time should nearly be a constant value for a calibration period, independent of SPM. In such case, the piston axial position may be calculated as follows.

$$\omega = 360 \text{ SPM}$$

$$\theta_{closing} = \omega T_{closing}$$

$$X_{closing} = R\{-\cos(\theta_{closing}) + (L/R)\sqrt{(1-R^2(\sin(\theta_{closing}))^2/L^2)}\} \quad \text{[from Eq. 1]}$$

The corresponding by-pass volume may then be determined from using Equation 1.

$$Vol_{by-pass} = A(X180 - X_{closing}) = A(R + L - X_{closing}) \quad \text{Eq. 20}$$

$$Rate_{by-pass} = Vol_{by-pass} SPM \quad \text{Eq. 21}$$
$$= Fc(T_{closing}, SPM)$$

FIG. 7E indicates the relationship between multiplex pump efficiency and the potential operating range of the multiplex pump during calibration. During the calibration period, the angle $\theta_{closing}$ may be determined for each of the calibration points included in the volumetric efficiency graph (such as shown in FIG. 6). A line may be fitted on the test points in a volumetric efficiency graph, where the slope of the line may provide the "theoretical" closing time.

After some pumping period, some additional calibration points may be gathered and added on the volumetric efficiency graph. The calibration points may be shifted, for example, due to aging of the spring, in which case, the by-pass volume for each stroke can be recomputed using Equation 15.

Further, after some pumping time, it is possible to adjust the multiplex efficiency in relation to change in valve closing performance. For each point of the volumetric efficiency graph, the volume of by-pass volume may be determined at the initial and later time by using Eq. 15. This is shown graphically in FIG. 7E.

According to embodiments of the present disclosure, for that "selected SPM", the calibrated multiplex pump efficiency may be corrected for a selected SPM using the following equation:

$$\eta_{later} = (\eta_{initial} K_{pump} \text{ SPM} + V1 \text{ SPM} - V2 \text{ SPM})/K_{pump} \text{ SPM} \quad \text{Eq. 22}$$

where $\eta_{later}$ is the new pump efficiency due to change of valve closing delay (after the currently estimated correction); and
$\eta_{initial}$ is the pump efficiency at the initial stage of the valve delay. This may be performed on the data of the calibration process such as described in FIG. 4.

FIG. 7D summarizes the consequences of these problems on the pump flow rate and shows that the multiplex pump efficiency is affected by "closing valve delay," "internal leakage" and "external leakage." To determine the volumetric efficiency of a multiplex pump, these three effects may be determined and possibly monitored versus time.

As explained herein, the effect of fluid compressibility can be removed from the overall efficiency by using Equation 15 (in relation to an incompressible fluid). After this compensation for fluid compressibility, the effect of leakage may be easily displayed when displaying the corrected efficiency versus the rotation period (from mathematical inverse of speed).

Supposing the pumping process of an incompressible fluid, the pump cycling time (period) is $T_{pump}$, the valves have an averaged angular closing delay $\eta_{closing}$, and that the leak rate $Q_{leak}$ is constant versus time, then leaked volume $V_{leak}$ per piston cycle may be calculated as follows:

$$V_{leak} = Q_{leak}(T_{pump} - \theta_{closing}/360 T_{pump})$$

Or (equivalent)

$$V_{leak} = Q_{leak} T_{pump}(1 - \theta_{closing}/360)$$

Or (equivalent)

$$V_{leak} = Q_{leak}(T_{pump} - T_{closing}) \quad \text{Eq. 23}$$

with $$T_{closing} = \theta_{closing}/360 T_{pump} \quad \text{Eq. 24}$$

It is often more convenient to characterize the valve closing process by $T_{closing}$ in place of $\theta_{closing}$, even if both are equivalent by Equation 24.

Also, the effect of the closing delay may be determined as volume not pumped per cycle, and defined previously as by-passed volume $V_{by\text{-}pass}$, shown in Equation 20.

The volumetric efficiency is equivalent to the true discharge volume per piston stroke versus the piston capacity, $$\eta_v = \text{Vol}_{discharge}/\text{Capacity} = (\text{Capacity} - V_{leak} - V_{by\text{-}pass})/\text{Capacity} \quad \text{Eq. 25}$$

Figure 7F:
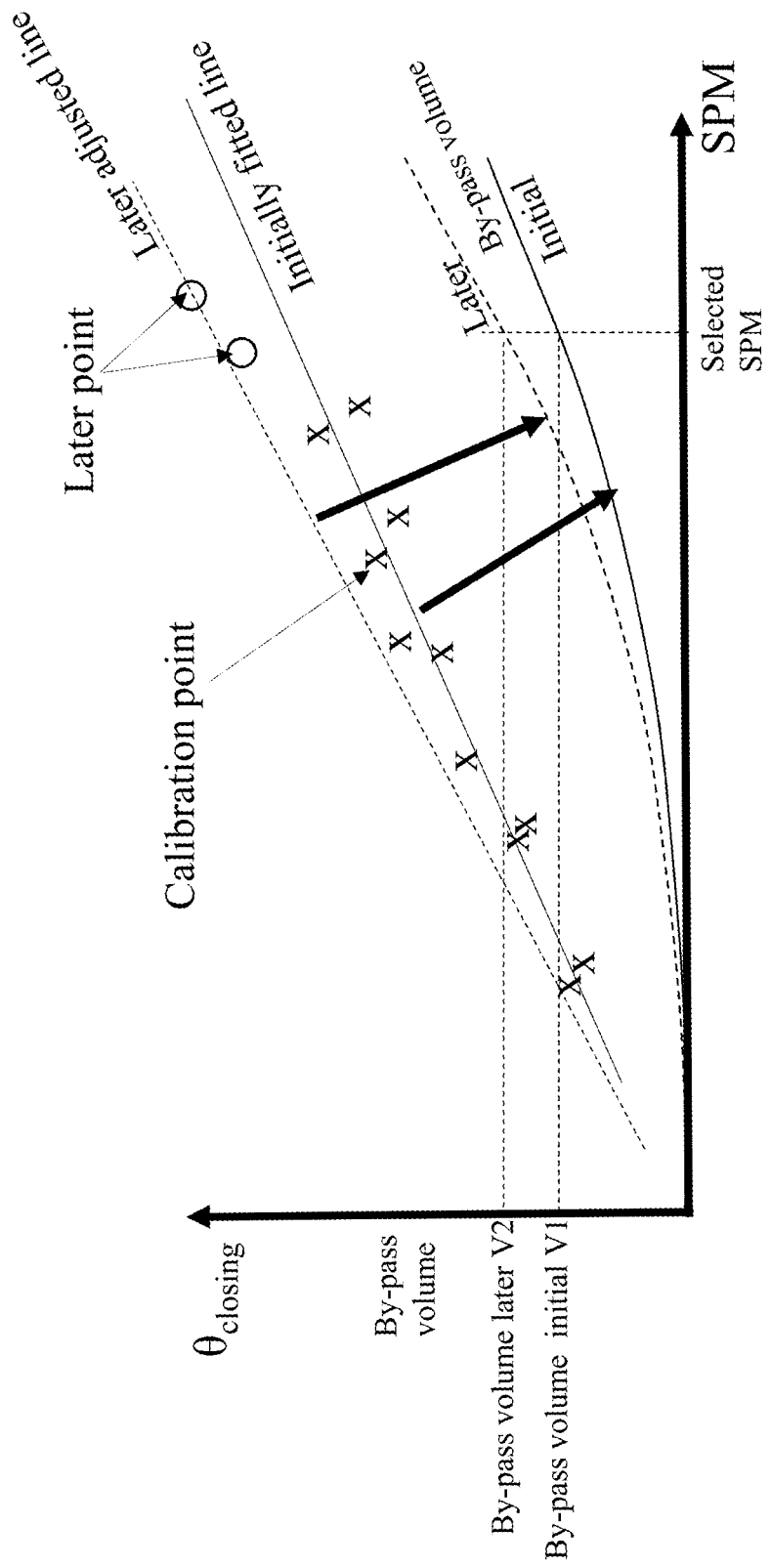
FIG. 7F is a graph showing closing delay versus pump speed of a multiplex pump according to embodiments of the present disclosure.
Figure 7G:
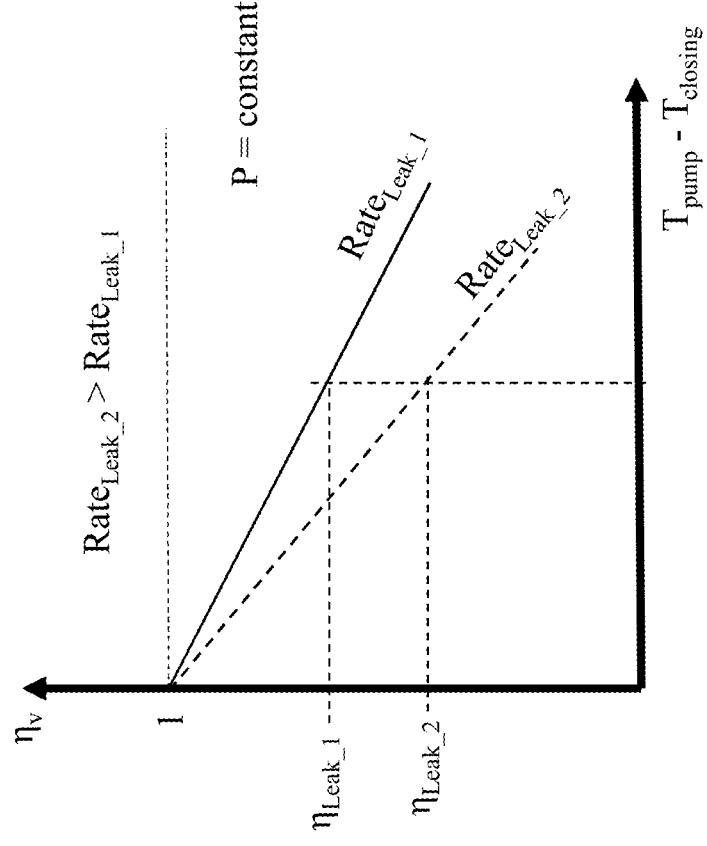
FIG. 7G includes a graph, Graph "D," showing a multiplex pump affected by valve closing delay but no leakage, and a graph, Graph "E," showing a piston pump affected by leak-rate and no effect of valve closing delay.
Figure 7G:
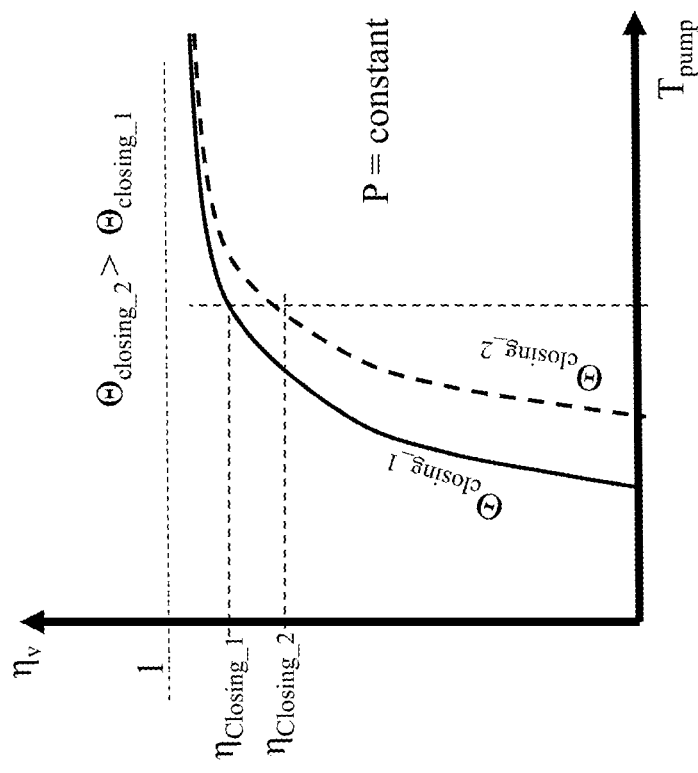

FIG. 7G indicates the following effects. Graph "D" refers to a piston pump affected by valve closing delay but no leakage. When considering Equation 20, it may be understood that the effect of closing delay on efficiency is more relevant for high speed operation, as the time (period) for one cycle is shorter. Also, the longer the closing delay, the larger the effect on efficiency. Graph "E" refers to a piston pump affected by leak-rate and no effect of valve closing delay. Graphs "D" and "E" are specific for one constant discharge pressure "P."

Figure 7H:
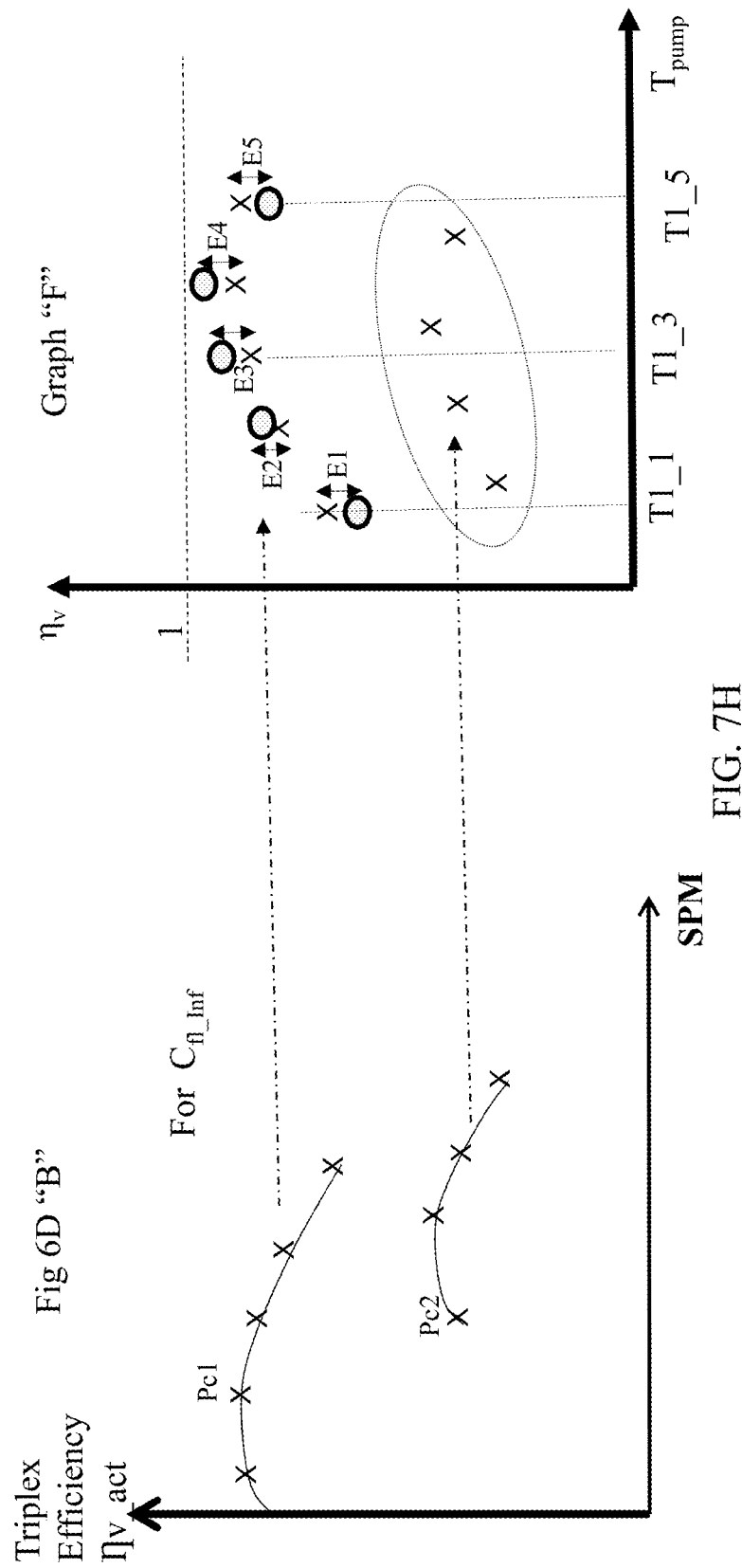
FIG. 7H shows data from a calibration normalized for an incompressible fluid in Graph B and plotted in a graph, Graph F, versus pump cycle time (period) in place of speed.

In practical terms, the data from a calibration (such as FIG. 6C) may be normalized for an incompressible fluid as explained above (and shown in Graph B), and may be plotted in a graph versus pump cycle time (period) in place of speed. This is shown in Graph "F" of FIG. 7H. Only the data related to two specific discharge pressures Pc1 and Pc2 are displayed. The following processing is performed by using the data of selected discharge pressure.

Iteration is performed for multiple values of hypothetical leak rate $Q_{leak\_Hypo}$ and hypothetical angular closing delay $\theta_{closing\_hypo}$. The range of the value for these two parameters is pre-determined, and the number of iteration may also be predetermined. Then, for each iteration "K" and the pair of hypothetical parameters, the efficiency can be determined by Equation 24 for each $T_{1-n}$ of the calibration data set obtained from Graph "B." These corresponding hypothetical data are displayed in Graph "F."

The mean error between the real data from calibration and hypothetical data can be obtained from Equation 26.

$$\text{error}(k) = \sqrt{(E1^2 + E2^2 + + En^2)} \quad \text{Eq. 26}$$

The iteration may be performed on hypothetical pairs from 1 to M, providing a vector of error (j) of M values. The range of angular valve closing delay could be from 0 to 30 degrees or from 0 to 45 degrees. The range from leak-rate could be defined as a proportion of the maximum flow rate of the pump. For example, for a multiplex pump capable to deliver up to 1000 GPM, the leak for all pistons could be considered less than 10% or 100 GPM.

The smaller error is selected, and the corresponding hypothetical pair of parameters may then be selected as the answer to the fitting providing $Q_{leak\_fit}$ and hypothetical angular valve closing delay $\theta_{closing\_fit}$. These parameters correspond to the multiplex pump performance at the time of the calibration.

The data set for such processing may be a full calibration involving multiple data points for each discharge pressure. However, the data set may be limited to a few data points in case of partial calibration.

If the fitting is performed for multiple levels of discharge pressure, then $Q_{leak\_fit}$ is a set of data depending on discharge pressure. This set of $Q_{leak\_fit}$ (n) may then be processed as described above (in relation to FIG. 7B) using the dependence on fluid density (described by Equation 17) or the fluid viscosity (described by Equation 18).

If the leak is considered as depending on fluid density and pressure, the second level of fitting on $Q_{leak\_fit}$ (n), then $$QLeak = \sqrt{\frac{P}{Kpar\rho}} \quad \text{(Eq. 17)}$$

This allows determination of $K_{par\_\rho}$. Further, this allows prediction of the leak rate even when the pressure and fluid density change with time. Similar methods may be used if the leak depends on Equation 18 (versus fluid viscosity).

The overall process may be defined as follows:

CALIBRATION sequence:
Pump calibration process versus flow rate and pressure;
Obtaining the fluid properties (compressibility, density or viscosity);
Organizing the data to obtain the graph of efficiency versus SPM for different pressure;
Normalization of the graph of efficiency for incompressible fluid;
Conversion of the normalized graph of efficiency to obtained the graph of efficiency versus pump period (and for various discharge pressure);
Minimizing the error to obtain $Q_{leak\_fit}$ and $T_{closing\_fit}$;
Calculation of $K_{par\_\rho}$ or $K_{par\_\mu}$;

PUMPING PERIOD: perform continuously the following loop.
Pump and measured SPM, discharge pressure;
Obtain a different interval the fluid compressibility and density/or viscosity;
Calculate the current efficiency, Process "A":
　Determine the reduction of capacity due to the valve closing delay (as time) corresponding to the current pump period;
　Determine the leak-rate form the fluid properties, discharge pressure and difference of time ($T_{pump} - T_{closing\_delay}$);
　Calculate the reduction of capacity due to valve leak;
　Calculate the corresponding efficiency (supposing an incompressible fluid);
　Apply the mathematical process to include the effect of fluid compressibility on efficiency and obtain the actual efficiency $\eta_{actual}$;
Correct the pump discharge flow rate by this final pump efficiency VERIFICATION PERIOD:
Perform short calibration data acquisition from the calibration tank for K pumping conditions;
Obtain a few points of efficiencies by comparing the pumped volume from the acquisition tank to the theoretical pumped volume, referred to as verification efficiencies (or $\eta_{verif\_k}$), where there are as many values (index K) as the performed verification points;
On the result of K pumping conditions, apply the calculation method to obtain the actual_efficiency;
Calculate the ratio of $\eta_{verif\_k}/\eta_{actual}$;
If the average of the ratio $\eta_{verif\_k}/\eta_{actual}$ over the K condition is larger than a pre-determined threshold, perform a new full calibration sequence.

In another embodiment, the definition and effect of the fluid compressibility and density or viscosity may be defined as follows:

Mathematical corrections have been proposed for the three types of elements affecting the efficiency of the multiplex pump. To determine flow-rate reduction, the following functions are available.

Compression effect ⇔ Eq. 14=Function Fa($C_{fl}$, $P_{disc}$, SPM)

Leak rate ⇔ Eq. 17 (or 18)=Function Fb($\rho$, $\mu$, $P_{disc}$)

Closing delay effect ⇔ Eq. 21=Function Fc($T_{closing}$, SPM)

By combining these effects, these relationships may match the volumetric efficiency of the triplex pump (obtained by calibration). Function Fa($C_{fl}$, $P_{disc}$, SPM) may be relatively easily estimated, as the only input is the fluid compressibility, which may be based on direct external measurements not related to the triplex pump. Functions Fb($\rho$, $\mu$, $P_{disc}$) and Fc($T_{closing}$, SPM) may be deduced from flow estimation obtained from a level sensor in a calibration tank. The data of the functions Fb($\rho$, $\mu$, $P_{disc}$) and Fc($T_{closing}$, SPM) may be physically modeled into a relatively linear representation, while the reality may present some none-linearity. The relationships of the three functions Fa, Fb, and Fc allow calculation of the estimated volumetric efficiency, as follows.

$$\eta_{esti} = \frac{\left\{K\ SPM - Fa(C_{fl}, P_{disc}, SPM) - C_{match}\left[\begin{array}{c}F_b(\rho, \mu, P_{disc}) + \\ F_c(T_{closing}, SPM)\end{array}\right]\right\}}{K\ SPM} \qquad \text{Eq. 27}$$

Which can be re-written as $$\eta_{esti} = 1 - \frac{\left\{Fa(C_{fl}, P_{disc}, SPM) + C_{match}\left[\begin{array}{c}F_b(\rho, \mu, P_{disc}) + \\ F_c(T_{closing}, SPM)\end{array}\right]\right\}}{K\ SPM} \qquad \text{Eq. 28}$$

where K is the theoretical pumped volume per revolution; and $C_{match}$ is a calculated coefficient to allow best match between this estimated efficiency and the efficiency obtained from calibration.

For each point of a volumetric efficiency graph (e.g., FIG. 6A), the following ratio can be determined:

Ratio=$\eta_{esti}/\eta_{cal}$

This Ratio should ideally be close to 1, allowing determination of $C_{match}$ per point of calibration. In a first operating method, the final value of $C_{match}$ may be considered as the average of the Ratios determined for each calibration point. The Average Ratio may be referred to as $C_{match\_av}$. Determining the Average Ratio may allow a match between the calibration and the mathematical models of the three above-discussed elements affecting the efficiency of the multiplex pump. Such Average Ratio, $C_{match\_av}$, may be determined after calibration involving multiple points.

In a second operating method, with the introduction of two coefficients to determine (C1 and C2).

$$\eta_{esti} = 1 - \frac{\{Fa(C_{fl}, P_{disc}, SPM) + C1F_b(\rho, \mu, P_{disc}) + C2F_c(T_{closing}, SPM)\}}{K\ SPM} \qquad \text{Eq. 29}$$

The coefficient C1 may be determined by running calibration points at fair (or high) pressure and low speed. In such case, Fc would be considered "null." The Ratio "$\eta_{esti}/\eta_{cal}$" may be set to 1, which may allow determination of C1. The coefficient C2 may then be obtained by running a calibration test at high SPM and low pressure. Equation 29 may be used with the already defined value of C1. When considering all possible points of calibrations, FIG. 7G indicates the optimum operating conditions to determine C1 and C2.

During a long pumping operation involving a multiplex pump, multiple periods without flow may be common. At each start/stop transition, a few points of calibration verification may be performed on one or more multiplex pumps. These verifications may provide the input for the corrections for three above-discussed elements affecting the efficiency of the multiplex pump (fluid compressibility effect, leak rate, and closing delay effect). The application of these corrections may allow for the total elapsed time between multiple-points calibration to be extended.

The knowledge of the fluid properties (such as density, viscosity and compressibility) may allow for the adaptation of the results of the initial calibration. Furthermore, by performing a few verification points at each start/stop transition, it may be possible to verify if the results of the initial calibration are still adequate versus the newly obtained data. If not, the previous model based on Equation 29 may be used to stretch the initial data set. FIG. 7F shows a graphical representation of this aspect.

Figure 8:
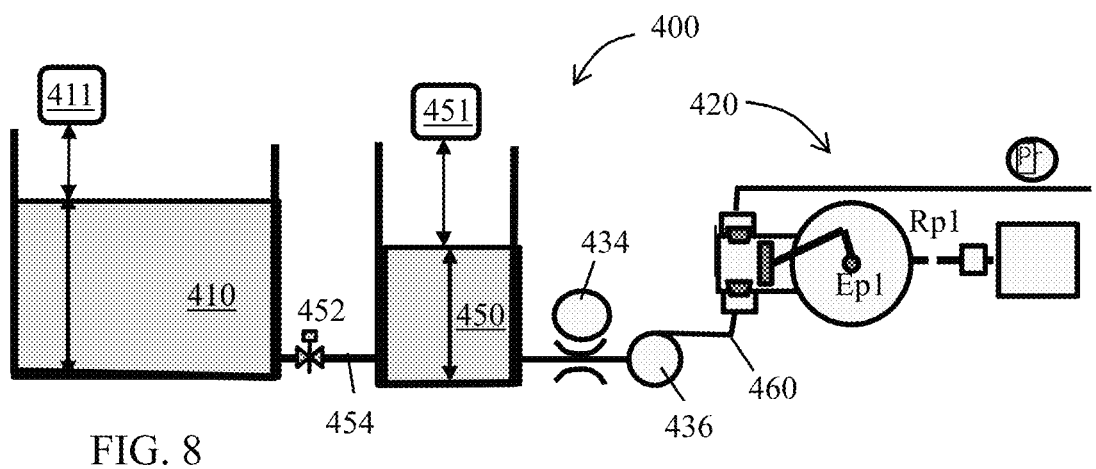
FIG. 8 shows a diagram of a system according to embodiments of the present disclosure.

According to embodiments of the present disclosure, a change in apparent fluid viscosity may be determined from a filling time of a calibration tank during one or more calibration processes. For example, FIG. 8 shows a system 400 according to embodiments of the present disclosure having a fluid source 410 with a level sensor 411 disposed therein, the fluid source in fluid communication via a refill flowline 454 with a calibration tank 450 having a level sensor 451 disposed therein, where a valve 452 is disposed along the refill flowline 454. A calibration flowline 460 extends from the calibration tank 450 to a triplex pump 420, where a flow meter 434 and a pump 436 may be disposed along the calibration flowline 460. Based on an analogy of charging a capacitor (and assuming viscosity dissipation between the fluid source 410 and the calibration tank 450), the process for refilling a calibration tank 450 may be represented by Equation 30.

$$Lv2(t) = Lv2(t=0) + (Lv1 - Lv2(t=0))(1 - \exp(-Kt\rho/\mu)) \qquad \text{Eq. 30}$$

where Lv2 is the level of the calibration tank 450, Lv1 is the level of the fluid source 410, t is time, and K is a parameter which depends on the geometry of the system, including flowlines and the calibration tank. When the density $\rho$ of the fluid is known, the apparent viscosity $\mu$ may be determined.

A multiple step calibration process may include refilling a calibration tank after each step (e.g., Lcal1, Lcal2, Lcal3 and Lcal4) of the calibration process. After a refilling, a short period of steady pumping at the last calibrated condition may be performed to determine the steady difference of fluid level ($\Delta L$) corresponding to the flow rate. The determined $\Delta L$ may be related to an estimation of apparent fluid viscosity, which may be used to correct the $\Delta L$ if the fluid viscosity is changed. A determination of $\Delta L$ versus flow rate may be performed at different positions of a valve (e.g., open, closed, partially open), such as valve 452 along the refill flowline 454 shown in FIG. 8, which may increase the accuracy of $\Delta L$.

Figure 9:
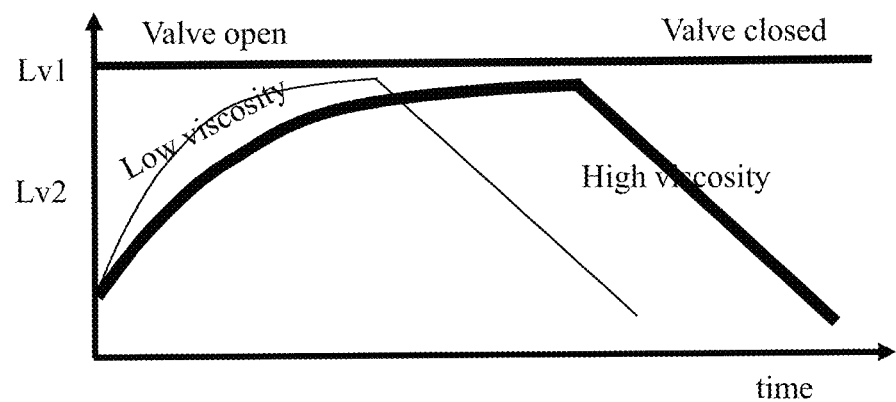
FIG. 9 shows a graph of the relationship between the fluid level over time for a calibration process to determine apparent viscosity according to embodiments of the present disclosure.

FIG. 9 shows an example of a graph of the relationship between the fluid levels in the fluid source tank (Lv1) and calibration tank (Lv2) over time, and how the relationship may be used to determined apparent viscosity of the fluid from the system 400 shown in FIG. 8 during a calibration process. As shown, when the valve 452 is open, a steeper upward slope in the refilling of the calibration tank 450 may indicate a relatively lower viscosity, and a shallower upward slope in the refilling of the calibration tank 450 may indicate a relatively higher viscosity.

Figure 10:
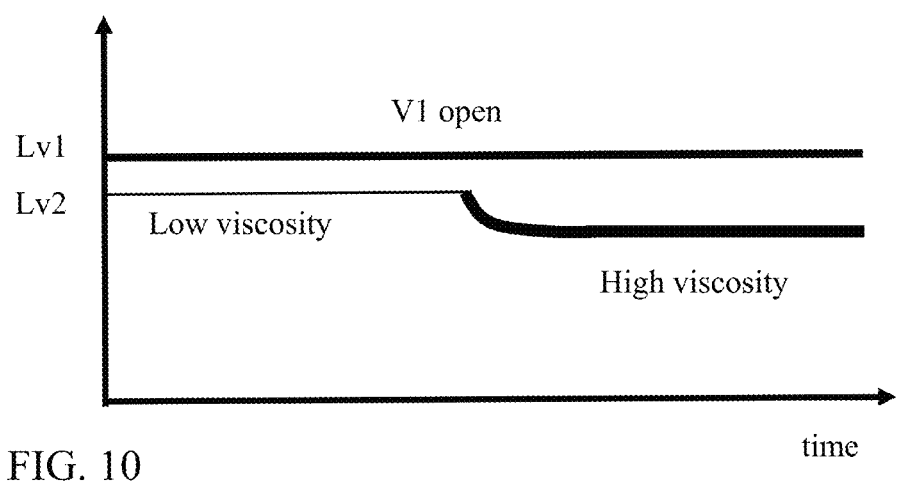
FIG. 10 shows a graph of the relationship between fluid level over time for a pumping process to determine apparent viscosity according to embodiments of the present disclosure.

FIG. 10 shows an example of a graph of the relationship between fluid levels in the fluid source tank (Lv1) and calibration tank (Lv2) over time, and how the relationship may be used to determined apparent viscosity of the fluid from the system 400 shown in FIG. 8 during a pumping process. As shown, the valve 452 may remain open during the pumping process. A relatively steady flow between the fluid source 410 and calibration tank 450, where the fluid level in the calibration tank (Lv2) remains approximately the same (or slightly lowers) over the time of the pumping process, may indicate a relatively lower viscosity of the fluid. When the fluid level in the calibration tank (Lv2) dips to a lower level, a relatively higher viscosity may be indicated.

Figure 11:
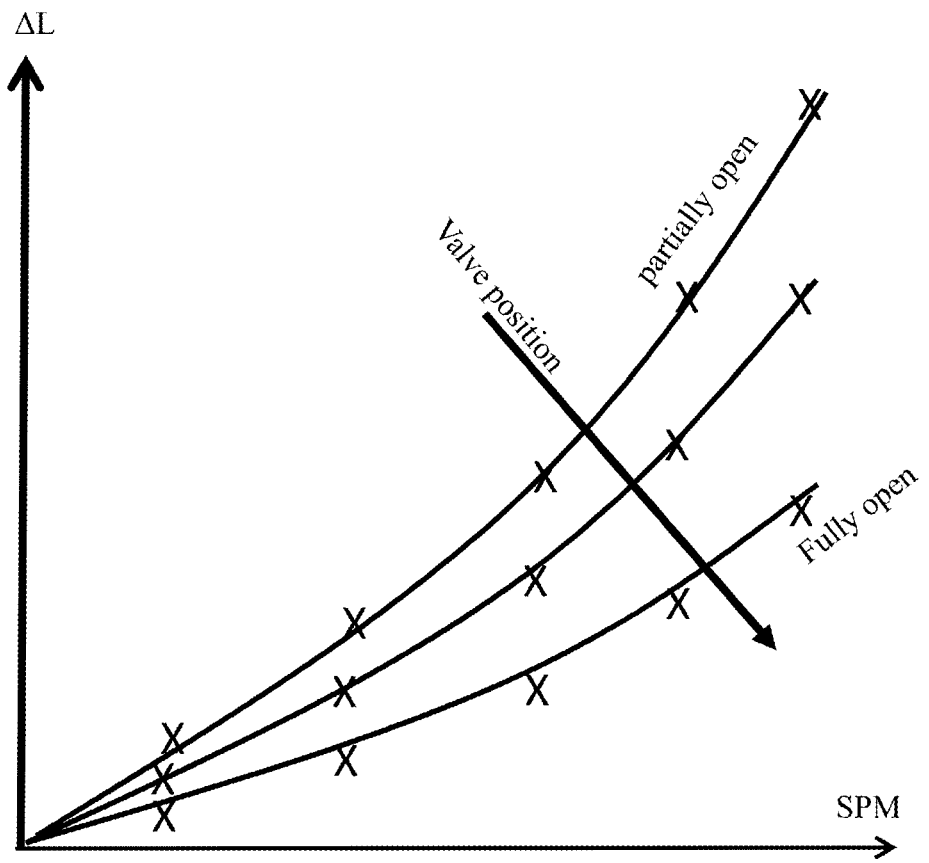
FIG. 11 is a graph showing the relationship between the change in the fluid levels in the fluid source and calibration tank at different pump speeds and different valve positions.

After the calibration period of the triplex pump 420, the relation between ΔL and the flow rate and valve 452 position may be recorded, such as shown in FIG. 11. The graph shown in FIG. 11 shows the relationship between the ΔL in the fluid levels in the fluid source and calibration tank at different triplex pump speeds, SPM, and a different valve 452 positions (including a partially open position, a greater partially open position, and a fully open position). Further, by graphing the relationship between ΔL and pump speeds for different valve positions, it is shown that the accuracy in determining ΔL and apparent viscosity may be improved/increased at faster flow rates. As shown, at low speeds, the ΔL for partially and fully open valves are close in value, whereas at high speeds, the ΔL for partially and fully open valves are greater apart.

When considering the suction valve, the pressure may not build in the multiplex pump chamber as long as the suction valve is open, which may generate delay in the appearance of force on the piston, as well as torque on the crankshaft. When the suction valve is closed, pressure may build in the chamber, and force on the piston and torque on the crankshaft may appear. A delay in torque applied to the crankshaft means the overall torque over a pump cycle is reduced. Because each of the three pistons in a triplex pump may create such effect, three effects on torque may be detected per crankshaft rotation. Due to the inertia of the moving parts in the triplex pump, these effects may be smoothed out/counteracted and may appear as a reduction of the average torque to drive the triplex pump.

When considering the discharge valve, the pressure in the discharge flowline may be applied on the piston during a delay in the discharge valve closure, which may create a force that pushes on the piston, thereby applying a positive torque on the crankshaft which helps crankshaft rotation. Positive torque applied to the crankshaft helps the motor driving the crankshaft, such that the motor may produce less torque to drive the crankshaft. Such effect of torque reduction may appear for a few degrees of the crankshaft rotation (three times per rotation). With the hypothesis of valve dynamics that valve delay is equal for all valves, it may be possible to estimate the overall effect of valve delay. When there is a delay in discharge valves of a triplex pump, the average torque to rotate the crankshaft may be reduced, and the flow discharge by the pump per crankshaft rotation may be reduced.

Figure 12A:
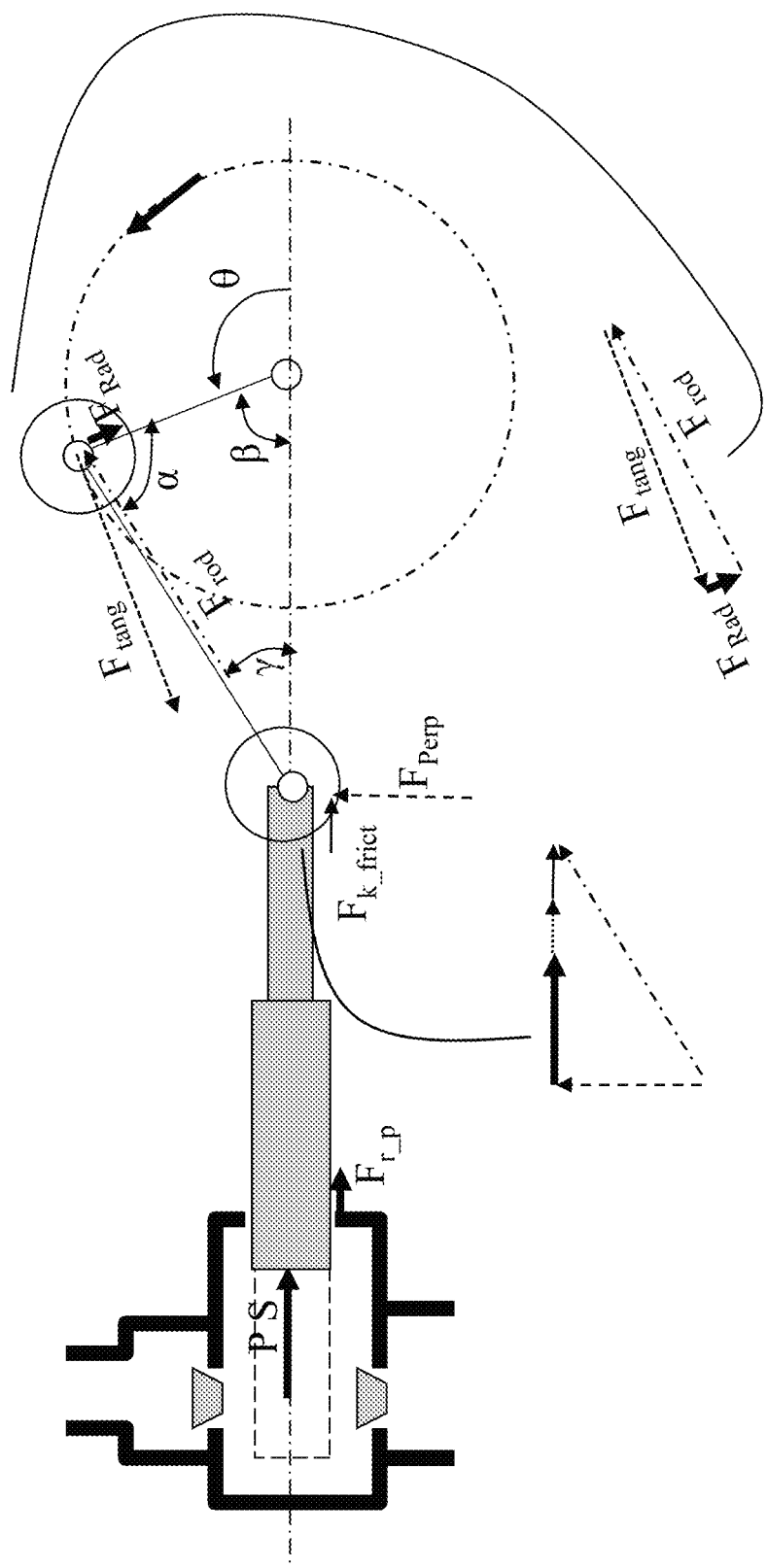
FIG. 12A shows a diagram of the vectoral sum of forces in a multiplex pump according to embodiments of the present disclosure.

The closing delay for both types of valves (suction and discharge) in a triplex pump may influence the average torque on the crankshaft, while the pump speed (RPM) may be un-affected. FIG. 12A shows a diagram of the vectoral sum of forces in a multiplex pump, including the forces occurring on the piston, connecting rod and crankshaft. FIG. 12A represents the situation for one piston position; however, a similar situation may apply for each position of the piston corresponding to one turn. Further, FIG. 12A shows the vectoral sum of the force at the two hinging points of the connecting rod, which may be used to determine the instantaneous torque created by the piston on the crankshaft. From the vectoral sums at each position of the piston it is possible to determine the corresponding torque for each position.

Figure 12B:
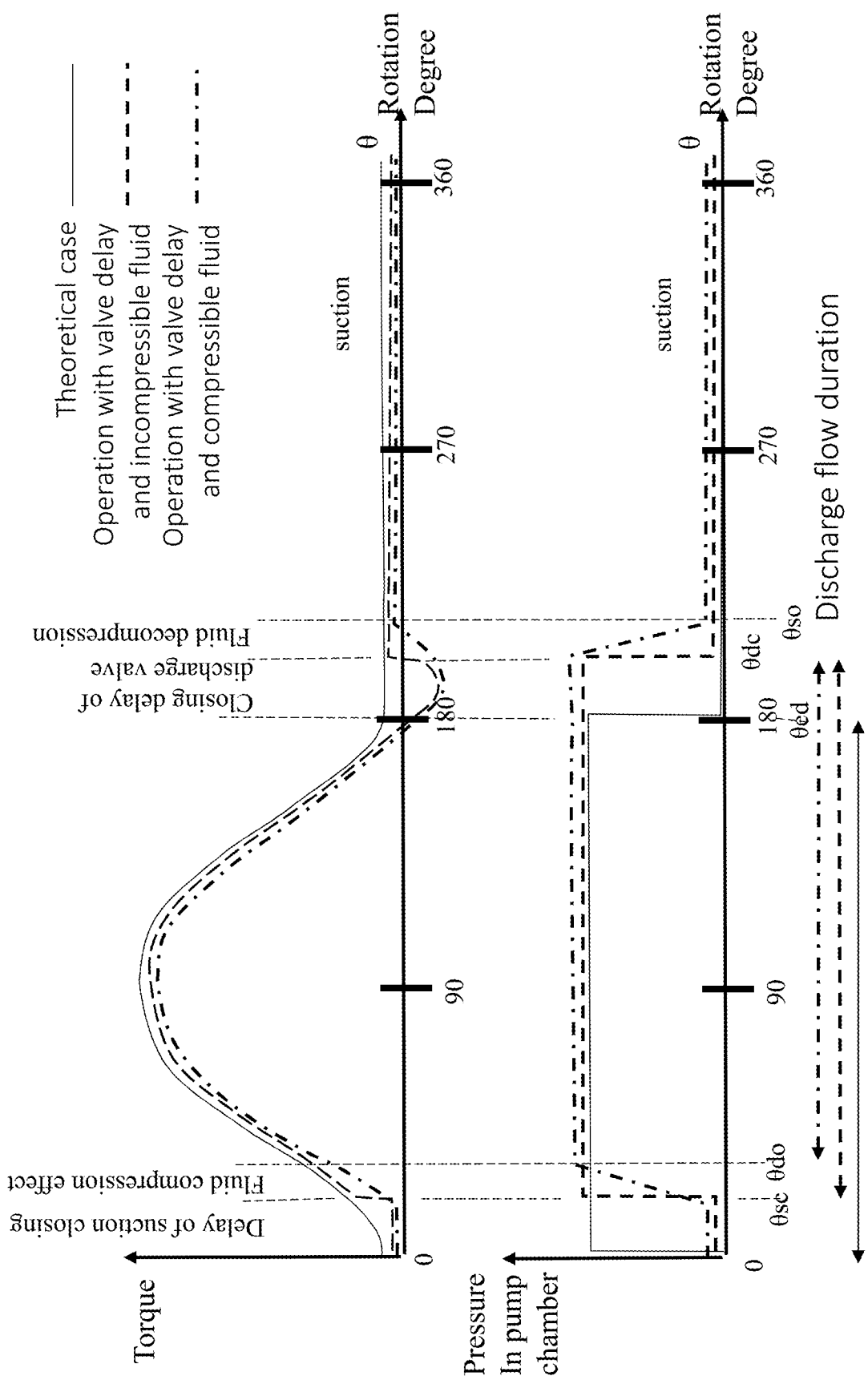
FIG. 12B shows graphs of the chamber pressure and crankshaft torque during one turn in a multiplex pump.

The determined torque for each position of the piston is displayed in FIG. 12B. In this graph, different conditions are considered. The patterns of the lines of the graph are consistent between the torque and pressure graph (and discharge flow duration). The effects of valve closing delays and fluid compressibility are shown. The following elements characterize the pump operation:

$\theta_{do}$=crankshaft angle corresponding to the Opening of the Discharge valve $\theta_{sc}$=crankshaft angle corresponding to the Closing of the Suction valve $\theta_{so}$=crankshaft angle corresponding to the Opening of the Suction valve $\theta_{dc}$=crankshaft angle corresponding to the Closing of the Discharge valve $\theta_{ed}$=crankshaft angle corresponding to the theoretical End of the Discharge valve The average torque per turn to drive the crankshaft in rotation integrates these effects. The average torque is reduced by valve closing delay and effect of fluid compressibility. This average torque may be determined so that these effects may be characterized. The effect of fluid compressibility on average torque may first be removed by mathematical treatment, as this effect is predictable for a given pump geometry, fluid compressibility and discharge pressure. These two parameters may be measured continuously and fed into a mathematical processing system by the rig control unit. As the suction and discharge valves to each piston chamber are similar, the closing delay may be assumed to be the same for all valves. In this case, a mathematical model may be used to determine closing delay in order to calculate an average torque equal to the measured average torque.

Support for a mathematical model to determine torque in a multiplex pump in consideration of the effect of valve closing delay and friction is provided below, referencing the elements shown in FIG. 12A.

$$\beta = 180 - \theta; \gamma + \alpha + \beta = 180; \text{ and } \gamma + \alpha = \theta$$

$$X_1 = R\cos(\beta) = R\cos(180 - \theta) = -R\cos(\theta)$$

$$H = R\sin(\beta) = R\sin(180 - \theta) = R\sin(\theta)$$

$$X_2 = \sqrt{L^2 - H^2} = \sqrt{(L^2 - R^2\sin^2\theta)}$$

$$X = X_1 + X_2 = \sqrt{(L^2 - R^2\sin^2\theta)} - R\cos\theta$$

$$\gamma = \arcsin(H/L) = \arcsin\left(\frac{R\sin\theta}{L}\right)$$

When friction is acting on the piston seal, there is a secondary axial force on the piston, called $F_{r-p}$. The force tends to be opposed to the piston movement. The combination of the axial forces on the piston may be called $F_{pumping}$ and depends on the direction of the piston movement.

From suction closing $\alpha_{SC}$ to 180 degrees, $F_{pumping}=P\,S+F_{r\text{-}p}$, and from 180 degrees to discharge closing $\alpha_{DC}$, $F_{pumping}=P\,S-F_{r\text{-}p}$, where $\alpha_{DC}$ is the angle for discharge closing delay and $\alpha_{SC}$ is the angle for suction closing delay.

$$F_{ROD} = \frac{F_{pumping}}{\cos\gamma}$$

The torque $T(\theta)$ used to move the crankshaft against the connecting rod is:

$$T(\theta) = F_T(\theta) R \sin(\alpha)$$

$$F_T(\theta) = F_{Tangent} = \frac{PS\sin\left[\theta - \arcsin\left(\frac{R-\sin\theta}{L}\right)\right]}{\cos\left[\arcsin\left(\frac{R\sin\theta}{L}\right)\right]}$$

And the average torque $T_{av}$ during the discharge period is:

$$T_{av} = \frac{1}{180+\alpha_{DC}-\alpha_{SC}} \int_{\alpha_{SC}}^{180+\alpha_{DC}} F_T(\theta) R \sin(\alpha) d\theta,$$

$$T_{av} = \frac{1}{180+\alpha_{DC}-\alpha_{SC}} \int_{\alpha_{SC}}^{180+\alpha_{DC}} F_T(\theta) R \sin\left[\theta - \arcsin\left(\frac{R\sin\theta}{L}\right)\right] d\theta,$$

and finally:

$$T_{av} = \frac{\int_{\alpha_{SC}}^{180} (F_T(\theta)+F_{r\text{-}p}) R \sin\left[\theta-\arcsin\left(\frac{R\sin\theta}{L}\right)\right] d\theta + \int_{180}^{\alpha_{DC}} (F_T(\theta)+F_{r\text{-}p}) R \sin\left[\theta-\arcsin\left(\frac{R\sin\theta}{L}\right)\right] d\theta}{180+\alpha_{DC}-\alpha_{SC}}$$

When $F_{r\text{-}p}=K_p\,P$, then $$T_{av} = \frac{P}{(180+\alpha_{DC}-\alpha_{SC})}\{f1(K_p,s,\alpha_{SC})+f2(K_p,s,\alpha_{DC})\}$$

Friction may occur in the bearings between the connecting rod and the crankshaft, which may depend on force in the connecting rod. The friction may appear as additional torque.

$T_{rod}=K_1\,F_{rod}$, where $K_1$ is a characteristic of the bearing, and $F_{rod}$ is from the effect of piston friction. The average torque per revolution may be calculated as follows.

$$T_{rod1} = \frac{K_1}{180-\alpha_{SC}} \int_{\alpha_{SC}}^{180} \left(\frac{PS+F_{r\text{-}p}}{\arcsin\left(\frac{R\sin\theta}{L}\right)}\right) d\theta$$

$$T_{rod2} = \frac{K_1}{\alpha_{DC}-180} \int_{180}^{\alpha_{DC}} \left(\frac{PS-F_{r\text{-}p}}{\arcsin\left(\frac{R\sin\theta}{L}\right)}\right) d\theta$$

So, $T_{rod1}=P\,f_3'(K_p,s,\alpha_{SC},K_1)$ and $T_{rod2}=P\,f_4'(K_p,s,\alpha_{CD},K_1)$.

Friction in the bearing (hinge) between the connecting rod and the push rod (directly extending from the piston) may occur. Such effect could also be included in a similar way.

For friction in crankshaft bearings, $T_{MB}$ refers to torque in a main bearing, and $T_{MB}(\theta)=K_2\,F_{rod}$, where $T_{MB}(\theta)$ may be used to calculate $T_{rod}$. Friction in crankshaft bearings and friction in bearings between a connecting rod and crankshaft may be combined where torque in a rotation, $T_{rot}=T_{rod}+T_{MB}$.

$T_{rot1}=P\,f_3(K_p,a,\alpha_{SC},K_B)$ and $T_{rot2}=P\,f_4(K_p,s,\alpha_{CD},K_B)$, where $K_B$ is the bearing friction effect.

The total friction torque average, $T_{Fr}=(T_{av\,Pis1}+T_{av\,Pis2}+T_{rot1}+T_{rot2})\times3$ pistons for a triplex=$3P\,[f_1(K_p,s,\alpha_{SC})+f_2(K_p,s,\alpha_{DC})+f_3(K_p,s,\alpha_{SC},K_B)+f_4(K_p,a,\alpha_{DC},K_B)]$.

$T_{Fr}=P\,f_T(K_p,s,K_B,\alpha_{SC},\alpha_{DC})$, where $P$ is a variable and $\alpha_{SC}$ and $\alpha_{DC}$ are variables for valve closing.

It should be noted that the force $F_{rod}$ along the connecting rod creates a side force $F_{perp}$ at the knuckle joint between the connecting rod and the piston. This side force $F_{perp}$ generates friction $F_{k\_pist}$ at the knuckle joint. This friction force may be added onto $F_{r\text{-}p}$. In practical terms, iterative processes may be used to include this effect in the solution of forces and torque on the system formed by the piston, connecting rod and crankshaft. However, the conclusion for the dependence on the system parameters would not be affected.

As a simplified model, the power of a triplex pump without mechanical loss may be calculated from Equation 31.

$$\text{Power}_{Hyd}=Q_{Th}*\eta_{v\_lp}*Pr=T_{av}*\Omega \qquad \text{Eq. 31}$$

where $\text{Power}_{Hyd}$ is the hydraulic power to the fluid; $Q_{Th}$ is the theoretical discharge flow rate delivered by the triplex pump; $\eta_{v\_lp}$ is the volumetric efficiency of a triplex pump for fluid flow into the low pressure side/suction side of the triplex pump; $Pr$ is the discharge pressure; $T_{av}$ is the measured average torque on the crankshaft; and $\Omega$ is the rotational speed (rad/s) of the crankshaft.

Valve closing delay may reduce the flow rate from a triplex pump, while the pump speed stays at a set value. However, pressure imposed from the discharge flowline on a piston through a delayed discharge valve closing may reduce the average torque on the crankshaft. The effect of fluid compressibility also reduces the flow rate of a triplex, where this effect may be predictable by a model. This reduction of flow rate may be included in the above described process.

According to embodiments of the present disclosure, a mechanical efficiency coefficient, $\eta_m$, of a triplex pump may be calculated from a relationship between an actual torque on the triplex pump and a theoretical torque on the triplex pump. As discussed above, the average torque on a triplex pump may depend on the discharge pressure and valve closing delays. Furthermore, a mechanical efficiency coefficient may include friction between moving parts in the triplex pump. Equation 32, below, may be used to calculate the power of a triplex pump with mechanical loss.

$$\text{Power}_{Hyd}=Q_{Th}*\eta_{v\_lp}*Pr=\eta_m*T_{av}*\Omega \qquad \text{Eq. 32}$$

The measured average torque $T_{av}$ may be obtained, for example, by an in-line torque sensor along the crankshaft or by torque calculation based on the motor current of the triplex pump. The mechanical efficiency $\eta_m$, as well as the volumetric efficiency $\eta_{v\_lp}$ of a triplex pump for fluid flow into the low pressure side/suction side of the triplex pump, may be determined during a calibration process, as discussed herein.

Figure 12C:
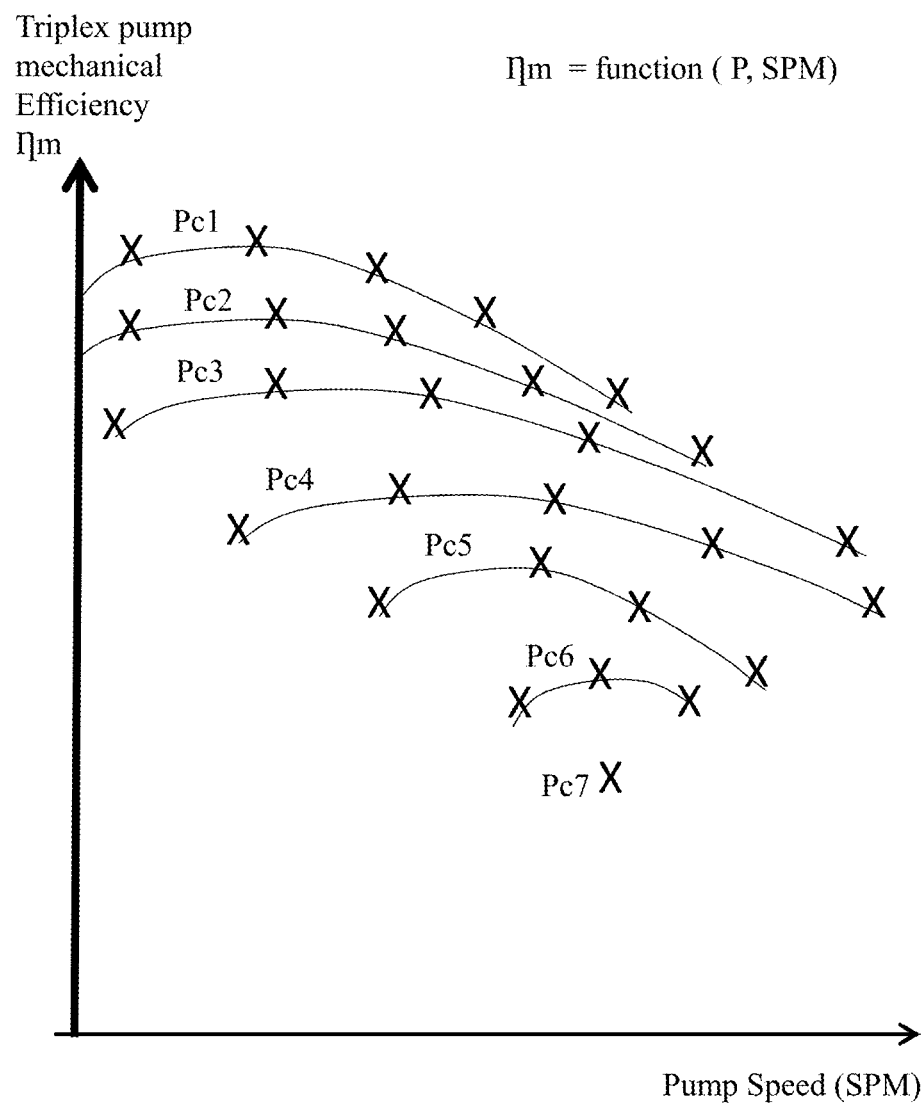
FIG. 12C shows a graph of mechanical efficiency as a function of pump speed and discharge pressure according to embodiments of the present disclosure.

As shown in Equation 32, mechanical efficiency, $\eta_m$, is a function of discharge pressure Pr and rotational speed $\Omega$ of the crankshaft, which may be characterized from the calibration conditions obtained during a calibration period. This relationship may be graphed, as shown in FIG. 12C, which shows that the mechanical efficiency of a triplex pump may have a general bell-shaped curve as pump speed increases. The graph in FIG. 12C also shows a trend of decreasing mechanical efficiency with increasing discharge pressure, Pc, (Pc1 being the lowest graphed discharge pressure and Pc7 being the greatest discharge pressure).

The mechanical efficiency of a triplex pump may remain relatively stable as long as proper maintenance is performed on the pump power end, while volumetric efficiency may vary within a few days of pumping.

For optimum usage of this method, the leak rates may be included in the analysis of the triplex pump. The triplex transmits power to the leaked fluid, where the fluid is pushed through the leak as pressure (equal to the discharge pressure). Referring to the flow in the suction line, the flow rate computed by Equation 32 may include the leak rate. The part of flow transmitted through the triplex pump may be reduced by the leak rate determined by a method described above.

According to embodiments of the present disclosure, flow tracking of fluid being pumped into a triplex pump may be performed using a flow sensor (e.g., 134 in FIG. 1A). A flow sensor may be installed in a low pressure flowline in a triplex pumping system (e.g., along the inlet flowline 130, as shown in FIG. 1A), which may reduce installation costs. One flow sensor may be used along a flowline into each of a triplex pump in a system (e.g., three flow sensors used in a system with three triplex pumps).

Figure 13:
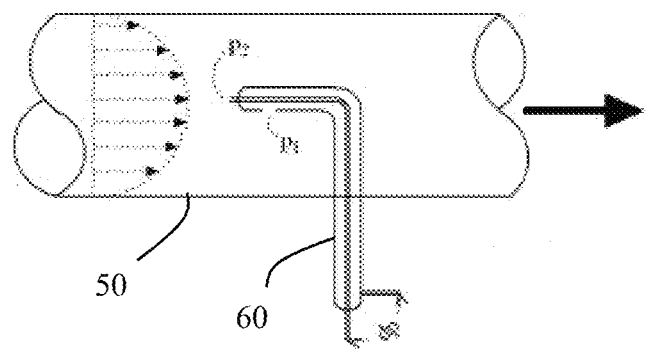
FIGS. 13-15 show examples of flow sensors.
Figures 14, 15:
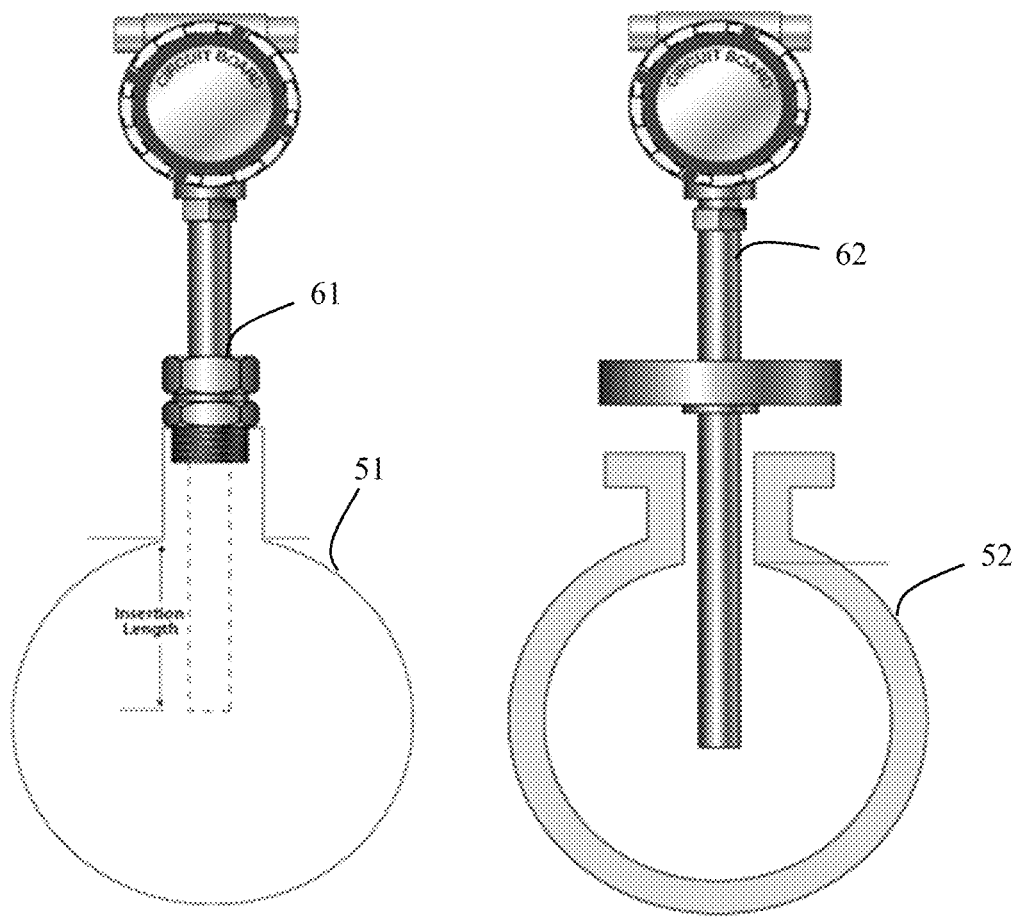

FIGS. 13-15 show examples of flow sensors that may be used in systems according to embodiments of the present disclosure to measure fluid flow into a triplex pump. As shown in FIG. 13, a flow sensor may be a velocity probe 60 inserted through a wall of a flowline 50, where the velocity probe has an axial end that extends along a flowline central longitudinal axis. As shown in FIGS. 14 and 15, a flow sensor may be a velocity probe 61, 62 inserted through a wall of a flowline 51, 52, where the velocity probe has an axial end that extends radially from a flowline central longitudinal axis. Other velocity probes may be used to measure fluid flow through a flowline to a triplex pump in systems of the present disclosure.

Velocity probes may measure fluid flow based on various principles of physics, such as turbine measurements, electromagnetic measurements, thermal measurements, and/or Doppler ultrasonic measurements, which may be reproducible with high resolution. However, these measurements may inaccurately compute a flow rate of fluid when the fluid rheology (and density) is not known, as the velocity profile of the fluid may be affected with different rheologies and density. Furthermore, the measurement output of velocity probes may be affected by other properties of the fluid, for example, a turbine measurement mechanism may be affected by fluid rheology; a Doppler ultrasonic measurement mechanism may be affected by sonic velocity in the fluid; and a thermal probe may be affected by the thermal characteristics of the fluid. According to some embodiments, a flow sensor may be a small turbine velocity probe, which may depend on fluid rheology and not on other fluid properties.

Because an estimated flow rate obtained from a velocity probe may change for a constant real flow rate due to variation of fluid properties, the output of the velocity probe may be calibrated versus the true flow rate obtained from a change in the level of a calibration tank during a calibration process.

Figure 16:
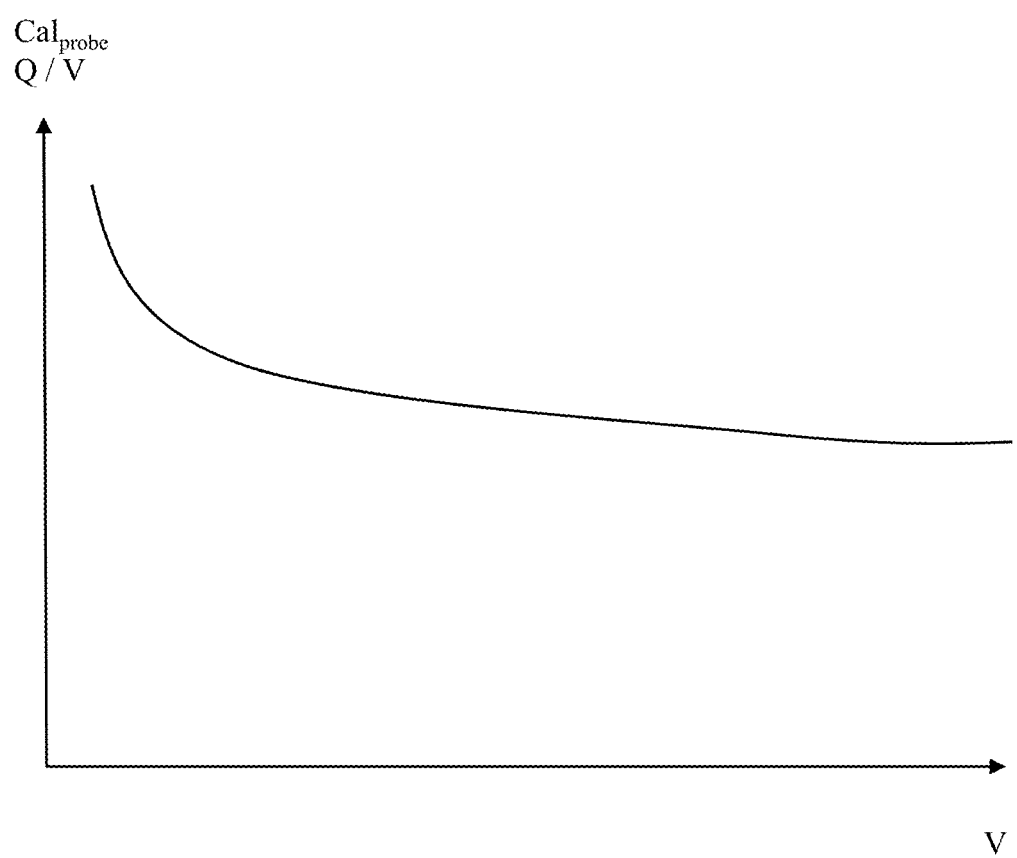
FIG. 16 shows a graph of a calibration coefficient curve for a velocity probe according to embodiments of the present disclosure.

FIG. 16 shows a graph of a sensor calibration curve for a velocity probe according to embodiments of the present disclosure. For each point of true flow rate, $Q_i$, pumped out of a calibration tank during a calibration process, a velocity probe may provide a velocity output, $V_i$. A calibration coefficient, $Cal_i$, for the velocity probe may then be calculated using Equation 33.

$$Cal_i = Q_i/V_i \qquad \text{Eq. 33}$$

After a calibration process is completed for a first calibrated triplex pump, a sensor calibration coefficient graph, such as shown in FIG. 16, may be produced based on all available $Q_i$ and $V_i$ measurements from the calibration process, and interpolation may be provided between the sensor calibration points.

The calibration of the velocity probe may be performed simultaneously with the calibration of the multiplex pump as described to obtain data set, such as in FIG. 6A.

According to embodiments of the present disclosure, flow sensor calibration may include determining a true flow rate from a calibration tank (e.g., from fluid level measurements from the calibration tank) and comparing the true flow rate to a sensor flow rate, such as the flow rate measured from a velocity probe on an inlet flowline to a triplex pump. Inaccuracies in a triplex calibration process may be indicated when the flow sensor calibration determines the true flow rate and the sensor flow rate are off/mismatched.

Figure 17:
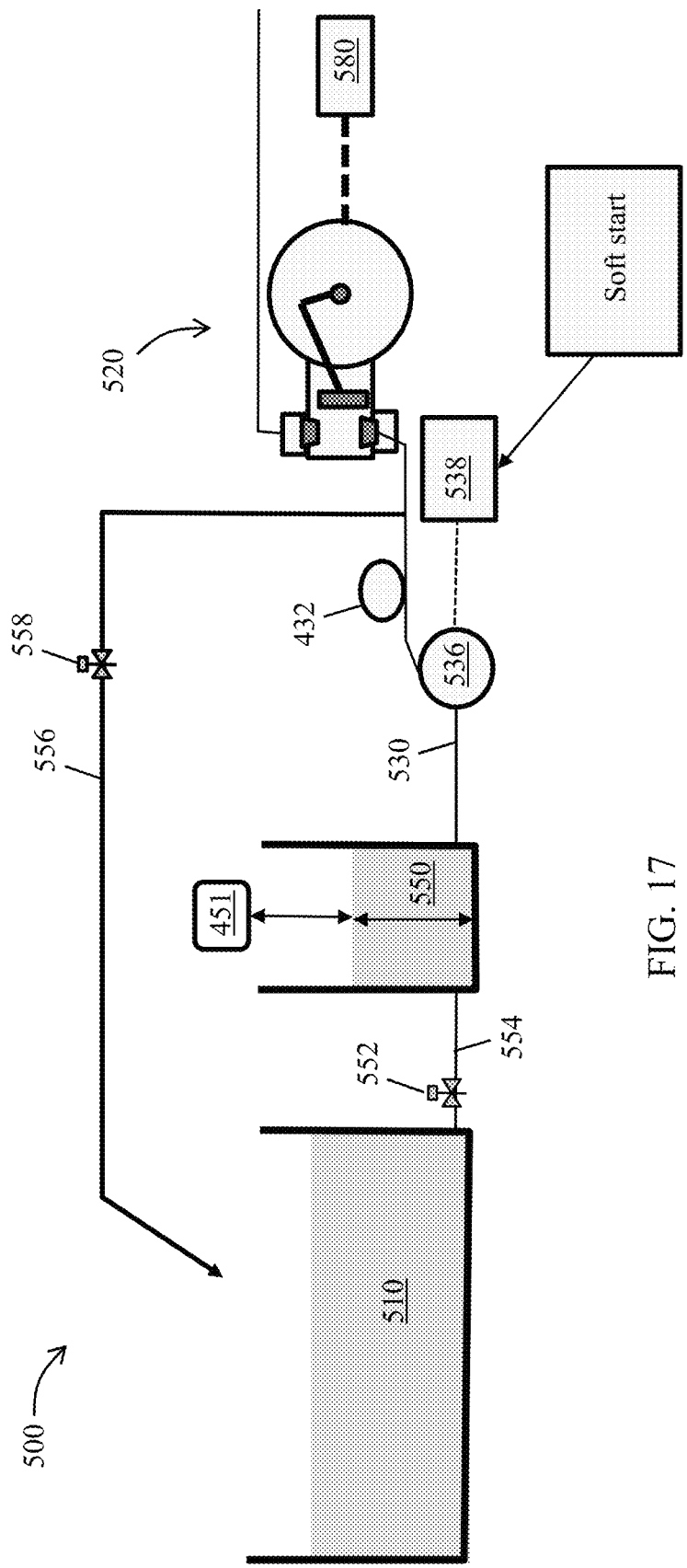
FIG. 17 shows a system according to embodiments of the present disclosure.

In some embodiments, a centrifugal pump may be used as a flowmeter/flow sensor. For example, FIG. 17 shows a diagram of a system 500 having a centrifugal pump 536 that may be used as a flow sensor. The system 500 includes a fluid source tank 510 in fluid communication with a calibration tank 550 via a refill flowline 554, where a control valve 552 may be disposed on the refill flowline 554 to allow/prevent fluid flow between the tanks 510, 550. Fluid may be pumped from the calibration tank 550 to one or more triplex pumps 520 via a flowline 530 extending from the calibration tank 550 to an inlet of the triplex pump 520. A triplex pump motor 580 may rotate a crankshaft in the triplex pump 520 at a pump speed. The centrifugal pump 536 may be positioned along the flowline 530, along with a pressure sensor 532, where a centrifugal pump motor 538 may drive the centrifugal pump 536 at a centrifugal pump speed. The centrifugal pump 536 may be pumping fluid only to the triplex pump 529 when the by-pass valve 558 in the by-pass line 556 is closed. The centrifugal pump may deliver fluid only to the by-pass line 556 when the by-pass valve 558 is open and the triplex 520 is stopped.

Using the measured pressure from the pressure sensor 532 and the relationship between the power to drive the centrifugal pump and flow rate through the centrifugal pump, the flow rate through the centrifugal pump 536 may be calculated when the viscosity and density of the fluid is known.

When the viscosity and density of the fluid pumped through the centrifugal pump is unknown, pump characteristic curves may be generated for the centrifugal pump for various viscosities and densities. To generate pump characteristic curves, the centrifugal pump may be operated with no discharge, for example, by stopping the connected triplex pump or by closing the discharge valve, and points may be plotted on a graph for pressure and power measurements. The centrifugal pump may also be operated at full flow discharge, for example, by opening a bypass valve 558 along the by-pass line 556, and points may be plotted on the graph for pressure and power measurements. The flow rate estimation may be determined from the variation of the level 451 versus time of the calibration tank 550 when the valve 552 is closed.

In some embodiments, one or more Coriolis meters may be used as flow sensors, where the Coriolis meter may measure the fluid volume pumped into a triplex pump. In systems using multiple triplex pumps to pump fluid downhole, a Coriolis meter may be positioned along each of the inlet flowlines leading to the triplex pumps, such that the Coriolis meters may measure the volume of fluid being pumped into each of the individual triplex pumps. In some embodiments, one or more triplex pumps in a system may have a Coriolis meter positioned along an inlet flowline to the triplex pump(s) and one or more other triplex pumps may have a different flow sensor in fluid communication with an inlet flowline to the other triplex pump(s).

Coriolis meters may provide greater accuracy in flow measurement, but are more expensive than other flow sensor types. To decrease costs while also maintaining the accuracy of flow measurements capable from coriolis meters, some systems of the present disclosure may have a single coriolis meter that may be selectively in fluid communication with multiple triplex pumps.

Figure 19:
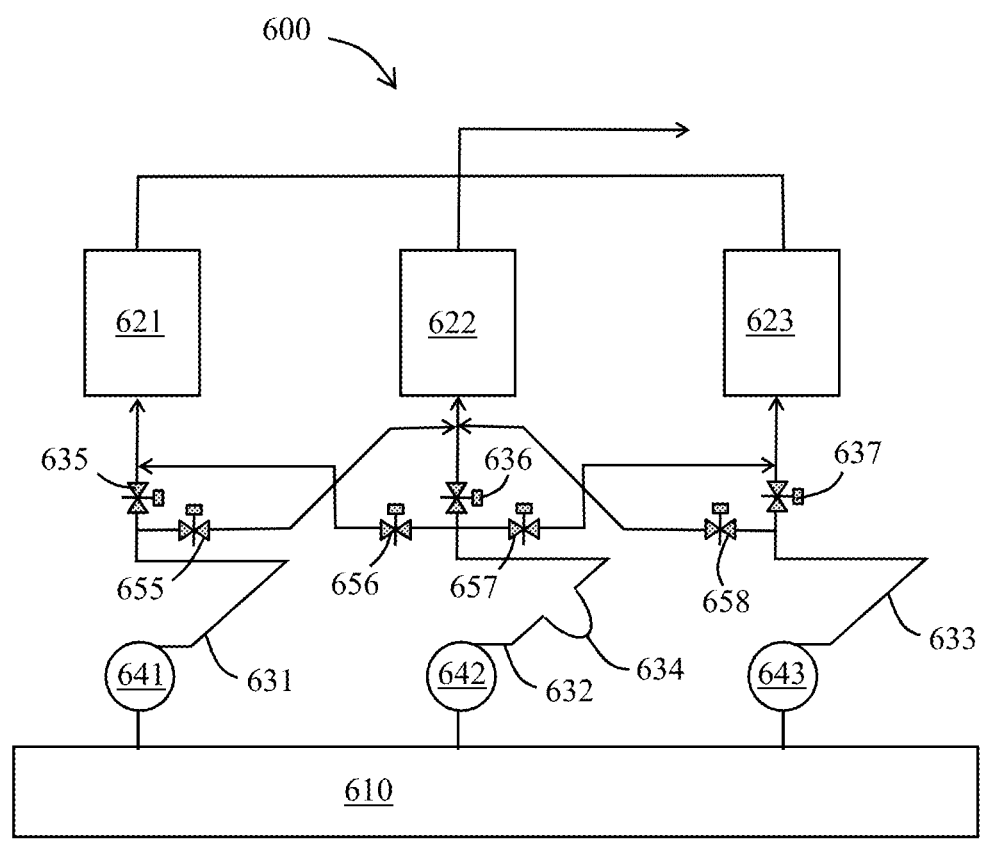
FIG. 19 shows a system according to embodiments of the present disclosure.

For example, FIG. 19 shows an example of a system 600 according to embodiments of the present disclosure having a fluid source 610 connected to multiple triplex pumps 621, 622, 623 via inlet flowlines 631, 632, 633, where a coriolis meter 634 is positioned along one of the inlet flowlines 632. Each of the inlet flowlines 631, 632, 633 have a valve 635, 636, 637 positioned to allow or prevent fluid flow from the fluid source 610 to the triplex pump 621, 622, 623 and a centrifugal booster pump 641, 642, 643 to pump fluid to the triplex pumps 621, 622, 623.

Secondary flowlines 651, 652 may extend from the inlet flowline 632 having the coriolis meter 634, upstream the valve 636, to the inlet flowlines 631, 633 without a coriolis meter, downstream the valves 635, 637. Secondary flowlines 653, 654 may extend from inlet flowlines 631, 633 without a coriolis meter, upstream the valves 635, 637, to the inlet flowline 632 with the coriolis meter 634, downstream the valve 636. Secondary valves 655, 656, 657, 658 may be positioned along the secondary flowlines 651, 652, 653, 654 to allow or prevent fluid flow between inlet flowlines 631, 632, 633. By opening and closing appropriate valves between inlet and secondary flowlines, flow may be directed from passing through the single coriolis meter 634 to selected triplex pumps 621, 622, 623. In other words, the system 600 may allow for use of a single coriolis meter 634 to more accurately measure the flow to different triplex pumps 621, 622, 623 by opening and closing corresponding valves.

Different configurations of inlet and secondary flowlines may be provided in systems of the present disclosure to allow use of a single coriolis meter to more accurately measure inflow to multiple different triplex pumps at selected times. It is also envisioned that such configuration of a Coriolis meter may be used in combination with an encoder on the crankshaft, as discussed above. In such embodiments, the Coriolis meter may be used as a calibration reference for the crankshaft sensor.

Figure 20:
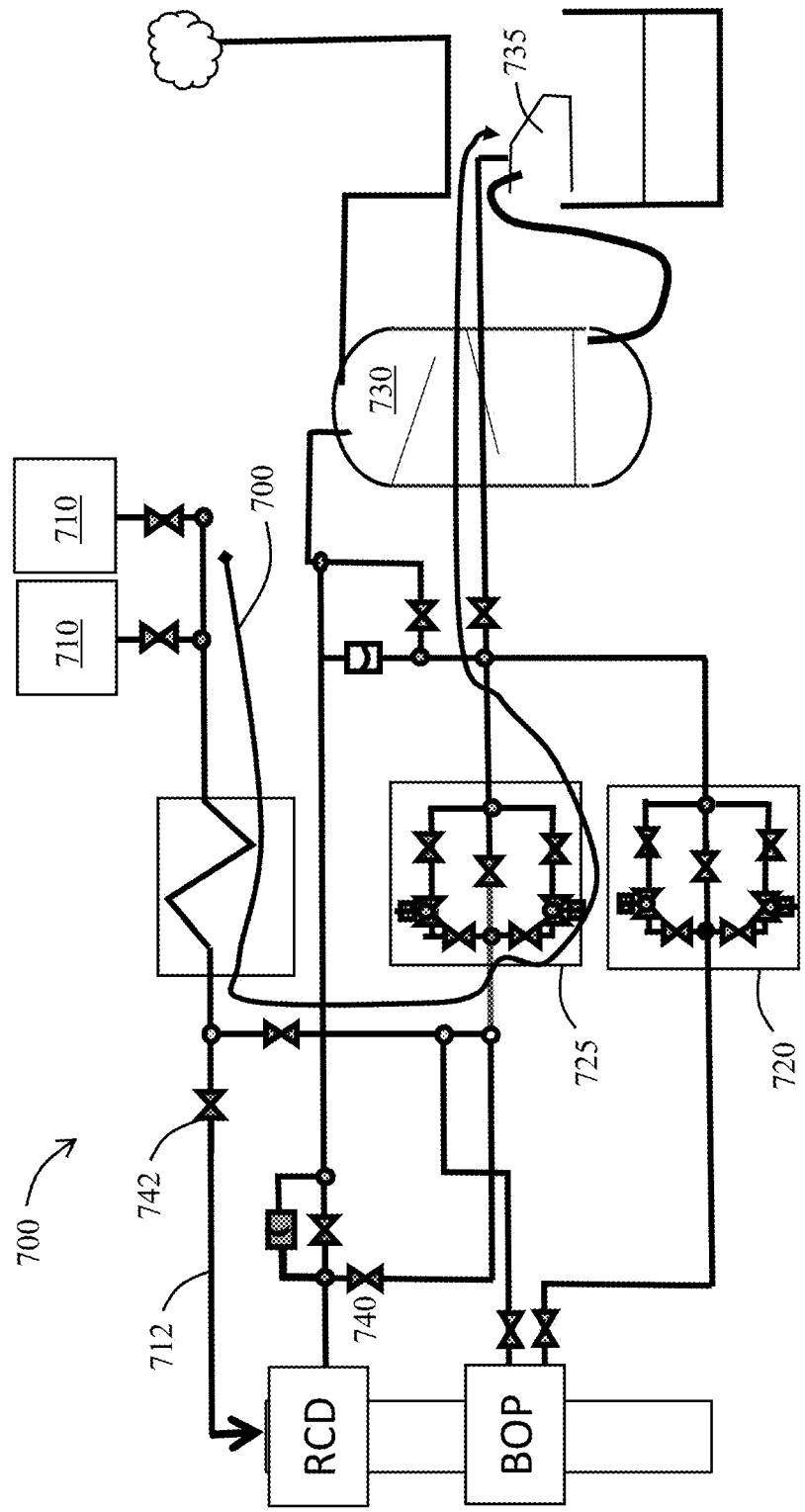
FIG. 20 shows a system according to embodiments of the present disclosure.

When operating on a drilling rig equipped with multiple triplex pumps, the discharge pressure from each operating triplex pump may be controlled by the total flow rate through the well, for example, by using a back pressure system or other managed pressure drilling techniques, such that the total flow rate may be kept constant. For example, FIG. 20 shows a system 700 according to embodiments of the present disclosure having multiple triplex pumps 710 pumping fluid downhole through a discharge line 712. The downhole system includes a downhole well equipment (e.g., a rotating control device ("RCD") and a blowout preventer ("BOP")) and a fluid return system for bringing fluid from the downhole well equipment to a rig or other surface equipment. In the example shown, the fluid return system includes a rig manifold 720 for controlling fluid flow to rig equipment (e.g., a mud gas separator 730 and a shaker 735) and a choke manifold 725 for providing back pressure to the fluid returning from the well. Back pressure may be provided along a flow path 740 from the rig equipment, through the fluid return system, and to the discharge line 712, where the back pressure may be used to control the total flow rate out of the triplex pumps 710.

When the efficiency of the triplex pump is to be determined in the presence of triplex discharge pressure, the valve 742 may be closed so that the triplex discharged fluid may not be delivered into the well via line 712, while the valve 740 is open so that the fluid discharged by the triplex pumps may be delivered to the choke manifold 725. The fluid may then be returned to the mud system via the shaker 735. By activating one triplex at a given time, and by operating the chokes of the choke manifold 725 at the proper setting, the triplex discharge pressure may be selected based on the need of the calibration. With such process, it is possible to perform calibration of the triplex pump over a wide range of flow rates while selecting the discharge pressure due to the setting of the choke.

According to embodiments of the present disclosure, one or more tests disclosed herein may be used to "troubleshoot" a cause of a triplex calibration being off. For example, a flow sensor calibration may indicate when a triplex calibration is off, generally, and a test for determining a change in the apparent viscosity of the fluid, such as discussed above with respect to FIGS. 8-11, may be used to narrow the reason why the triplex calibration is off. In other words, a change in apparent viscosity may be the reason for a triplex calibration being off, while no change in apparent viscosity may indicate that a different reason is to blame for a triplex calibration being off.

In some embodiments, a diagnosis graph may be generated to compare different parameters and/or types of flow rates determined from different portions of a triplex pumping system over time. The comparisons between the different parameters and/or types of flow rates may indicate a source of inefficiency in the calibrated triplex pump.

Figure 18:
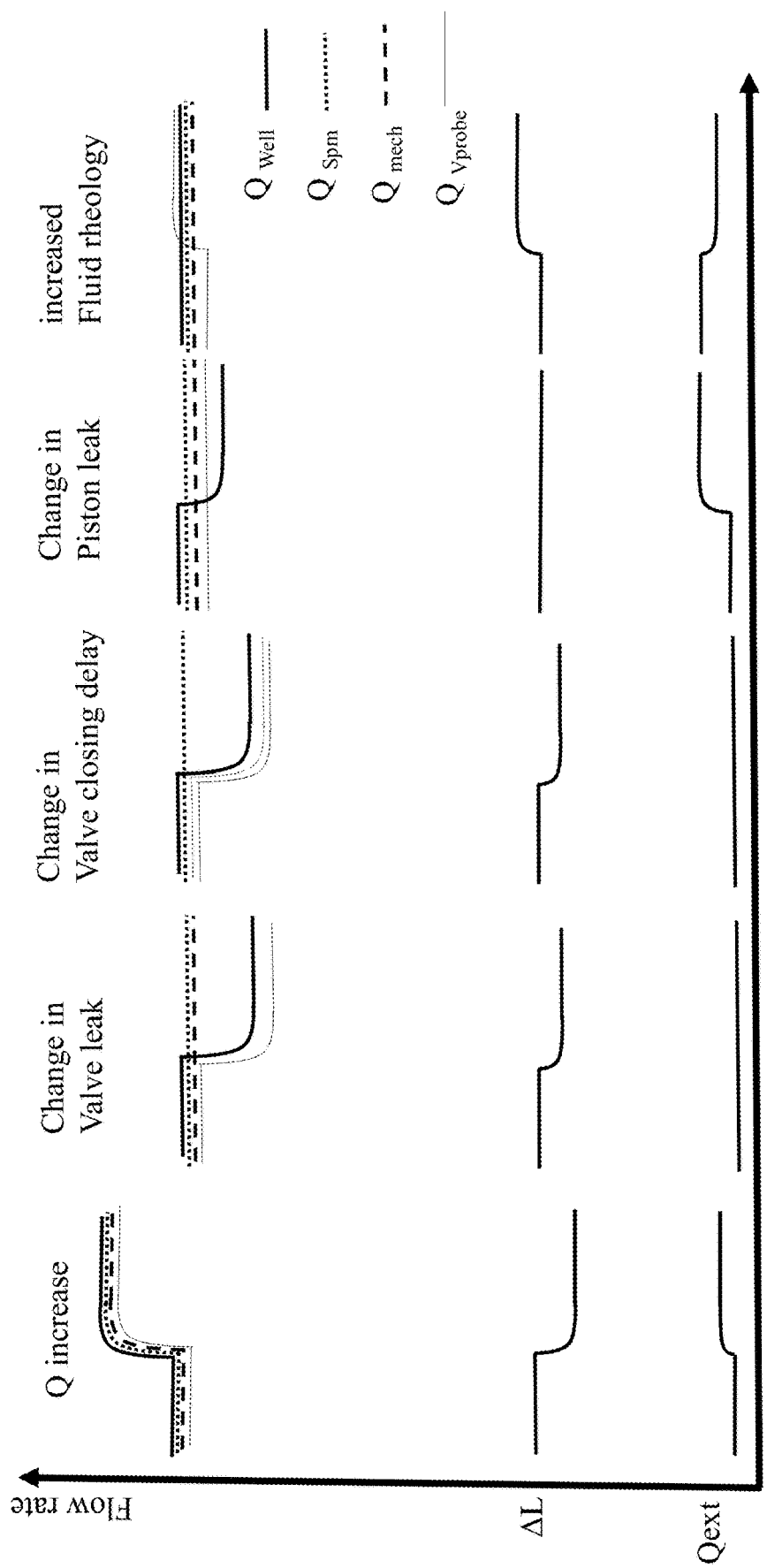
FIG. 18 shows a diagnosis graph according to embodiments of the present disclosure.

For example, FIG. 18 shows a diagnosis graph plotting various types of flow rate curves found in different scenarios for diagnosing. As shown, the graph may include a plot of one or more of $Q_{well}$ (which is the real flow rate into a well), $Q_{SPM}$ (flow rate estimated from the triplex pump rotation), $Q_{mech}$ (flow estimated from the power fed into the triplex corrected by system efficiency), $Q_{Vprobe}$ (flow rate measured by a velocity probe or other flow sensor and possibly corrected by calibration data), $\Delta L$ (difference in fluid level change between a fluid source tank and a connected calibration tank), and $Q_{ext}$ (external leakage rate, e.g., flow rate calculated from amount of fluid collected into a collection box below pistons in a triplex pump). Different combinations of different changes in the graphed parameters may indicate different scenarios, such as an increase in flow rate through the system, a change in valve leakage, a change in a valve closing delay, a change in leakage around one or more pistons in a triplex pump, and an increase in fluid rheology.

By graphing and comparing different types of flow rates measured through a triplex pumping system according to embodiments of the present disclosure, problems in calibration may be diagnosed. Repairing diagnosed problems may increase efficiency of the triplex pump system.

According to embodiments of the present disclosure, inflow rate measurements of fluid being pumped downhole may be more accurately determined by accounting for multiplex pump efficiency. For example, rather than calculating an inflow rate from a multiplex pump by counting the pump strokes, the multiplex pump efficiency may be determined to calculate with greater accuracy how much volume is pumped through the multiplex pump with each stroke, which may then be used in combination with pump stroke or rate of pumping to determine the inflow rate. Further, multiplex pump efficiency may vary throughout a pumping operation (e.g., wear on the pump and/or changes in the pumping operation such as back pressure and drilling fluid properties). According to embodiments disclosed herein, a multiplex pump may be periodically calibrated throughout a pumping operation (such that the multiplex pump efficiency may be updated throughout the pumping operation). Further, a pumping system may be provided with multiple multiplex pumps, such that one of the multiplex pumps may be calibrated while the other multiplex pumps continue pumping operations.

Methods described herein may allow determination of the operation conditions of a multiplex pump. In particular, methods described herein may be used to determine the leakage at the multiple pump valve and piston seals, as well as delay for valve closing. These elements are affected by the pumping conditions and the overall operating conditions of the pump. Further, these estimations may be used to determine the need of maintenance on the multiplex pump.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should include not only the embodiments disclosed but also such combinations of features now known or later discovered, or equivalents within the scope of the concepts disclosed and the full scope of the claims to which applicants are entitled to patent protection.

What is claimed is:

1. A method, comprising:
    determining a first rotational position of a crankshaft in a multiplex pump from one or more sensors disposed on the crankshaft;
    determining a second rotational position of the crankshaft in the multiplex pump from the one or more sensors disposed on the crankshaft, including a complete turn of the crankshaft;
    determining a first position of each of a plurality of pistons along a corresponding bore in relation to a total stroke length of each piston and a connecting rod length;
    determining a second position of each of the plurality of pistons along the corresponding bore in relation to the total stroke length of each piston and the connecting rod length;
    calculating an individual theoretical volume of fluid contained within each of the bores in the multiplex pump for the corresponding rotational positions of the crankshaft; and
    summing the individual theoretical volumes to determine a total theoretical pumped volume by the multiplex pump after the crankshaft rotates an angular distance;
    calibrating the multiplex pump based at least in part on the total theoretical pumped volume and a known value of fluid volume pumped by the multiplex pump; and
    modifying an operation of the multiplex pump or performing maintenance on the multiplex pump in response to the calibrating.

2. The method of claim 1, further comprising:
    calculating individual theoretical instantaneous flow rates of fluid from each of the bores in the multiplex pump based on a derivative value of a pumped volume by each piston versus time; and
    summing the individual theoretical instantaneous flow rates to determine a total theoretical flow rate from the multiplex pump.

3. The method of claim 1, further comprising correcting the total theoretical pumped volume by a pump efficiency.

4. The method of claim 1, further comprising measuring an external leakage of fluid from the pistons in the multiplex pump, wherein the measuring comprises:
    providing a collection box under the pistons; and
    measuring a volume of fluid collected in the collection box versus time.

5. A method, comprising:
    determining a first rotational position of a crankshaft in a multiplex pump from one or more sensors disposed on the crankshaft;
    determining a second rotational position of the crankshaft in the multiplex pump from the one or more sensors disposed on the crankshaft, including a complete turn of the crankshaft;
    determining a first position of each of a plurality of pistons along a corresponding bore in relation to a total stroke length of each piston and a connecting rod length;
    determining a second position of each of the plurality of pistons along the corresponding bore in relation to the total stroke length of each piston and the connecting rod length;
    calculating an individual theoretical volume of fluid contained within each of the bores in the multiplex pump for the corresponding rotational positions of the crankshaft;
    summing the individual theoretical volumes to determine a total theoretical pumped volume by the multiplex pump after the crankshaft rotates an angular distance;
    calibrating the multiplex pump, wherein the calibrating comprises:
    comparing a known value of fluid volume pumped from a calibration tank to the total theoretical pumped volume by the multiplex pump; and
    determining a pump efficiency as a ratio between the fluid volume pumped from the calibration tank and total theoretical pumped volume by the multiplex pump.

6. The method of claim 5, wherein the known value of fluid volume is measured with a Coriolis meter.

7. The method of claim 5, further comprising:
    pumping the multiplex pump at different flow rates; and
    determining a relationship between the pump efficiency and pumping speed.

8. The method of claim 7, wherein the different flow rates are obtained at a constant discharge pressure.

9. The method of claim 5, further comprising:
pumping the multiplex pump with a discharge pressure set at different values;
measuring pressure in a discharge line from the multiplex pump; and
determining a set of relationships of the pump efficiency versus the discharge pressure.

10. The method of claim 9, further comprising:
obtaining compressibility of pumped fluid from the multiplex pump;
determining dead volume of the chamber and the theoretical displaced volume of fluid per stroke;
determining a reduced pumped volume corrected for the compressibility at the discharge pressure;
estimating a corrected pumped volume for an incompressible fluid; and
determining the pump efficiency of the multiplex pump pumping the incompressible fluid at a defined discharge pressure.

11. The method of claim 10, wherein the pump efficiency of the multiplex pump pumping the incompressible fluid is defined versus pumping speed and for one or multiple values of the discharge pressure.

12. The method of claim 10, further comprising:
processing pump efficiency data versus a period of the crankshaft rotation for multiple pumping speeds and discharge pressures;
selecting a pair of hypothetical leak rate and closing delay for pump efficiency data for a set value discharge pressure;
calculating estimated pump efficiencies based on the hypothetical pair of leak rates and closing delays corresponding to a period of the calibration;
determining a mean error between the estimated pump efficiencies and the determined pump efficiency from calibration;
conducting the calculating estimated pump efficiencies and determining the mean error over a wide range of hypothetical pairs of leak rate and closing delay;
selecting the hypothetical pair of leak rate and closing delay that provides a minimum mean error as a best fit to the processed efficiency data versus a period of the crankshaft rotation; and
selecting the best fit hypothetical pair of leak rate and closing delay as a current leak rate and closing delay for the multiplex pump operating at the discharge pressure of the calibration.

13. The method of claim 9, further comprising:
determining an effect of leakage on pump efficiency for the different discharge pressures;
normalizing the pump efficiency for an incompressible fluid, taking in account fluid compressibility of fluid pumped by the multiplex pump;
determining a relationship of a leak rate versus discharge pressure; and
fitting the relationship of the leak rate as a linear function or a square root function of the discharge pressure.

14. The method of claim 13, wherein the fitting depends either on fluid viscosity when the relationship fits best with the linear function, or on fluid density when the relationship fits best with the square root function.

15. The method of claim 14, wherein an estimated pump efficiency is corrected for at least one of fluid compressibility, fluid density, and fluid viscosity during a pumping sequence following a calibration period.

16. The method of claim 15, further comprising:
performing calibration sequences during pumping;
obtaining from a rig information system data comprising the fluid compressibility, the fluid density or the fluid viscosity;
determining an estimated normalized efficiency for the data of the short calibration sequences;
determining if the estimated normalized efficiency data obtained by the short calibration sequences matches normalized efficiency data obtained during a complete calibration sequence; and
determining from the normalized efficiency data of the complete calibration sequence if a new complete calibration sequence is to be re-acquired.

17. The method of claim 5, wherein the calibration tank comprises one or more sensors to measure a level of fluid in the calibration tank, and wherein the known value of fluid volume pumped from the calibration tank is calculated from a change in the measured level of fluid in the calibration tank.

18. The method of claim 17, wherein the fluid is not agitated in the calibration tank, wherein no pulse dampener is used in a suction line of the multiplex pump, and wherein data from the crankshaft sensors is outputted at a sampling rate corresponding to a defined angular rotation of the crankshaft.

19. The method of claim 18, where the sampling rate for the level measurement in the calibration tank corresponds to 2 degrees of crankshaft rotation.

20. The method of claim 18, wherein the sampling rate for the level measurement in the calibration tank is 5 milliseconds.

21. The method of claim 18, further comprising:
calculating an instantaneous flow rate of the multiplex pump from the change in the measured level of fluid in the calibration tank;
comparing the instantaneous flow rate with an instantaneous theoretical flow rate of the multiplex pump;
determining a closing delay for valves in the multiplex pump from a delayed minimum in the instantaneous flow rate; and
determining a leak rate from a difference between a pump cycling period and the closing delay and from a theoretical prediction of instantaneous flow rate.

* * * * *